(12) United States Patent
Takada et al.

(10) Patent No.: US 6,278,813 B1
(45) Date of Patent: Aug. 21, 2001

(54) WAVELENGTH DIVISION MULTI/ DEMULTIPLEXER

(75) Inventors: Kazumasa Takada; Katsunari Okamoto, both of Mito; Hiroaki Yamada, Hitachinaka, all of (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/366,853

(22) Filed: Aug. 4, 1999

(30) Foreign Application Priority Data

Aug. 4, 1998 (JP) .................................................. 10-220794
Jul. 30, 1999 (JP) .................................................. 11-218132

(51) Int. Cl.⁷ .............................. G02B 6/28; H04J 14/02
(52) U.S. Cl. ............................................. 385/24; 359/130
(58) Field of Search .............................. 385/24; 359/109, 359/124, 127, 130, 131

(56) References Cited

U.S. PATENT DOCUMENTS 5,689,594 * 11/1997 Mao ........................................ 385/24
5,926,590 * 7/1999 Mao ........................................ 385/24

FOREIGN PATENT DOCUMENTS 11-30730   2/1999 (JP) .

* cited by examiner

Primary Examiner—Scott J. Sugarman
(74) Attorney, Agent, or Firm—Alston & Bird LLP

(57) ABSTRACT

A wavelength division multi/demultiplexer multi/ demultiplexes incident light to emit demultiplexed lights from each of a plurality of light output ends and includes a first wavelength division multi/demultiplexing circuit having at least one light input end and a plurality of light output end; and second wavelength division multi/demultiplexing circuits of AWG type formed on a substrate, including a plurality of light input and output ends, one or two light multiplexing and demultiplexing sections, and a plurality of arrayed waveguides, and having a transmission bandwidth different from that of the first circuit, the transmission bandwidth indicating the width of a light frequency that can pass through each light input and output end, wherein the first circuit and at least one of the second circuits are optically connected together, and wherein the light output ends of the final second circuit are used as the light output ends of the wavelength division multi/demultiplexer. It is possible to greatly increase the number of channels of the wavelength division multi/demultiplexer using the AWG type wavelength division multi/demultiplexing circuit.

27 Claims, 53 Drawing Sheets

FIG. 14c  WAVELENGTH (nm)

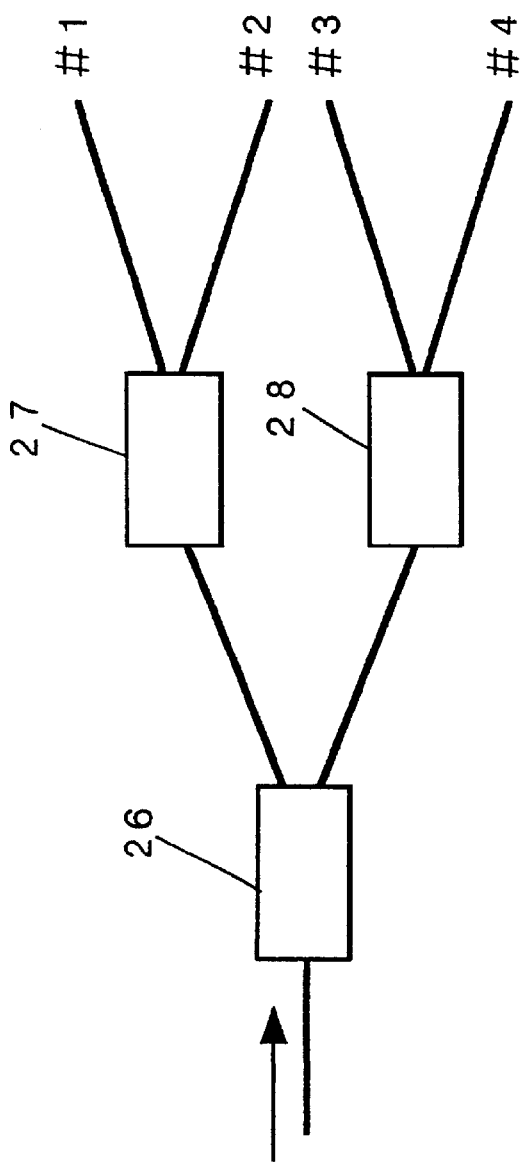
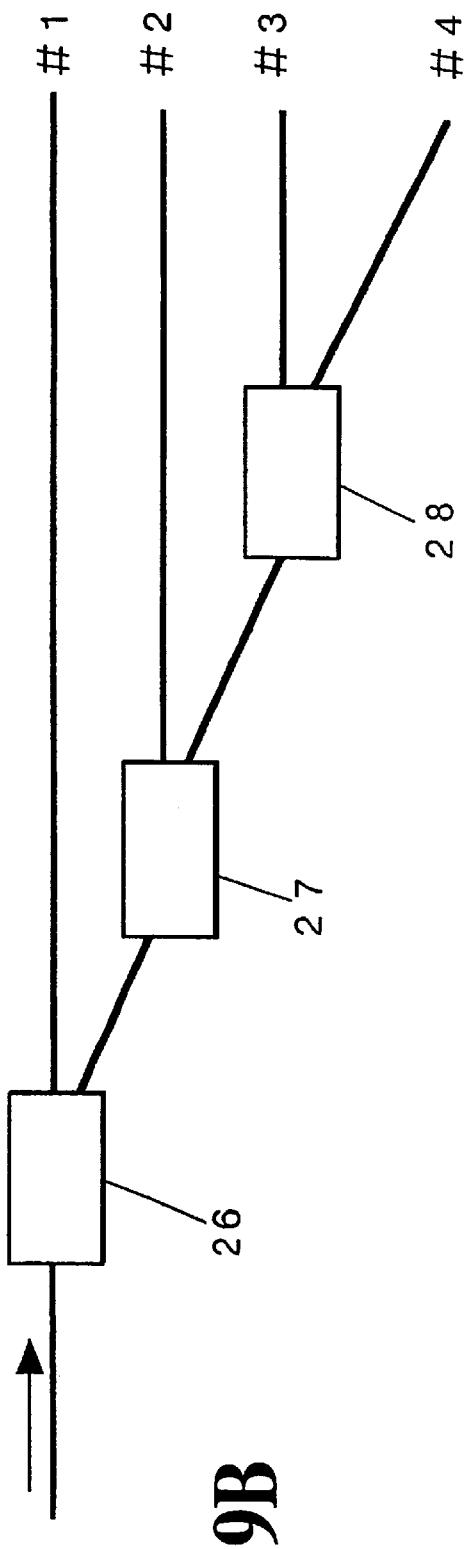
FIG.19A
FIG.19B

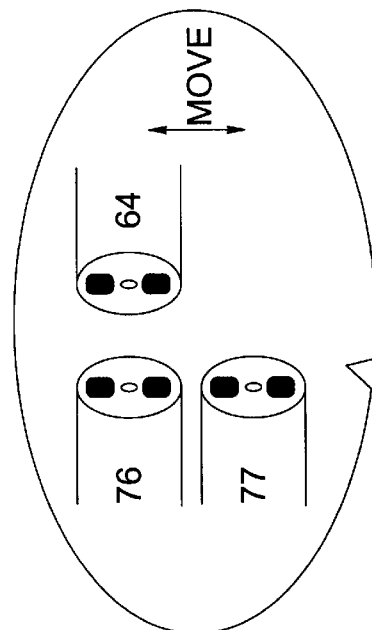
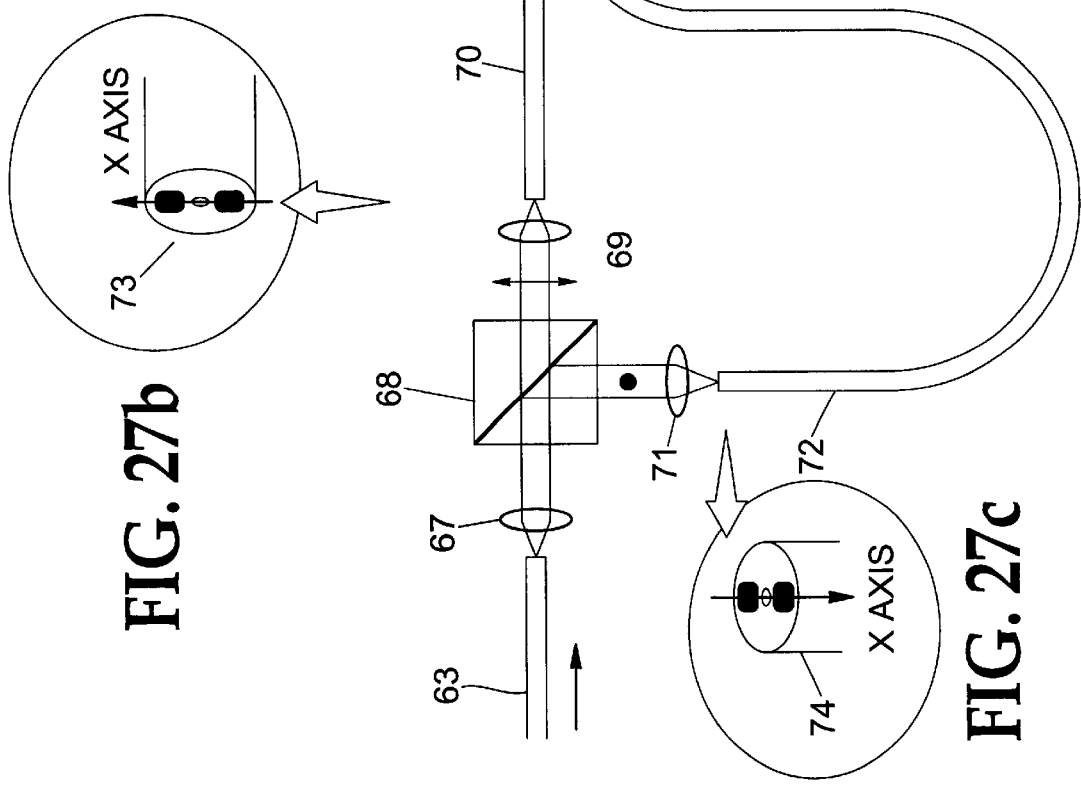
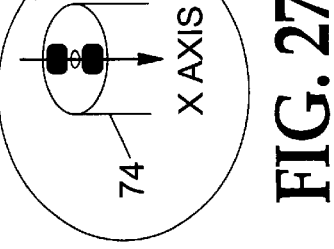

WAVELENGTH DIVISION MULTI/DEMULTIPLEXER

This application is based on Patent Application Nos. 220,794/1998 filed Aug. 4, 1998 and 218,132/1999 filed Jul. 30, 1999 in Japan, the content of which is incorporated hereinto by reference.

BACKGROUND OF THE INVENTION

1. Field of the Invention

The present invention relates to a wavelength division multi/demultiplexer for multi/demultiplexing light, an optical spectrum analyzer for measuring a spectrum of output light from a light source, and an optical bandpass filter for transmitting only a particular frequency component of light, and in particular, to a wavelength division multi/demultiplexer comprising at least two wavelength division multi/demultiplexing circuits connected together, wherein at least a second and the subsequent wavelength division multi/demultiplexing circuits are arrayed waveguide grating type wavelength division multi/demultiplexing circuits formed on a substrate and having a plurality of light input ends, a branching section, a branching section, a plurality of light output ends, and a plurality of arrayed waveguides sandwiched between the branching and branching sections so that incident light from each light input or output end is split and output from the respective light output or input end, and to an optical spectrum analyzer and an optical bandpass filter that use this wavelength division multi/demultiplexer.

2. Description of the Prior Art/Related Art

A wavelength division multi/demultiplexer for multiplexing and demultiplexing light is essential for a wavelength division multiplexing (WDM) system in optical communication. FIG. 1 shows an example of a configuration of a conventional wavelength division multi/demultiplexer. The wavelength division multi/demultiplexer is configured by one 16-input and 16-output arrayed waveguide grating type wavelength division multi/demultiplexing circuit (AWG) formed on a substrate 1 and having a plurality of light input ends 2, a first multiplexing and demultiplexing section (branching section) 3, a second multiplexing and demultiplexing section (multiplexing section) 5, a plurality of light output ends 6, and a plurality of arrayed waveguides 4 sandwiched between the branching section 3 and multiplexing section 5 to split incident light from each light input end 2 (#1, . . . , #16) and to emit it from an optical output end 6 (#1, . . . , #16). In this case, the light input and output ends refer to optical waveguides between the end of the substrate and the multiplexing and demultiplexing section. Of course, the reciprocity of light enables incident light from the light output ends 6 to be distributed to the light input ends 2. Light from a particular light input end is distributed to each arrayed waveguide 4 by the branching section 3. Each distributed light is again mixed together by the multiplexing section 5. The length of each arrayed waveguide 4 is configured by increasing at a constant pitch (referred to as ΔL). In this figure, ΔL=1,271 μm and the number of arrayed waveguides 4 is 64. In FIG. 1, the 16 light input and output ends are named #1, #2, . . . , #16 from top to bottom in this order.

When a fixed light input and a fixed light output ends are used, only a series of optical frequencies offset from the light frequency of incident light by values called a free spectral range (simply referred to as "FSR") can be emitted from this light output end. FIG. 2 shows transmission spectra of two wavelengths that can be transmitted within a wavelength zone between 1549 and 1551.5 nm when the light input end #8 and the light output end #8 are used. This figure shows that the central wavelengths are 1549.7 and 1550.96 nm and that FSR=1.26 nm.

When the light output end is sequentially varied from #1 to #16 with the light input end fixed at #8, the transmission band sequentially shifts toward the long wavelength side as shown in FIG. 3. The amount of shift in the central frequency of the transmission band between adjacent light output ends is called a channel spacing, and is 0.08 nm, that is, 10 GHz in this AWG. The optical loss at the band peak is about 3 dB, and with a ±1 nm offset from the peak, the amount of transmission attenuates by 30 dB or more relative to the peak. As described above, due to its excellent band characteristics, the AWG is highly expected as a wavelength division multi/demultiplexer in wavelength division multi/demultiplexing communication. In the AWG, the multiplicity of the wavelength, that is, the number of channels is determined by the number of light output ends, and the number of channels in the illustrated AWG is 16. To increase the multiplicity, the number of light output ends must be increased. At present, however, the number of channels is limited to about 64. Thus, techniques for substantially increasing the number of channels in a wavelength division multi/demultiplexer using an AWG have been strongly desired.

The field of research and development of a WDM system in optical communication requires an optical spectrum analyzer having a spectrum resolution or an light frequency accuracy of about 1 GHz. The optical spectrum analyzer is an apparatus for measuring as a function of the light frequency the average optical power per unit light frequency over a certain time interval of output light from a light source. Most popular optical spectrum analyzers are diffraction grating optical spectrum analyzers using the spectral action of a diffraction grating. Due to the use of the dependence of the diffraction angle of the diffraction grating on the light frequency, this apparatus uses a motor to rotate the diffraction grating to vary a demultiplexing frequency in order to measure the power of diffracted light at each rotating angle. A movable portion of the diffraction grating is essential for such an optical spectrum analyzer and has degraded long-term stability, reduced the accuracy of measured optical frequencies, and increased the size of the apparatus. Besides, since the diffraction efficiency of the diffraction grating is low and only those of diffracted incident beams which have been transmitted through narrower slits are measured for power, (i) the entire apparatus is subjected to a large optical loss and (ii) the spectrum resolution obtained is at most about 0.08 nm, that is, 10 GH in a 1.5-micron band. Due to these backgrounds, there has been a strong desire for the development of a small high-resolution optical spectrum analyzer that has no movable portion, that is stable over a long time, and that has a high measured-frequency accuracy.

FIG. 4 shows an example of a conventional configuration of an optical spectrum analyzer using an AWG. In FIG. 4, 7 designates a light source, 8 designates an optical fiber, 9 denotes the 16-input and 16-output AWG shown in FIG. 1, and 10 denotes an array of 16 photodetectors attached to the light output end 6 of this division multi/demultiplexer. Optical output from the light source 7 is incident on the light input end #8 of the devision multi/demultiplexer 9 via the optical fiber 8. The power of light split by the multi/demultiplexer 9 is measured by the photodetectors 10. The wavelengths of demultiplexing are arranged at an equal space of 10 GHz as shown in FIG. 3, so the power per unit frequency can be measured for each light frequency using the central frequency of each band and the bandwidth δv. Since the optical spectrum analyzer using the AWG spatially splits incident light so that the photodetector array can simultaneously measure the optical power from each light output end, it is characterized by its measuring time shorter than that of the conventional apparatus. In addition, since this analyzer has no movable portion as in the conventional apparatus and each bandwidth is small, that is, δv=5 GHz, a small and stable optical spectrum analyzer of a high resolution is expected to be provided using the AWG.

Despite these excellent potentials of the optical spectrum analyzer using the AWG, there have been the following critical defects in the conventional configuration. A number of optical frequencies that can be emitted from a particular light output end of the AWG is not single, and there exists a periodicity with which a beam offset from the required beam by FSR=1.28 nm is also emitted from the same light output end, as shown in FIG. 2. When, for example, light from a light source having a bandwidth larger than the FSR is allowed to enter this AWG, as shown in FIG. 5, spectrum components of the light source having frequencies offset from the required frequency by an integer multiple of the FSR are transmitted from each light output end of the AWG as shown in FIG. 6. Thus, if the bandwidth of the light source is larger than the FSR, the spectrum of this light source cannot be measured by simply connecting the photodetectors 10 to the light output end 6 as shown in FIG. 4.

If this high-resolution optical spectrum analyzer is to be configured by using an AWG, the pitch between adjacent arrayed waveguides must be ΔL>2,000 μm and the total number of arrayed waveguides must be 100 or more. Thus, the difference between the longest and shortest arrayed waveguides is 20 cm or more. It is very difficult to produce such a large-scale AWG on a conventional substrate.

The field of research and development of a WDM system requires a stable frequency-variable laser light source that has a variable light frequency. Such a light source is normally implemented by configuring a ring resonator comprising a semiconductor amplifier or fiber optic amplifier and an optical bandpass filter. Thus, optical bandpass filters have been strongly desired that have a stable transmission central frequency and a bandwidth or variable step in the order of GHz.

FIG. 7 shows a configuration of an optical bandpass filter the central wavelength of which can be varied by inclining a dielectric evaporation filter. Reference numerals 11 and 15 denote optical fibers, 12 and 14 are collimator lenses, and 13 is a dielectric evaporation filter. Output beams from the optical fiber 11 are made parallel with each other by the lens 12, propagate through the filter 13, and are incident again on the optical fiber 15 via the lens 14. When the filter 13 is rotated around an axis perpendicular to the sheet of this drawing, the angle at which output beams from the optical fiber 11 are incident on the filter 13 varies to vary the center of the transmission band of the filter 13, thereby enabling this configuration to achieve an optical bandpass with a variable transmission central frequency. A filter with a dielectric multilayer film, however, is disadvantageous in that its transmission bandwidth is at most 1 nm, that is, about 100 GHz in a 1.55 μm band. Another disadvantage is that when the filter is rotated to increase the incident angle of light beams, the loss significantly varies in both directions in parallel with and perpendicular to the incident surface, thereby increasing PDL (that is, polarization dependent loss). Consequently, the implementation of variable optical bandpass filters having a bandwidth of about 10 GHz and a small PDL has been strongly desired.

FIG. 8 shows a configuration of an optical bandpass filter using the AWG 9 shown in FIG. 1. Reference numerals 16 and 18 indicate optical fibers and 17 is a 16×1 optical switch for propagating to the optical fiber 18 light distributed to one of the 16 light output ends #1 to #16 of the AWG 9. The optical fibers 16 and 18 are the light input and output ends of this filter. The optical switch 17 can be used to select one of the optical output ends and thus one of the 16 narrow band optical bandpass filters shown in FIG. 3. As in the optical spectrum analyzer using the AWG, however, the periodic characteristics of the AWG involves this filter with all optical bandpasses offset from the same light output end by an integer multiple of the FSR, so this filter does not provide a narrowband optical bandpass if the spectrum width of incident light is larger than the FSR.

As described above, a problem of the AWG is that it is very difficult for it to provide several hundred channels, and the development of new techniques for substantially increasing the number of channels in the AWG has been strongly desired. Another problem is that when the optical spectrum analyzer is to be configured by using the AWG, beams of wavelengths of frequencies offset from the required frequency by an integer multiple of the FSR pass through, so a large frequency range cannot be covered easily.

Furthermore, the AWG in which a channel spacing is narrow is indispensable in the optical spectrum analyzer using the AWG. However, this type inevitably becomes a large scale in accordance with the conventional configuration. Accordingly, there was such a large problem as to how this type could be downsized.

The conventional optical bandpass filter has a bandwidth of at most about 1 nm and a large PDL, so the development of optical bandpass filters that enable the band to be further narrowed and that provide a small PDL has been strongly desired. Although the AWG enables the transmission bandwidth to be reduced to 10 GHz or less, beams of wavelengths of frequencies offset from the required frequency by an integer multiple of the FSR pass through, so it is difficult to use the conventional configuration to provide an optical bandpass filter that can be operated over a wide frequency range.

SUMMARY OF THE INVENTION

An object of this invention is to solve these problems.

To attain this object, a wavelength division multi/demultiplexer according to this invention is a wavelength division multi/demultiplexer for multi/demultiplexing incident light to emit demultiplexed light from each of a plurality of light output ends, characterized by comprising:

a first wavelength division multi/demultiplexing circuit having at least one light input end and a plurality of light output end; and at least one second wavelength division multi/demultiplexing circuit of an arrayed waveguide grating type formed on a substrate, including a plurality of light input and output ends, one or two light multiplexing and demultiplexing sections, and a plurality of arrayed waveguides, and having a transmission bandwidth different from that of the first wavelength division multi/demultiplexing circuit, the transmission bandwidth indicating the width of an light frequency that can pass through each light input and output end, wherein the first wavelength division multi/demultiplexing circuit and at least one of the second wavelength division multi/demultiplexing circuits one optically connected together, and wherein the light output ends of the final second wavelength division multi/demultiplexing circuit being used as the light output ends of the wavelength division multi/demultiplexer.

The number of channels can be significantly increased by connecting together wavelength division multi/demultiplexing circuits having different transmission bandwidths. Each of the transmission bandwidths is preferably twice or more larger or smaller than the others.

In this case, at least one of the first and second wavelength division multi/demultiplexing circuits has a wider free spectral range than the other, the free spectral range indicating the period of a split light frequency. That is, the number of channels is increased by connecting to the division multi/demultiplexer at least one AWG that meets the following bandwidth condition.

[Equation 1]

$$FSR > \delta v \quad (1)$$

The condition in Equation (1) is used so that the periodic characteristics of the AWG allows the first wavelength division multi/demultiplexing circuit to cut off light of frequencies offset from the required frequency by an integer multiple of the FSR, thereby uniquely limiting the light frequency from each light output end of the AWG.

In this case, the first wavelength division multi/demultiplexing circuit may be an arrayed waveguide grating type wavelength division multi/demultiplexing circuit.

At least one of the first and second wavelength division multi/demultiplexing circuits may be a reflecting arrayed waveguide type optical demultiplexing circuit having a plurality of light input ends, a multiplexing and demultiplexing section, and a plurality of arrayed waveguides, wherein each of the arrayed waveguides connected to the multiplexing and demultiplexing section has a diverging region in which the arrayed waveguides diverge, a following converging region in which the arrayed waveguides converge together, and a following parallel area in which the arrayed waveguides are parallel with one another, and wherein a reflecting plate or a quarter-wave with a reflecting mirror provided on the surface opposite to arrayed waveguides is disposed in a groove or gap crossing all the arrayed waveguides in the parallel area or at the terminal of this area.

At least one of the first and second wavelength division multi/demultiplexing circuits can be a reflecting arrayed waveguide type optical demultiplexing circuit having a plurality of light input ends, a multiplexing and demultiplexing section, and a plurality of arrayed waveguides, wherein each arrayed waveguide has immediately after the connection with the multiplexing and demultiplexing section, a first parallel area in which all arrayed waveguides are parallel with one another, a following diverging region in which the arrayed waveguides diverge, the following converging region in which the arrayed waveguides converge together, and a second parallel area in which the arrayed waveguides are parallel with one another, wherein a groove crossing all arrayed waveguides is provided within the first or second parallel area or at the terminal of the second parallel area, wherein a phase compensating plate is disposed in the groove, wherein a quarter-wave plate is disposed at the terminal of the second parallel area, and wherein a reflecting mirror is provided on the surface of the wavelength plate opposite to the arrayed waveguides.

At least one of the first and second wavelength division multi/demultiplexing circuits can be an arrayed waveguide type optical demultiplexing circuit having a plurality of light input ends, a first multiplexing and demultiplexing section, a second multiplexing and demultiplexing section, a plurality of arrayed waveguides formed between the first and second multiplexing and demultiplexing sections, and a plurality of light output ends, wherein a plurality of combinations of a diverging region in which the arrayed waveguides diverge and a following converging region in which the arrayed waveguides converge together are disposed between the first and second multiplexing and demultiplexing sections, wherein a parallel area in which the arrayed waveguides are parallel with one another is disposed between adjacent ones of the plurality of combinations, wherein a groove crossing all the arrayed waveguides is provided within the parallel area, wherein a half-wave plate or a phase plate is placed in the groove and wherein a quarter-wave plate or phase compensating plate is placed in the parallel area or at the terminal of this area.

A second parallel area in which the arrayed waveguides are parallel with one another is disposed between the second multiplexing and demultiplexing section and one of the combinations that is adjacent to the second multiplexing and demultiplexing section. A reflecting plate or a quarter-wave plate with a reflecting mirror provided on the surface opposite to the arrayed waveguides is disposed at the terminal of the second parallel area.

The first and second wavelength division multi/demultiplexing circuits may be connected together via an optical switch.

The second wavelength division multi/demultiplexing circuit may be connected in series to the first wavelength division multi/demultiplexing circuit.

The arrayed waveguide grating type wavelength division multi/demultiplexing circuits other than one of the series connected wavelength division multi/demultiplexing circuits that has the maximum transmission bandwidth preferably includes another wavelength division multi/demultiplexing circuit such as that has a transmission bandwidth narrower than the width of the free spectral range of the arrayed waveguide grating type wavelength division multi/demultiplexing circuits.

The arrayed waveguide grating type wavelength division multi/demultiplexing circuits within the plurality of wavelength division multi/demultiplexing circuits preferably meet the following continuity condition:

$$|FSR - M \times ch| \leq \kappa \delta v$$

where FSR is the width of the free spectral range of the arrayed waveguide grating type wavelength division multi/demultiplexing circuits, ch is a channel spacing indicating the interval between optical frequencies distributed to adjacent light output ends, M is the number of light output ends used for connection with the following wavelength division multi/demultiplexer, $\delta v$ is a transmission bandwidth, and $\kappa$ is a constant. All the optical frequencies distributed to the M light output ends are preferably contained within the same free spectral range. $\kappa$ is within the range of $0 \leq \kappa \leq 2.0$ and particularly preferably close to 1. If the wavelength division multi/demultiplexer is used for an optical spectrum analyzer, the following cyclicity condition:

[Equation 2]

$$|FSR - M \times ch| \leq \kappa \delta v \quad (2)$$

can be imposed on the AWG used so as to prevent measured optical frequencies from missing, thereby enabling the measured frequencies to be set so as to be constantly arranged at a specified interval with an error almost equal to the bandwidth.

An optical switch can be provided to connect the series connected arrayed waveguide grating type wavelength division multi/demultiplexing circuits. The optical switch can have at least one set of a 1×N optical switch for connecting N specific light input ends of the arrayed waveguide grating type wavelength division multi/demultiplexing circuit to one light input end of the wavelength division multi/demultiplexing circuit arranged as a prestage of this arrayed waveguide grating type wavelength division multi/demultiplexing circuit; and an M×1 optical switch for connecting M specific light output ends of the arrayed waveguide grating type wavelength division multi/demultiplexing circuit to one light output end of the wavelength division multi/demultiplexing circuit arranged as a poststage of this arrayed waveguide grating type wavelength division multi/demultiplexing circuit.

In this case, L is defined as the number of spectra into which light can be demultiplexed within the free spectral range by means of the arrayed waveguide grating type wavelength division multi/demultiplexing circuit with the one-input and multiple-output optical switch and multiple-input and one-output optical switch connected thereto. A minimum set of light input and output ends required to demultiplex light into L spectra are selected and their numbers are defined as N and M, respectively. Then, the light input and output ends of the prestaged and poststaged wavelength division multi/demultiplexing circuits can be connected together via the 1×N and M×1 optical switches.

The poststaged optical demultiplexing circuit connected to the prestaged optical demultiplexing circuit via the 1×N optical switch can be the reflecting arrayed waveguide type optical demultiplexing circuit. The 1×N optical switch and one of the input ends of the reflecting arrayed waveguide type optical demultiplexing circuit are connected together via an optical circulator, while the remaining input ends of the arrayed waveguide type optical demultiplexing circuit and the other output ends of the optical circulator are used as the light output ends of the arrayed waveguide type optical demultiplexing circuit.

A plurality of second wavelength division multi/demultiplexing circuits may be connected in parallel to the first wavelength division multi/demultiplexing circuit.

The arrayed waveguide grating type wavelength division multi/demultiplexing circuits corresponding to either the first wavelength division multi/demultiplexing circuit or plurality of second wavelength division multi/demultiplexing circuits can meet the following continuity condition:

$$|FSR - M \times ch| \leq \kappa \delta v$$

where FSR is the width of the free spectral range of the arrayed waveguide grating type wavelength division multi/demultiplexing circuit, ch is a channel spacing, that is, the interval between optical frequencies distributed to adjacent light output ends, M is the number of light output ends used for connection with the following wavelength division multi/demultiplexer, $\delta v$ is a transmission bandwidth, and $\kappa$ is a constant that meets $0 \leq \kappa \leq 2.0$. All the optical frequencies distributed to the M light output ends can be contained within the same free spectral range.

One of two specific light output ends of the first wavelength division multi/demultiplexing circuit may be connected to one of the light input ends of the plurality of second wavelength division multi/demultiplexing circuits, while the other may be connected to one of the light output ends of the plurality of second wavelength division multi/demultiplexing circuits.

A preferable configuration is described. In the first and second wavelength division multi/demultiplexing circuits, N×ch is almost equal to M×FSR and N is smaller than the total number of channels in the first wavelength division multi/demultiplexing circuit where ch is the channel spacing of the first wavelength division multi/demultiplexing circuit, FSR is the free spectral range of the second wavelength division multi/demultiplexing circuit, andN andM are integers. The light output ends of the first wavelength division multi/demultiplexing circuit providing demultiplexing frequencies sequentially shifted by the channel spacing are sequentially named #2, #3, . . . , #i, . . . wherein the light output end #1 provides the shortest or longest demultiplexing frequency. (#1, #N+1), (#2, #N+2), . . . , (#i, #N+i) are selected as sets of light output ends of the first wavelength division multi/demultiplexing circuit. One of the light input and output ends of the second wavelength division multi/demultiplexing circuits are selected and connected to the selected sets of light output ends (#i, #N+i) of the first wavelength division multi/demultiplexing circuit so that the transmission bandwidth of each set of light output ends (#1, #N+i) does not overlap the transmission band of the second wavelength division multi/demultiplexing circuit.

Preferably, an optical circulator is connected to each selected light output end of the first wavelength division multi/demultiplexing circuit, and the output ends of the optical circulator are connected to the light input and output ends of the second wavelength division multi/demultiplexing circuit.

Predetermined first and second light output ends of the first wavelength division multi/demultiplexing circuit and predetermined first and second light input and output ends of the same circuit to which the second wavelength division multi/demultiplexing circuit is connected may be determined as a combination with which optical powers distributed from the first output ends to the second light input and output end and optical power distributed from the second output end to the first light input and output end are negligibly smaller than the optical powers distributed to the remaining light input and output ends.

Furthermore, a group of parallel connected wavelength division multi/demultiplexing circuits may be configured by multi/demultiplexing into a plurality of wavelength sub-zones, a wavelength zone that can be uniquely demultiplexed by one of the wavelength division multi/demultiplexing circuits and connecting the plurality of series connected wavelength division multi/demultiplexing circuits via optical switches or transmission media to the light output ends of the wavelength division multi/demultiplexing circuit corresponding to the demultiplexed wavelength sub-zones.

Alternatively, the light input and output ends or light output ends of the final wavelength division multi/demultiplexing circuit of the group of wavelength division multi/demultiplexing circuits may be connected to a new wavelength division multi/demultiplexer via a one-input and multiple output optical switch.

In this case, the parallel connection may be provided repeatedly.

An optical spectrum analyzer according to this invention is an optical spectrum analyzer for measuring as a function of the light frequency the average optical power per unit frequency of output light from a light source, characterized by comprising the wavelength division multi/demultiplexer, a light source for allowing light to enter the wavelength division multi/demultiplexer, a plurality of photodetectors connected to each of the plurality of light output ends of one second wavelength division multi/demultiplexing circuit or to each the plurality of light output ends of the final one of a plurality of second wavelength division multi/demultiplexing circuits, and a signal processing means for measuring an average of optical powers that reach the plurality of photodetectors and determining an average light intensity per unit frequency relative to the demultiplexing frequency distributed to each photodetector.

By connecting via an optical switch each light output end of at least one first wavelength division multi/demultiplexing circuit to an AWG that meets the bandwidth condition in Equation (1) that the free spectral range FSR is larger than the bandwidth by of the first wavelength division multi/demultiplexing circuit, the periodic characteristics of the AWG allows the first wavelength division multi/demultiplexer to cut off light of frequencies offset from the required frequency by an integer multiple of the FSR, thereby uniquely limiting the light frequency from each light output end of the AWG. The spectrum of the light source can be measured by connecting the light input and output ends of the wavelength division multi/demultiplexing circuits together using an optical switch, connecting the photodetectors to the light input and output ends of the wavelength division multi/demultiplexer, sequentially implementing those of all combinations determined by turn-on and -off of each switch in which only a specific set of optical frequencies are distributed to these photodetectors, and measuring the optical power received by each photodetector in each of these combinations. The AWG desirably meets the continuity condition in Equation (2) so as to prevent measured frequencies from missing.

A polarization beam splitter is disposed between the optical switch and the light input ends of the wavelength division multi/demultiplexing circuit connected by the optical switches so that a P wave in which the direction of polarization spatially split by the polarization beam splitter is parallel with the incident surface of the polarization beam splitter and an S wave in which the polarization direction is perpendicular to the incident surface of the polarization beam splitter can independently enter the connected wavelength division multi/demultiplexing circuit. In an AWG of channel spacing 10 GHz, the central frequency of the transmission band often differs between a TE and a TM modes. The dependence on polarization can be eliminated by using the polarization beam splitter to split light input on the AWG and that depends on polarization, into the P and S waves beforehand and exciting each of these waves as a specific mode (for example, the TE mode) of the AWG that depends on polarization.

Preferably, a polarization optical switch is arranged between the optical switch and the light input ends of the arrayed waveguide grating type wavelength division multi/demultiplexing circuit connected by the optical switch. The polarization optical switch comprises a polarization beam splitter, an optical transmission system for independently propagating the P and S waves spatially split by the polarization beam splitter, an optical system for spatially rotating one of the P and S waves to align its polarization direction with the polarization direction of the S or P wave, an optical switch for allowing either the P or S wave or the S or P wave that has been spatially rotated by 90° to enter the light input end of the arrayed waveguide grating type wavelength division multi/demultiplexing circuit in the same principal axis mode. The optical spectrum can be measured polarization independent by measuring the optical output when the optical switch is used to allow the P or S wave to enter the light input end and then determining the sum of both optical outputs.

The circuit further comprises two optical transmission lines for connecting the polarization beam splitter to the N×1 optical switch that connects the prestaged wavelength division multi/demultiplexing circuit and the poststaged arrayed waveguide type wavelength division multi/demultiplexing circuit, and spatially multi/demultiplexing the P and S waves split by the polarization beam splitter to independently propagate the split waves; a polarization control mechanism for connecting one of the two optical transmission lines to one light input end of the arrayed waveguide type wavelength division multi/demultiplexing circuit via a first optical circulator while connecting the other optical transmission line to one light output end of the arrayed waveguide type wavelength division multi/demultiplexing circuit via a second optical circulator, in such a way that the mechanism excites upon light incidence only the principal axis of the propagation mode TE or TM of the arrayed waveguide type optical demultiplexing circuit; and a photodetector array for measuring the optical output from the light output ends and second optical circulator and the optical output from the light input ends and first optical circulator, the optical outputs resulting from light incidence on the light input and output ends of the arrayed waveguide type optical demultiplexing optical circuit.

In this configuration, the multiple-input and one-output optical switch inputs a large number of optical outputs from a wavelength division multi/demultiplexing circuit to one specific light input end of the following AWG. The polarization beam splitter is disposed immediately before the incidence on the light input end of the AWG to split the incident light into the P and S waves. One (P wave) of the split waves is allowed to enter one specific light input end (for example, #1) of the AWG using the TE or TM polarization, while the other (S wave) is allowed to enter one specific light output end (for example, #1) of the AWG using the same polarization as in the P wave (that is, TE or TM). The wavelength division multi/demultiplexing characteristic of the AWG are symmetrical in the lateral direction, so that the wavelength division multi/demultiplexing characteristic obtained using incidence on the light input end are the same as that obtained using incidence on the light output end. Thus, the optical powers of output light from the light output and input ends resulting from the incidences of the P and S waves and having the same demultiplexing frequency can be added together to construct an optical spectrum analyzer that does not depend on the polarization of incident light. However, in order to obtain a split output from the one specific light output end (#1) and one specific light input end (#1) used for the light incidence on the AWG, the outputs of the P and S waves are passed through the optical circulator and allowed to enter the AWG so that the circulator can extract light distributed to the used light output and input ends (#1, #1).

An optical bandpass filter according to this invention is an optical bandpass filter having a variable central frequency, having light input and output ends and passing through the light output through the light output end, only specific frequency components of light input on the light input end, characterized by comprising the wavelength division multi/demultiplexer and an optical switch for sequentially selecting each light output end of the wavelength division multi/demultiplexer.

The optical bandpass filter is configured so that by connecting via the optical switch the light input and output ends of a plurality of wavelength division multi/demultiplexing circuits (at least one of them is an AWG) that meet the bandwidth condition equation (1), the periodic characteristics of the AWG allows the first wavelength division multi/demultiplexing circuit to cut off light of frequencies offset from the required frequency by an integer multiple of the FSR, thereby uniquely limiting the light frequency from each light output end of the AWG. The band central frequency is scanned by optically connecting the light input and output ends of the wavelength division multi/demultiplexing circuits together using the optical switch, setting a light input end of a wavelength division multi/demultiplexing circuit and an output end of another wavelength division multi/demultiplexing circuit as a light input and a light output ends of the optical bandpass filter, and sequentially implementing those of all combinations determined by turn-on and -off of each switch in which only a specific set of optical frequencies are incident through the specified light input end and are distributed to the specified light output end. In order to prevent measured frequencies from missing, the AWG desirably meets the continuity condition in Equation (2).

The above and other objects, effects, features and advantages of the present invention will become more apparent from the following description of embodiments thereof taken in conjunction with the accompanying drawings.

BRIEF DESCRIPTION OF THE DRAWINGS

FIGS. 19A and 19B show an example of a configuration of a 1×4 optical switch;

FIGS. 27(A), 27(B), 27(C), 27(D) show a configuration of a polarization optical switch;

DETAILED DESCRIPTION OF PREFERRED EMBODIMENTS

The present invention will be described below in detail with reference to the drawings.

Figure 1:
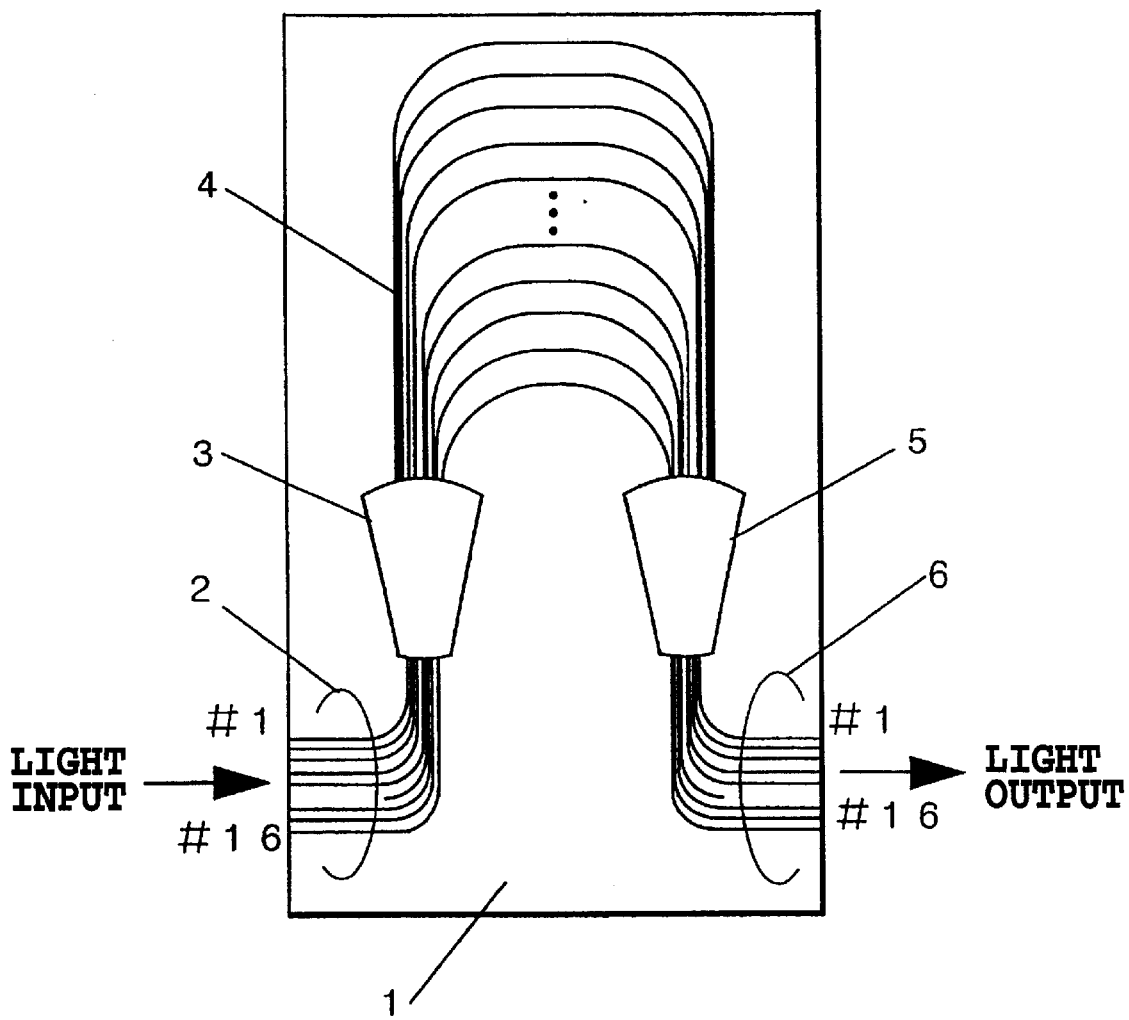
FIG. 1 shows a configuration of an AWG.
Figure 2:
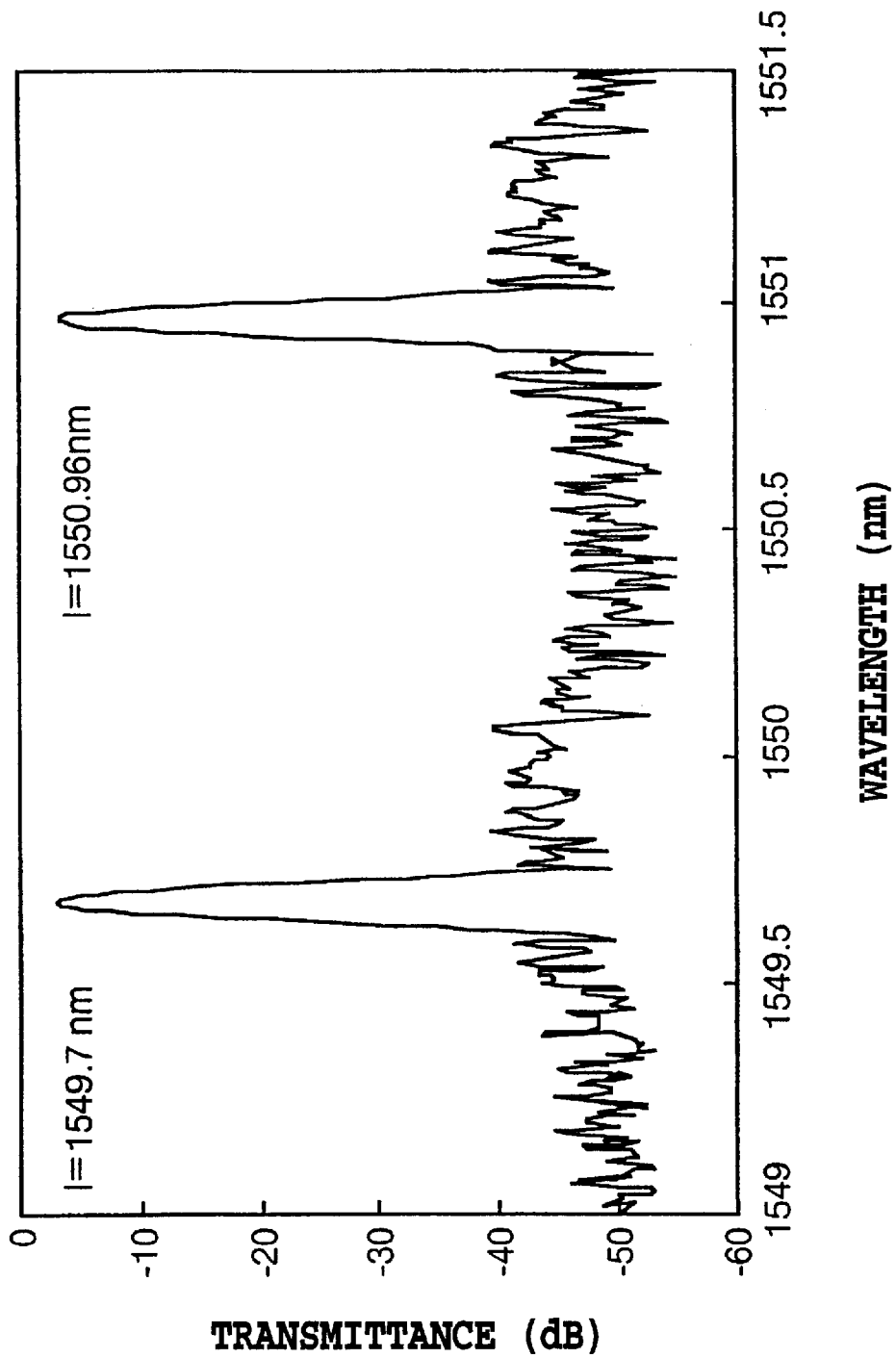
FIG. 2 shows the wavelength multi/demultiplexing characteristic of a specific light input end of the AWG.
Figure 9:
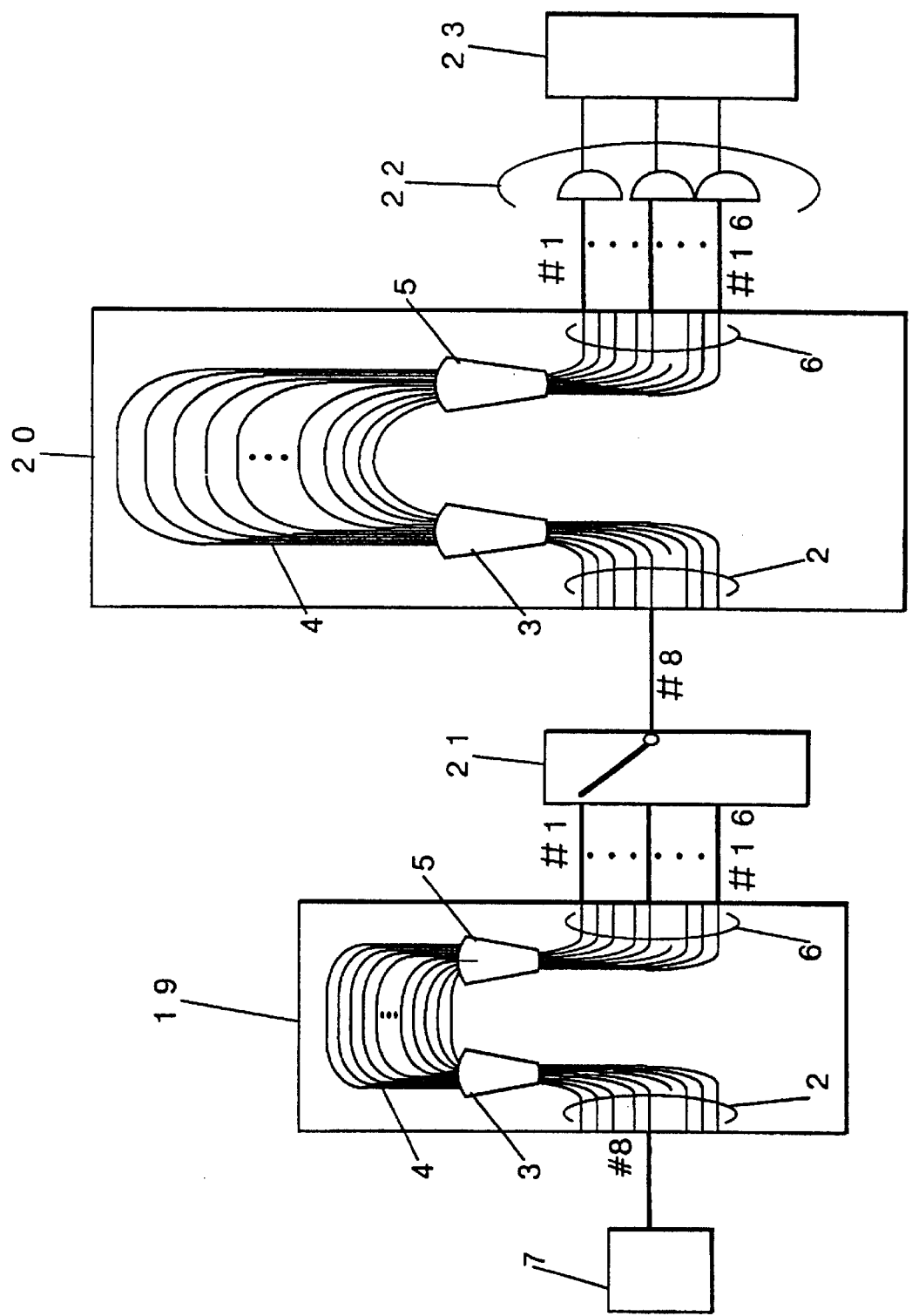
FIG. 9 shows a first embodiment of an optical spectrum analyzer using a wavelength division multi/demultiplexer according to this invention.
Figure 20:
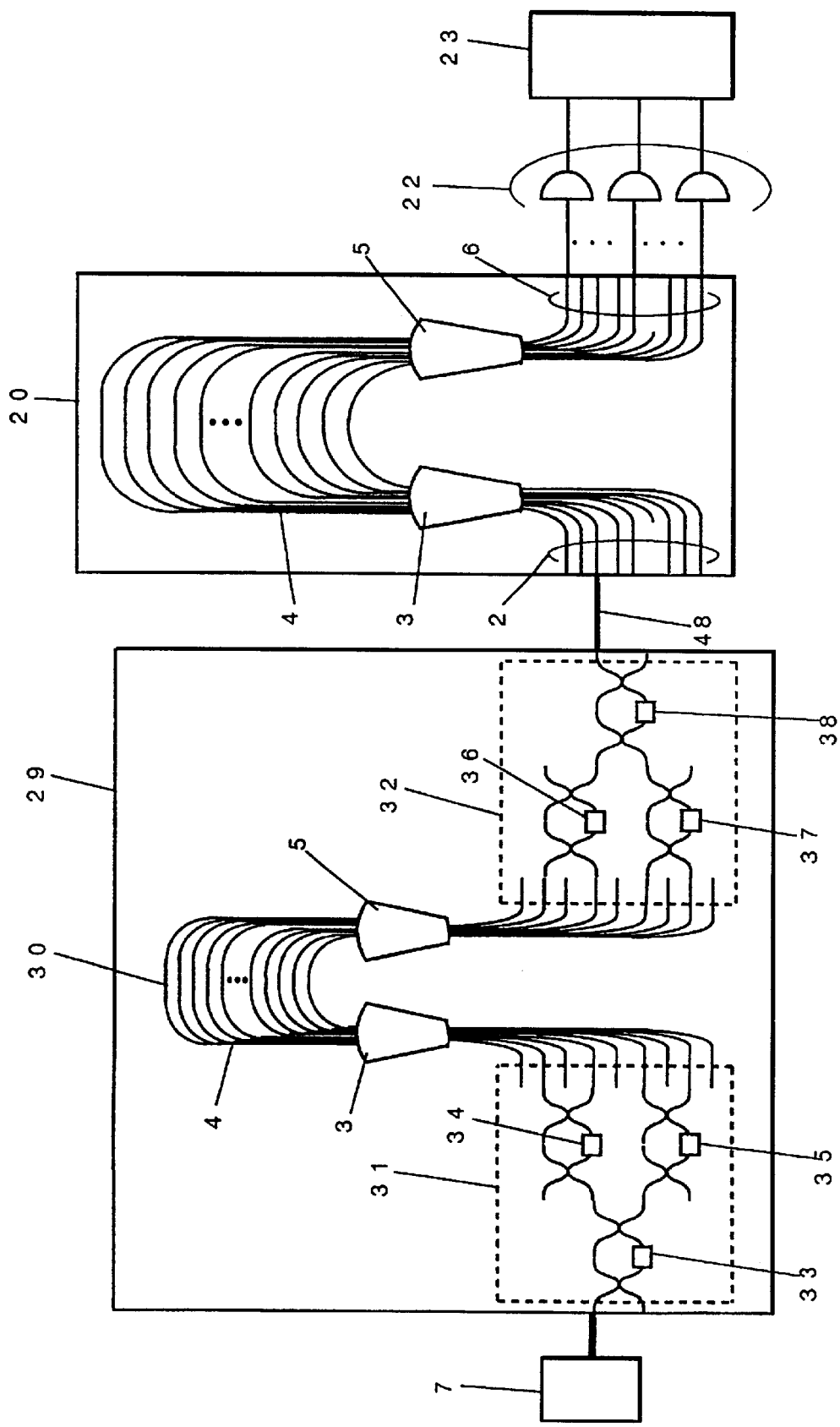
FIG. 20 shows a fourth embodiment of an optical spectrum analyzer using the wavelength division multi/demultiplexer according to this invention.

FIG. 9 shows a first embodiment of a wavelength division multi/demultiplexer and an optical spectrum analyzer according to this invention. Two AWGs 19, 20 are connected in series (that is, a cascade) by a 16×1 optical switch 21 to constitute a wavelength division multi/demultiplexer. The configuration of the AWGs 19, 20 is the same as in the AWG shown in FIG. 1. Thus, similar components have the same reference numerals, and their description is omitted. In FIG. 9, 19 and 20 are each a 16×16 AWG, and the channel spacing $ch_1$ of the AWG 19 is 100 GHz (0.8 nm in a 1.5 μm band), while the channel spacing $ch_2$ of the AWG 20 is 10 GHz (0.08 nm in the 1.5-μm band). With respect to the transmission band waveform, the AWGs 19, 20 have a flat top type of width $\delta v_1$=78 GHz and a Gaussian type of full width at half maximum $\delta v_2$=5 GHz. The free spectral range $FSR_1$ of the AWG 19 is $ch_1 \times 16$=1.6 THz (12.8 nm in the 1.5-μm band), while the free spectral range $FSR_2$ of the AWG 20 is $ch_2 \times 16$=160 GHz (1.28 nm in the 1.5-μm band).

Figure 3:
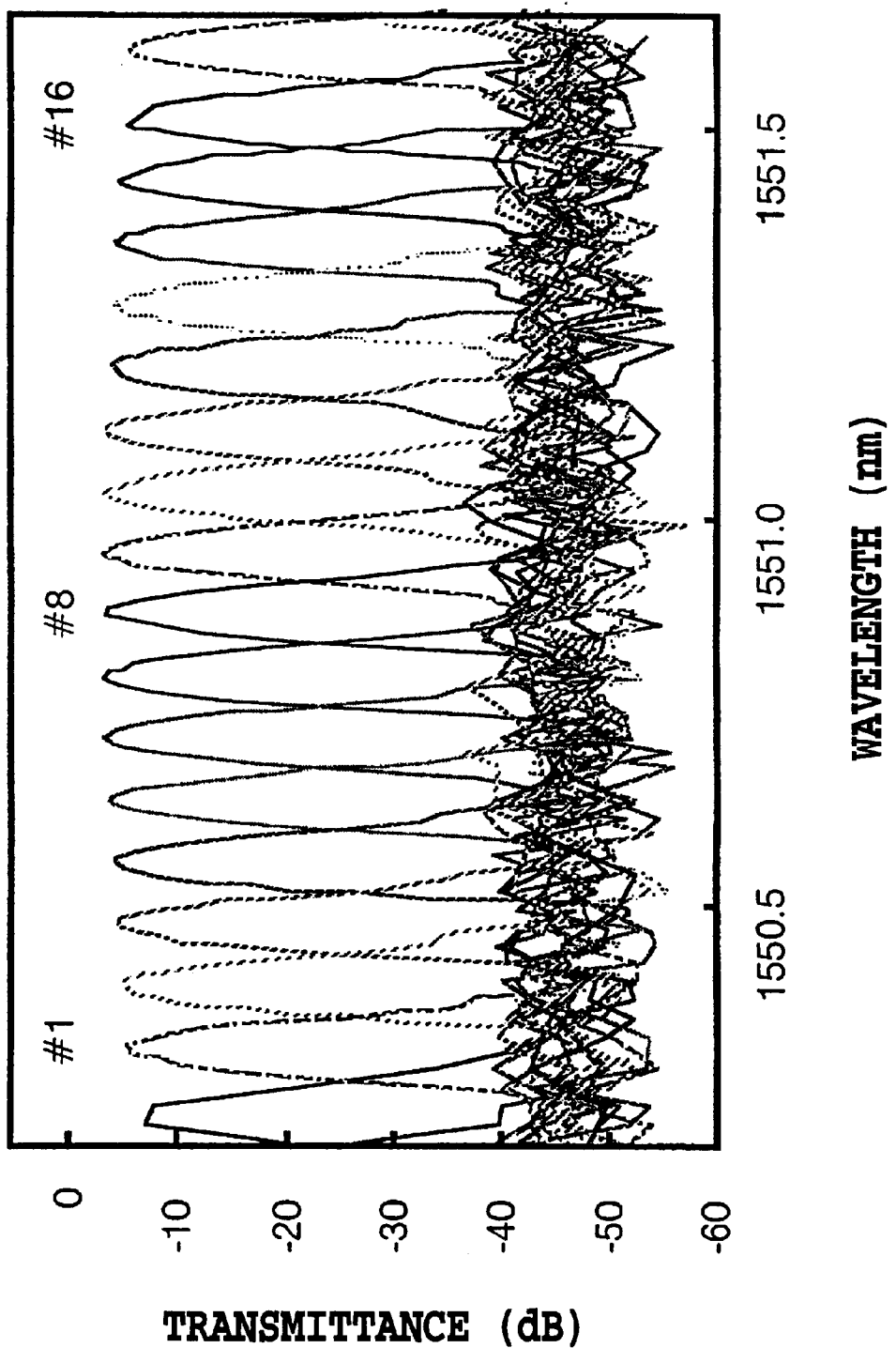
FIG. 3 shows the wavelength multi/demultiplexing characteristics of all the ports of the AWG.
Figure 10:
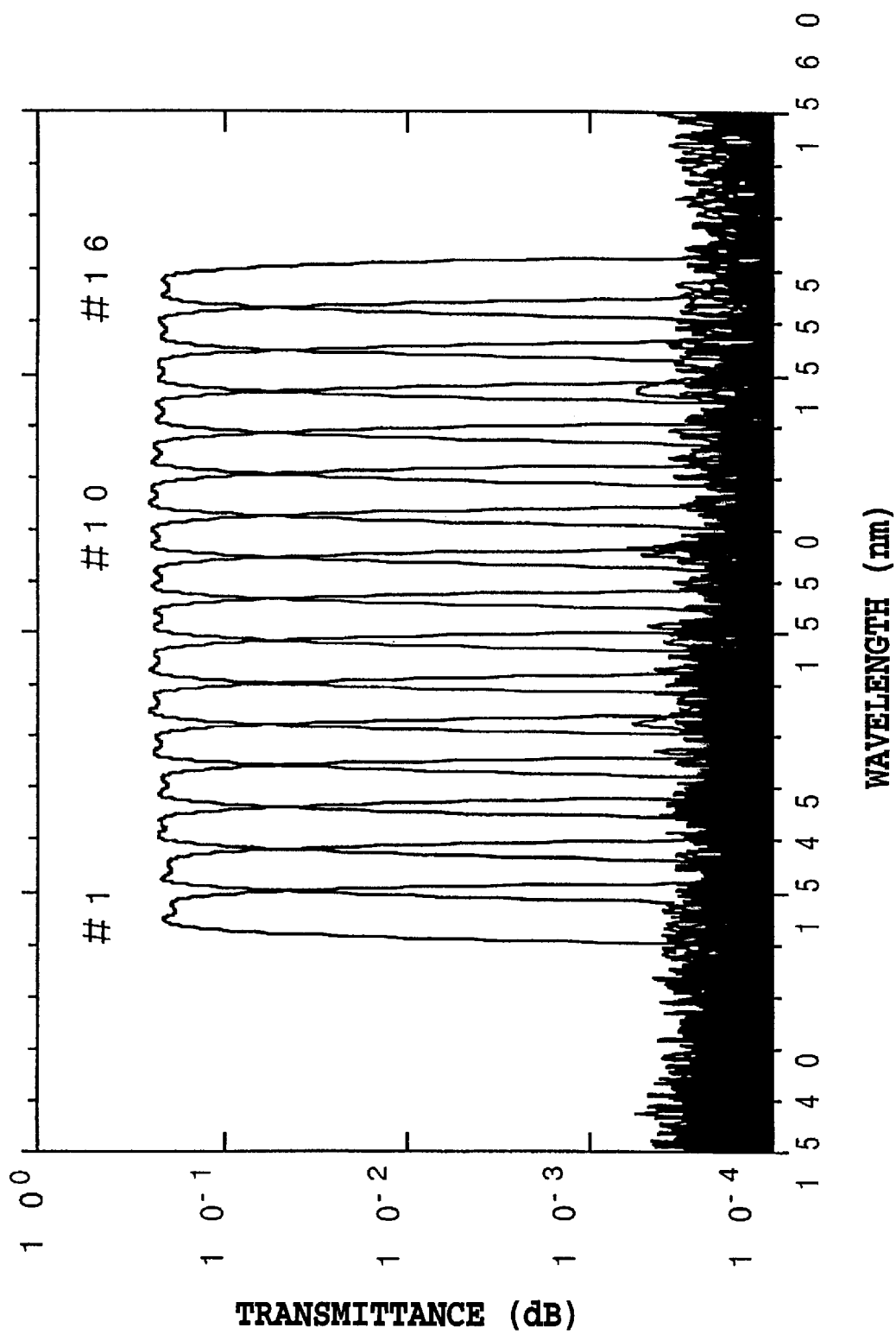
FIG. 10 shows demultiplexing spectra of all 16 ports.

FIG. 10 shows demultiplexing spectra obtained from all the light output ends of the leading AWG 19. FIG. 3 shows demultiplexing spectra obtained from the following AWG 20. Thus, the condition shown in Equation (1) for eliminating the periodicity, that is, $FSR_2 > ch_1$ is established for these two AWGs.

In FIG. 9, 21 is an optical switch installed to allow an optical output from each of the light output ends #1, ..., #16 of the leading AWG 19 to enter an light input end #8 (that is, an ON condition) or to cut off such an optical output (that is, an OFF condition). Reference numeral 22 is a photodetector array for receiving an optical output power from each light output end of the following AWG 20, and 23 is a signal processing system for processing output from each photodetector array. The signal processing system 23 comprises, for example, a function that determines from an output from a photodetector m (m=1, 2, ..., M) the average of optical powers $P_{b,m}$ that are emitted from a light source and then reach the photodetector, for each case (b) (=1, 2, ..., R) of those of all the combinations of the ON and OFF conditions of each switch in which only one set of optical frequencies are distributed to the photosensor m (m=1, 2, ..., M); a calculation device for determining the average light intensity per unit frequency for each demultiplexing frequency from a series of measurement results ($v_{b,m}$, $P_{b,m}$) and $\delta v_{b,m}$ where $v_{b,m}$ and $\delta v_{b,m}$ are the light frequency and transmission bandwidth distributed to the photodetector (m); and a display device for the calculation device.

Figure 11:
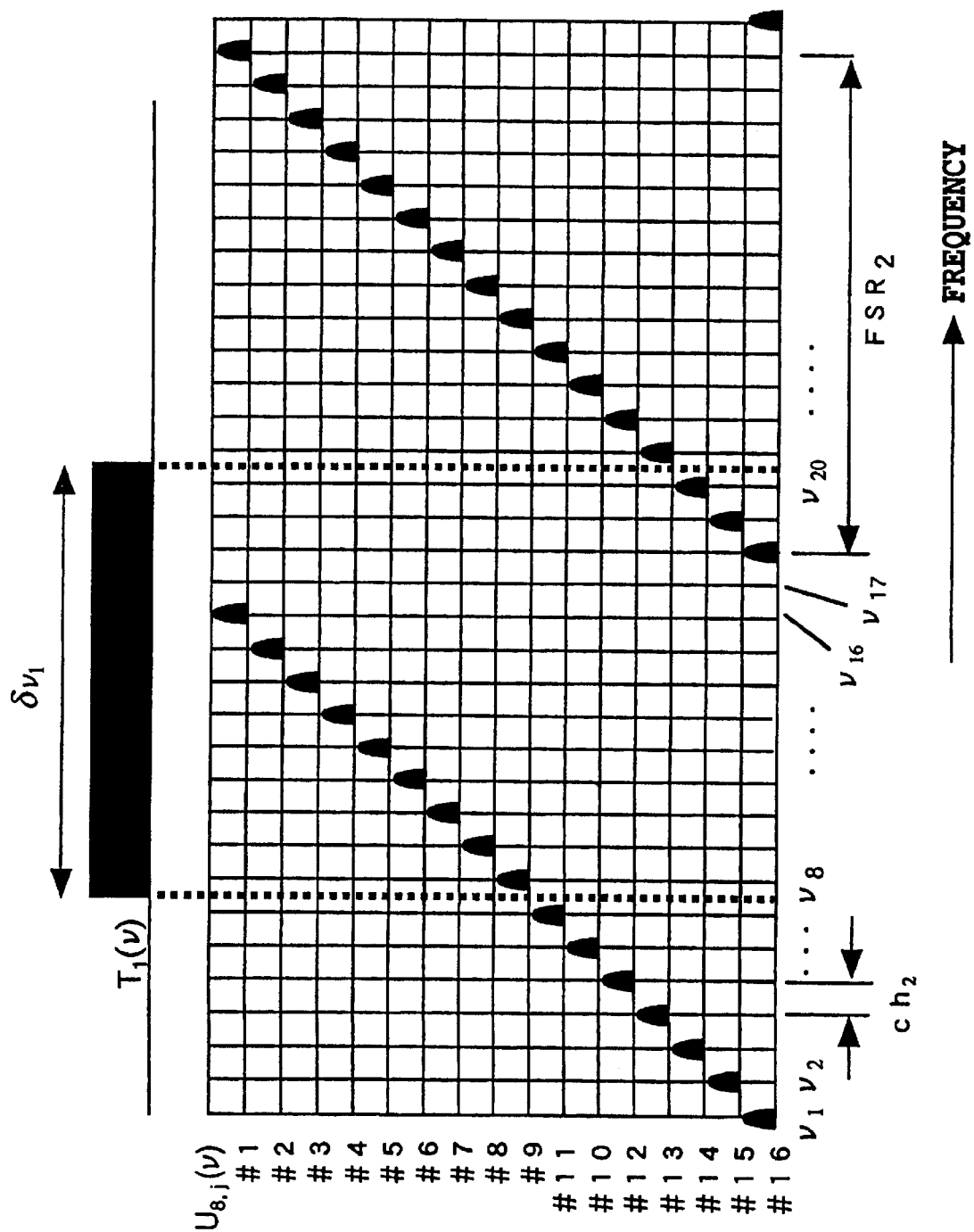
FIG. 11 shows the relationship between transmission spectra of two AWGs (if the cyclicity condition is not met)

The spectrum of output light from a light source 7 is defined as S(v). Output light from the light source is incident on the leading AWG 19 through the light input end #8. If the width $\delta v$ of S(v) is smaller than the $FSR_1$ (=1.6 THz=12.8 nm in the 1.52 μm), S(v) is sliced by the AWG 19 into 16 rectangular spectra $S(v) \times T_i(v)$ each having a bandwidth $\delta v_1$ and a central frequency shifted by $ch_1$=100 GHz, and these spectra are distributed to light output ends #i (i=1, 2, ..., 16). $T_i(v)$ are optical transmission spectra that are allowed by the leading AWG 19 to enter the light input end #8 and that are distributed by the AWG 19 to the light output ends #i. Light distributed to each light output end is allowed to enter an input end #8 of the following AWG 20 via the optical switch 21. FIG. 11 shows the relationship between the transmission spectra $T_1(v)$ (the painted-out trapezoid in the figure) of output light from the output end #1 after division by the leading AWG 19 and the transmission spectra $U_{8,j}(v)$ (the group of painted-out Gaussian spectra in FIG. 11) of light distributed to all 16 light output ends #j (j=1, 2, ..., 16) when the light is allowed to enter the following AWG 20 through the light input end #8. The spectra of light distributed to each light output end when output light from the light output end #1 of the leading AWG 19 is allowed to enter the light input end #8 of the following AWG 20 can be expressed as $S(v) \times T_1(v) \times U_{8,j}(v)$. In the following AWG 20, the central frequencies of beams distributed to the 16 light output ends #1, #2, ..., #16 are distributed at an equal space $\Delta v$, for example, $\|_1, v_2, \ldots, \|_{16}$.

Figure 12:
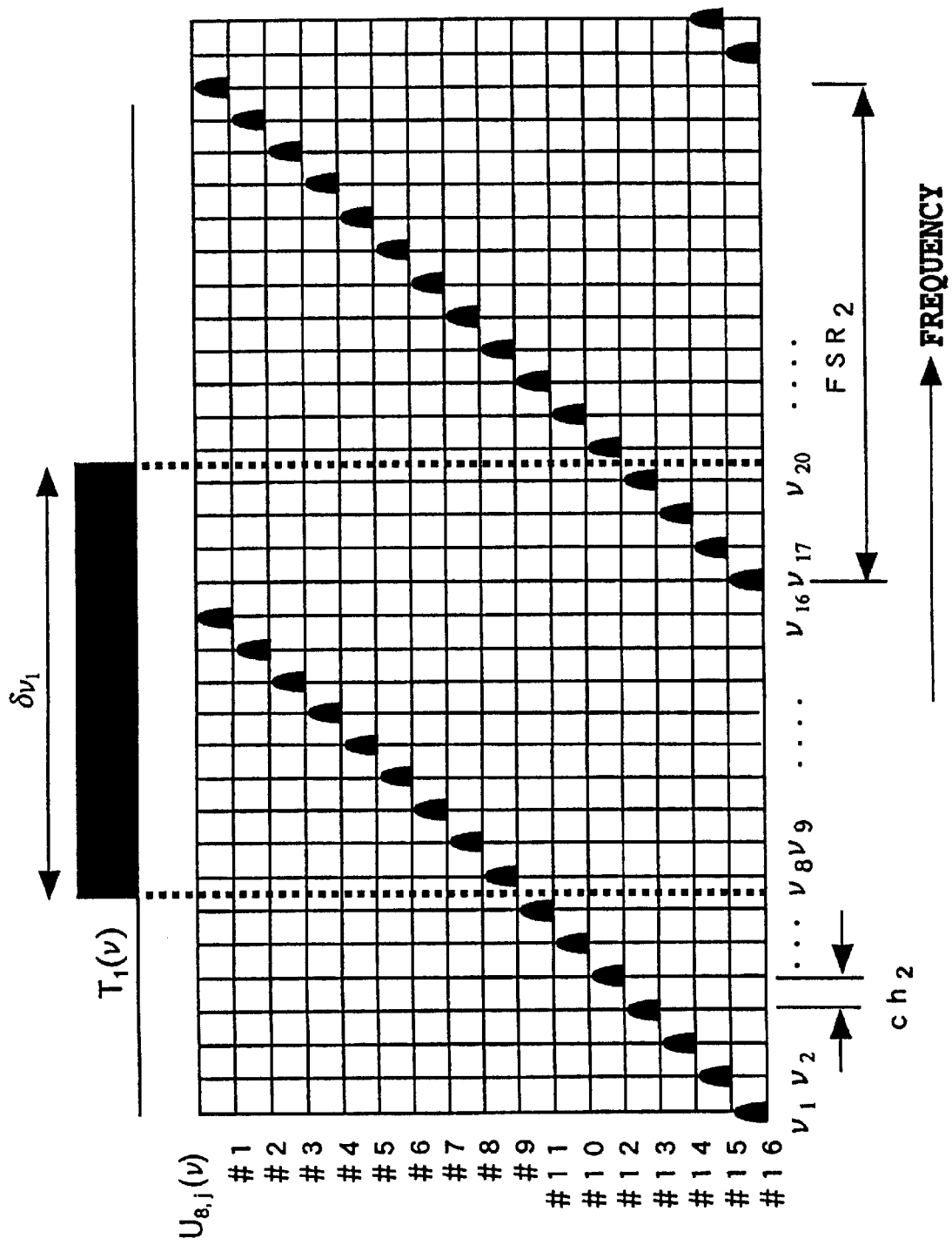
FIG. 12 shows the relationship between transmission spectra of two AWGs (if the cyclicity condition is met)

FIG. 11 shows that as long as the bandwidth condition shown in Equation (1), that is, $FSR_2 > \delta v_1$ is met, sliced beams with Gaussian spectra having central frequencies $v_{16}, v_{15}, \ldots, v_8$ are distributed to the light output ends #1 to #9 of the following AWG 20 while sliced beams of the Gaussian waveforms having central frequencies $v_{20}, v_{19}, \ldots v_{18}$ are distributed to the light output ends #14 to #16, thereby preventing sliced spectra with frequencies equal to an integer multiple of the $FSR_2$ from being mixed at the same light output end. FIG. 11, however, shows that due to the inappropriate connectivity of demultiplexing frequencies at #1 and #16, light having the central frequency $v_{17}$ is missing. In order to prevent measured light frequencies from missing, the jumping of frequencies at #1 and #16 based on the periodicity may be made equal to the channel spacing. This condition is equivalent to $N \times ch_2 = FSR_2$ (where N is the number of light output ends), which is the exact condition required for the cyclicity of the AWG. However, as long as the value of $|FSR_2-N \times ch_2|$ is within the transmission bandwidth $\delta v_2$, no specific frequency is missing, so no practical problem occurs even if the cyclicity condition is reduced to $|FSR_2-N \times CH_2| \leq \kappa \delta v_2$ as shown in Equation (2). In this case, $\kappa$ is within the range of $0 \leq \kappa \leq 2.0$, and particularly preferably close to 1. FIG. 12 indicates that under this cyclicity condition, all split light frequencies are distributed at an equal space to prevent any frequencies from missing.

Likewise, even when output light from #i (i=1, 2, ..., 16) of the leading AWG 19 is allowed to enter the light input end #8 of the following AWG 20, sliced beams $S(v) \times T_i(v) \times U_{8,j}(v)$ each having a uniquely determined central wavelength $v_{i,j}$ are distributed to the 16 light output ends of the following AWG 20 as long as the above bandwidth condition is met. Thus, in the operation of the first embodiment, the spectrum of the relevant light source is given as $(v_{i,j}, P_{i,j})$ by using the optical switch 21 to one light output end #i of the leading AWG 19 to the light output end #8 of the following AWG 20 and measuring all optical output powers $P_{i,j}$ (i, j=1, 2, ..., 16) from each light output end #j of the following AWG 20.

In order to prevent the mixture of unwanted frequencies caused by the periodicity of the demultiplexing frequencies of the AWG, this invention is based on the cascading of a first wavelength division multi/demultiplexer having a transmission bandwidth $\delta v_1$ smaller than the free spectral range $FSR_2$ using the optical switch.

Figure 13:
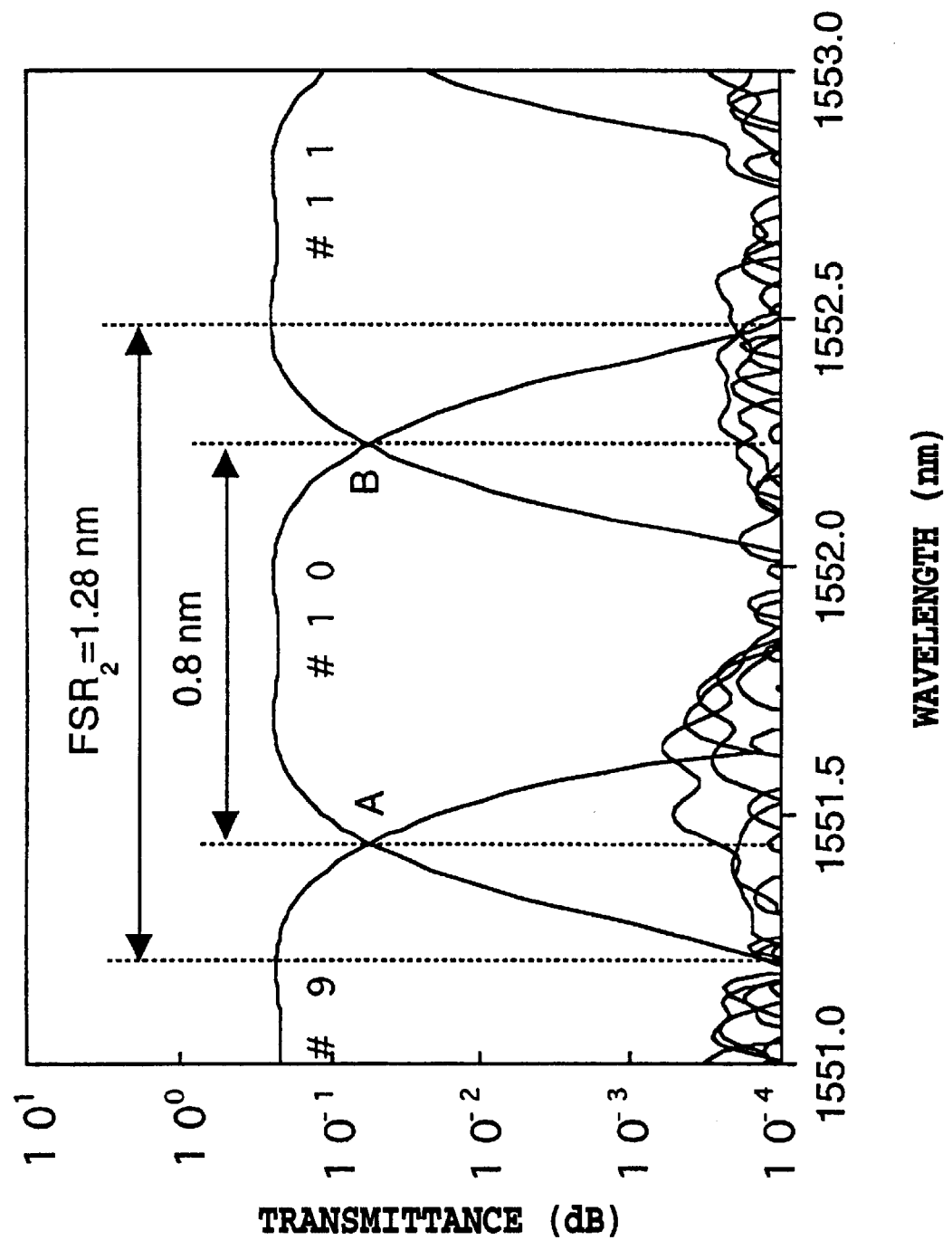
FIG. 13 shows transmission bands obtained at the light output ends #9, #10, and #11 of the leading AWG.

FIG. 13 is an enlarged view of transmission spectra $T_i(v)$ (i=1, 2, 3, 4), that is, transmission bands within the demultiplexing spectra shown in FIG. 10 that are obtained from the adjacent light output ends #9, #10, #11. The transmission band of previously produced AWGs is not shaped like a complete flat-top rectangle but like a trapezoid with both ends gradually attenuating. Due to this band characteristic of the leading AWG 19, the value of the $FSR_2$ must cover an area in which the value of the transmission band attenuates down to 30 dB relative to the peak so that a light frequency offset by $FSR_2$ is attenuated by, for example, 30 dB or more to allow a unique light frequency to be distributed to the light output end of the following AWG 20. Conversely speaking, the bandwidth V2 of the leading AWG must be defined as a width of a 30-dB down. The band #10 does not perfectly overlap the adjacent band #9 or #11 but intersects with it at points A and B indicating an about 5-dB down relative to the peak. Thus, only the frequency band between points A and B is actually used within the light distributed from #10, and measured values obtained during the use of the adjacent band #9 or #11 should be used as the optical power of the remaining frequency band (0.48 nm) of the $FSR_2$.

Figure 4:
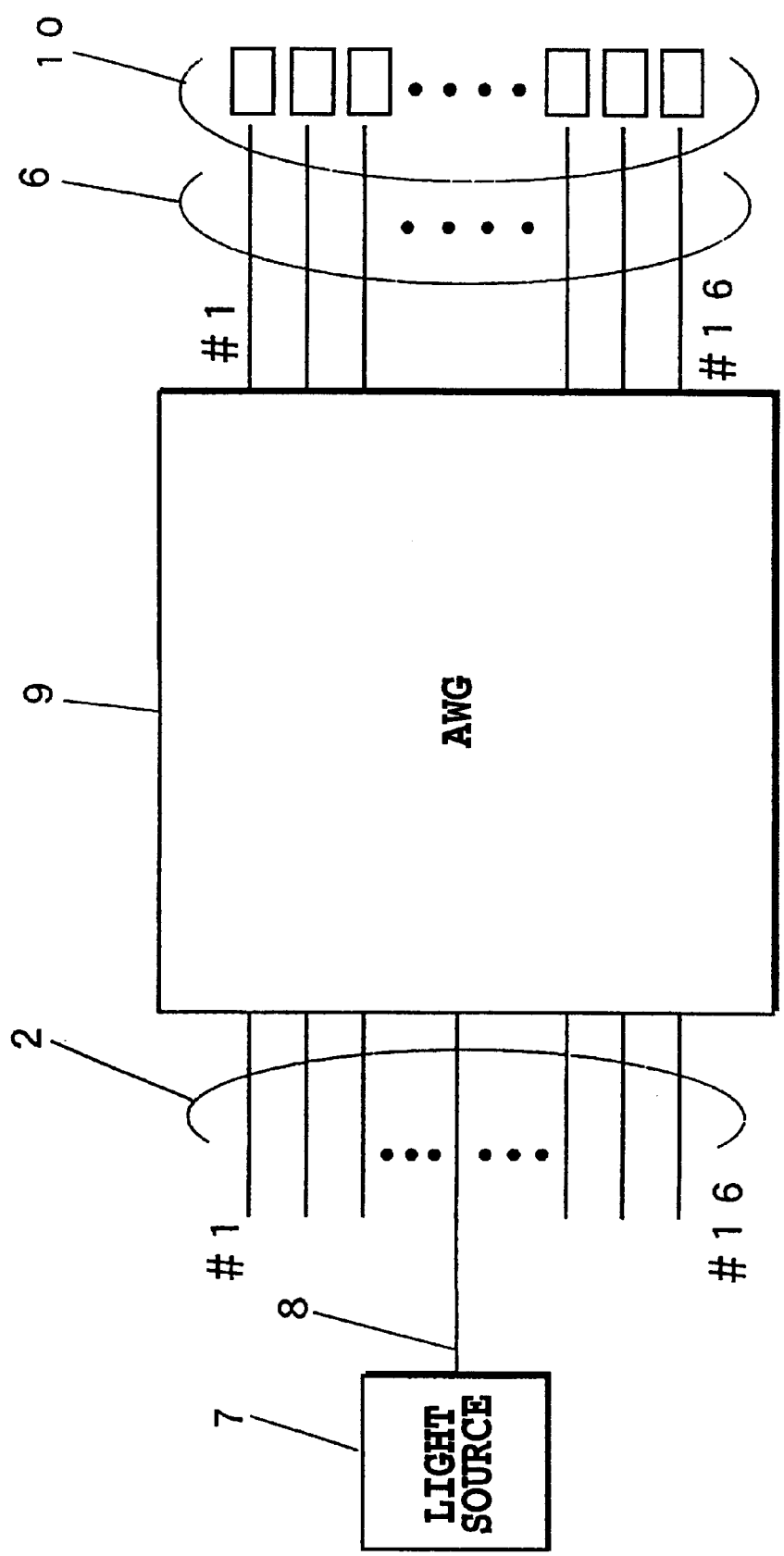
FIG. 4 shows a configuration of a conventional optical spectrum analyzer using an AWG.
Figure 5:
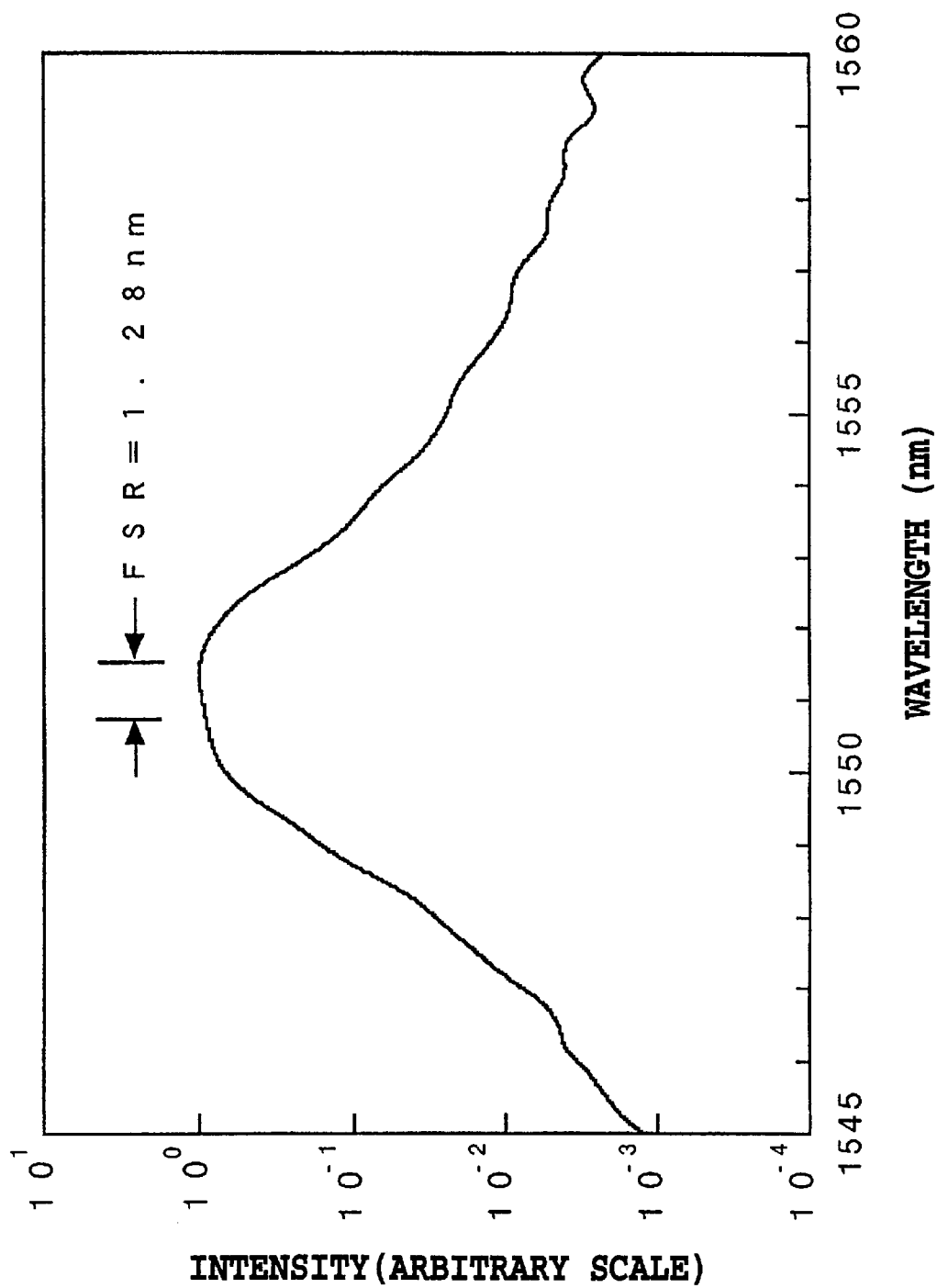
FIG. 5 shows a spectrum of output light from a measuring light source.
Figure 6:
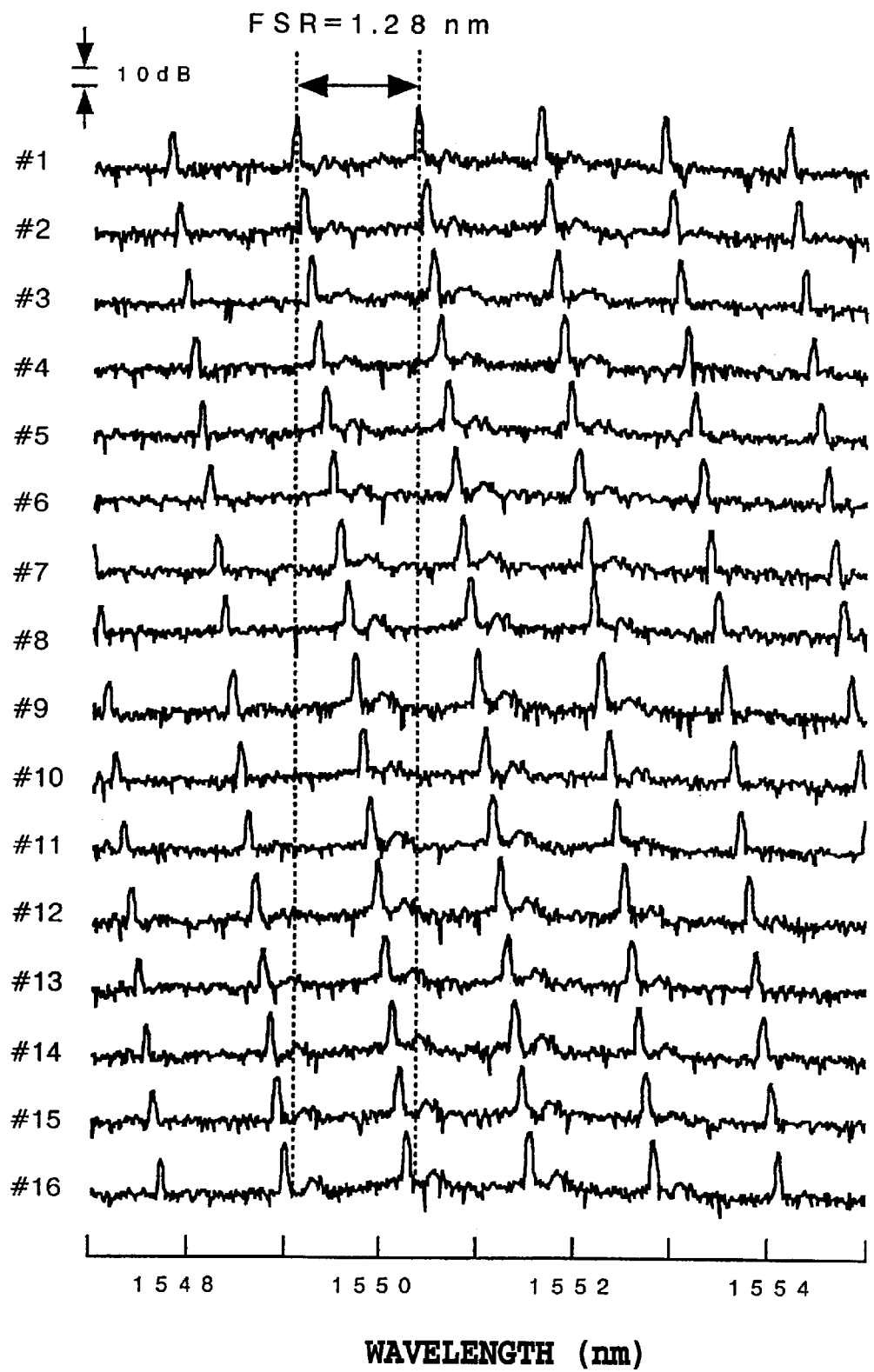
FIG. 6 shows spectra obtained at all 16 light output ends when light from a light source having the spectrum shown in FIG. 5 is allowed to enter an AWG of an optical spectrum analyzer of a conventional configuration.
Figure 7:
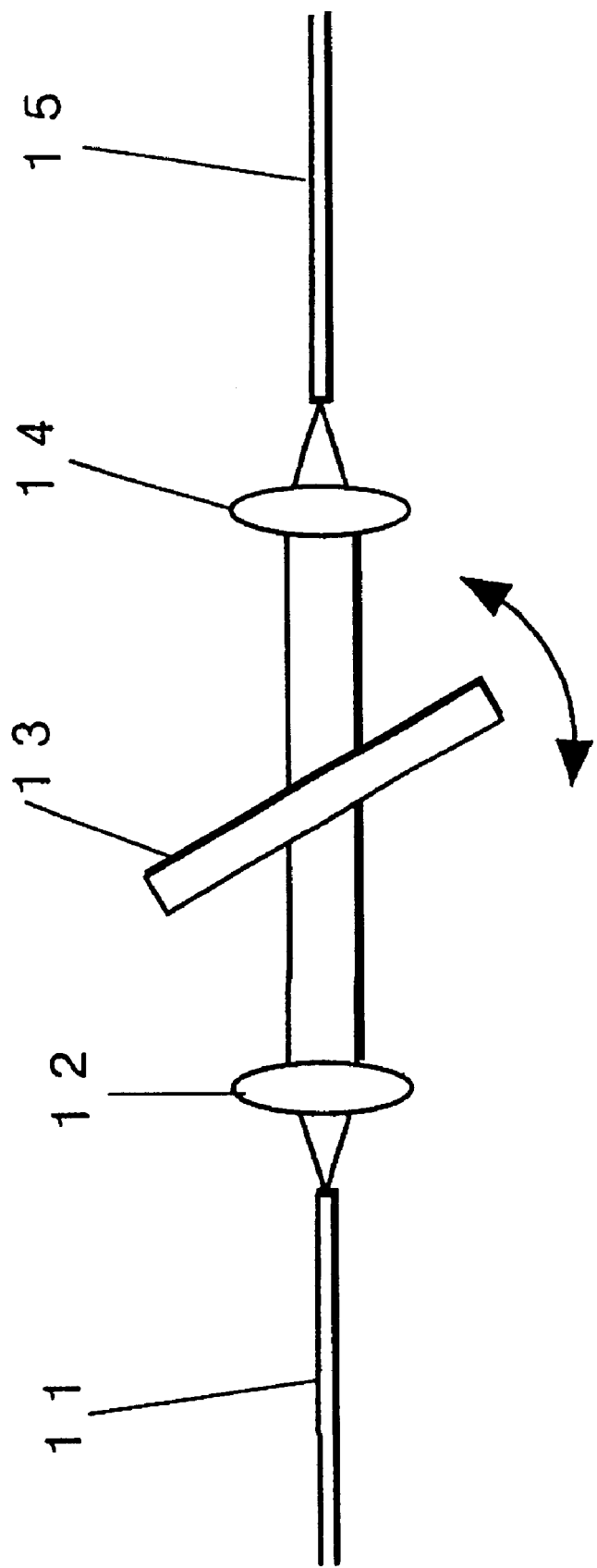
FIG. 7 shows a configuration of a conventional optical bandpass filter.
Figure 8:
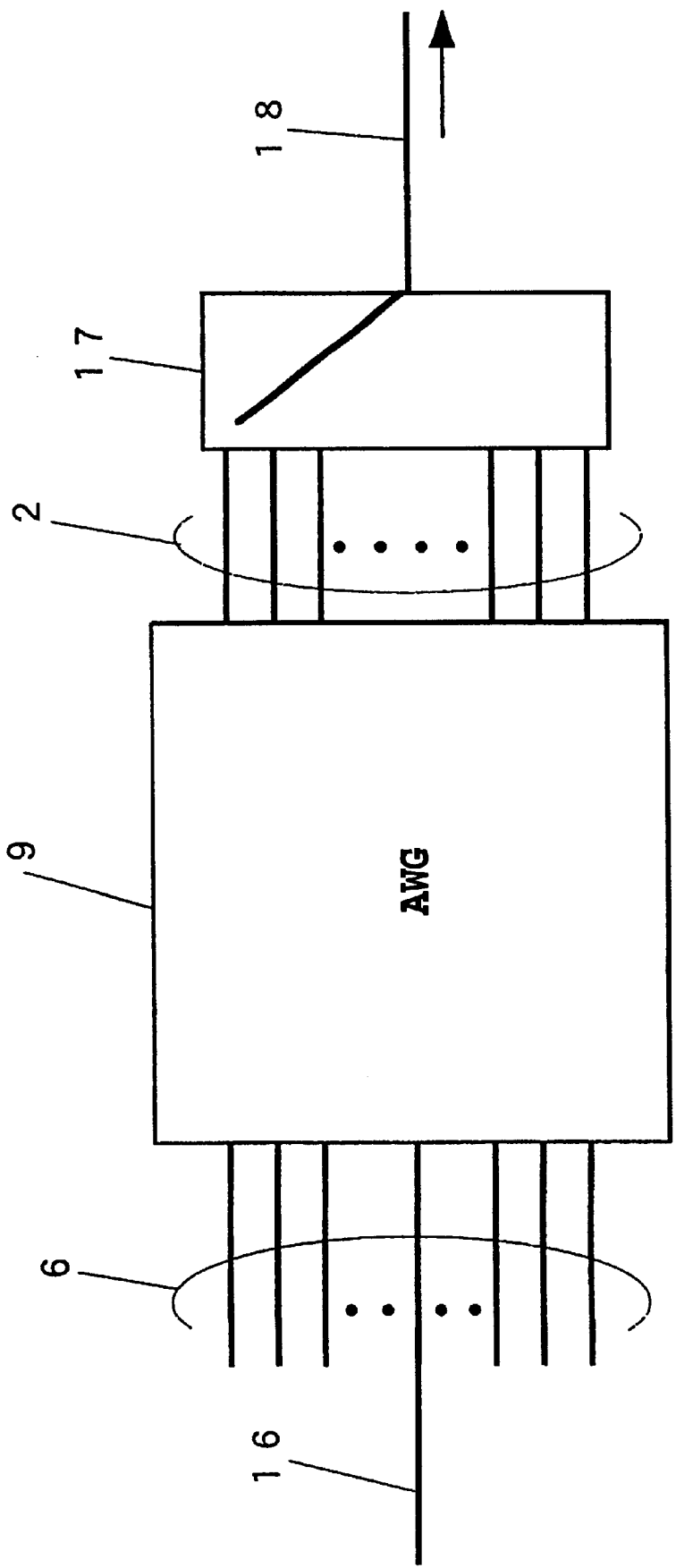
FIG. 8 shows a conventional optical bandpass filter using an AWG.
Figure 14A:
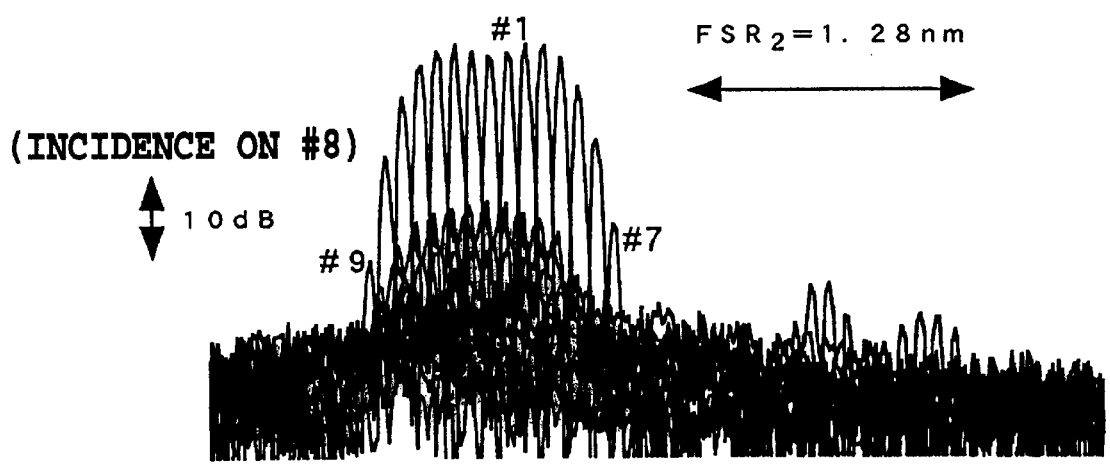
FIG. 14 shows demultiplexing spectra obtained at all 16 light output ends when outputs from the light output ends #8, #9, and #10 of the leading AWG are allowed to enter the following AWG through #8.
Figure 14B:
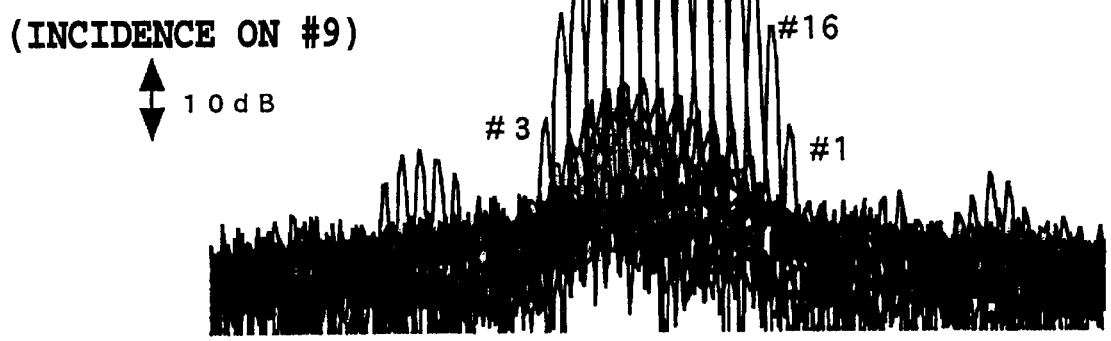
Figure 14:
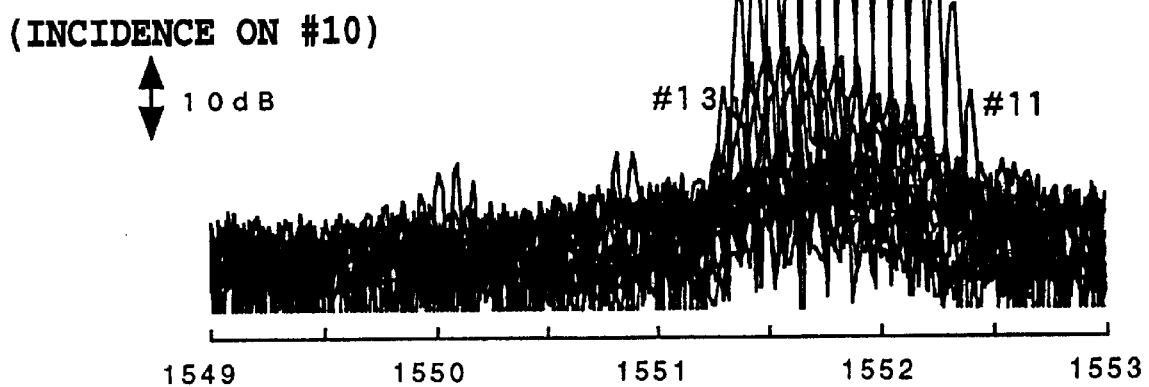

FIG. 14 shows spectra of light distributed to all the 16 light output ends of the following AWG if narrowband light having the spectrum shown in FIG. 5 is split by #8, #9, and #10 of the leading AWG and if the demultiplexing are allowed to enter the following AWG through the light input end #8. FIG. 6 shows demultiplexing spectra obtained from all 16 light output ends when this light is demultiplexed according to the conventional example shown in FIG. 4. A comparison between FIGS. 6 and 14 indicates that in any optical spectra distributed to the light output ends of the following AWG, this embodiment based on the bandwidth condition serves to sufficiently attenuate light frequency components equal to an integer multiple of the $FSR_2$, in contrast to the prior art. In addition, due to the met cyclicity condition, light wavelengths demultiplexed by the following AWG uniformly fill each band (#8, #9, #10) at a channel spacing of 0.08 nm, with overlapping portions between different bands, so the incident spectrum is entirely sliced at a constant interval of 0.08 nm.

Figure 15:
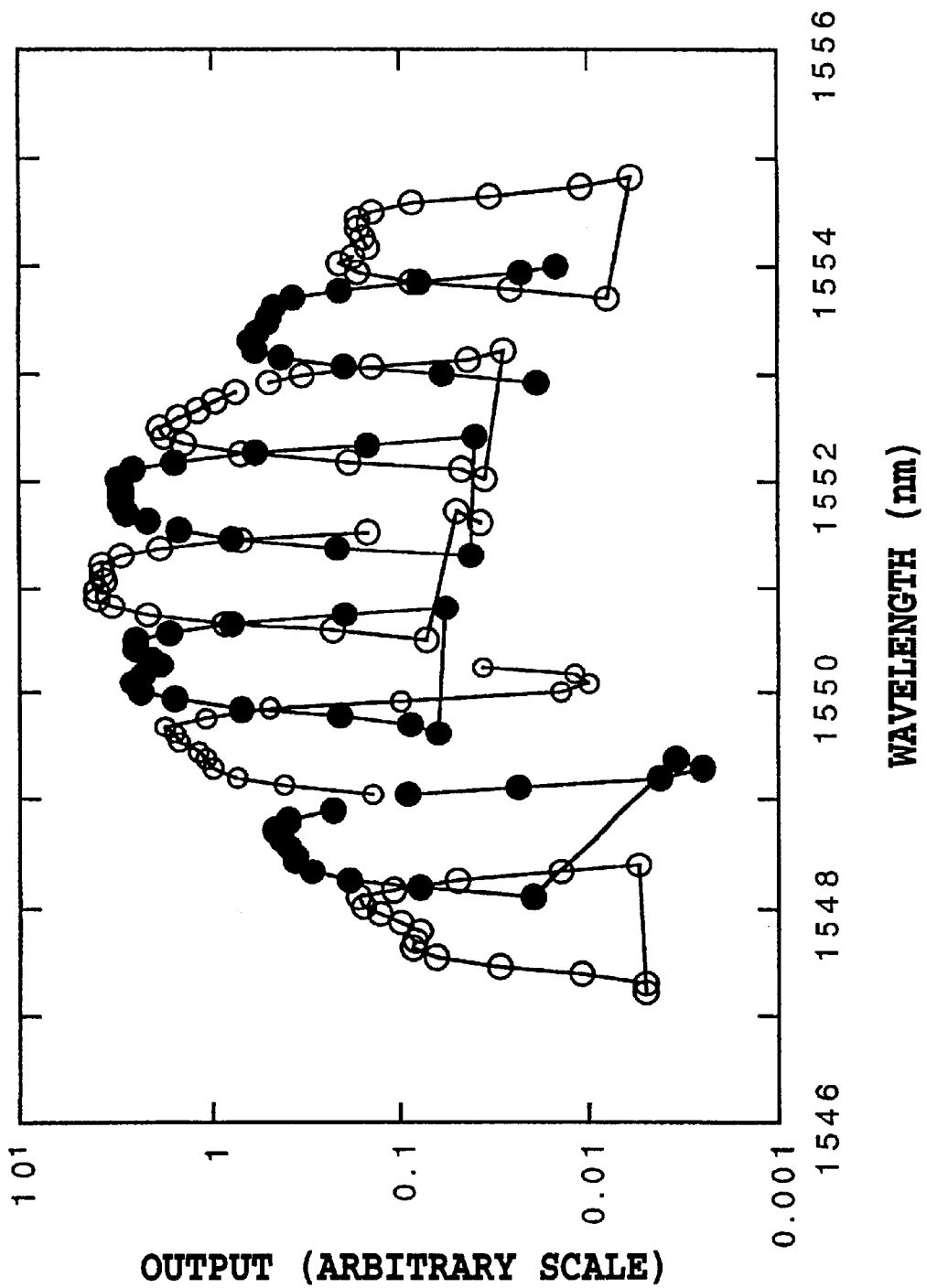
FIG. 15 shows outputs from all 16 light output ends.

FIG. 15 shows output voltages from the photodetector array as a function of the wavelength obtained when the light spectrum shown in FIG. 5 is measured with the first embodiment. FIG. 15 shows that the output waveforms of the bands overlap one another so that an attenuating component of a band is compensated for by a component of the adjacent band.

Figure 16:
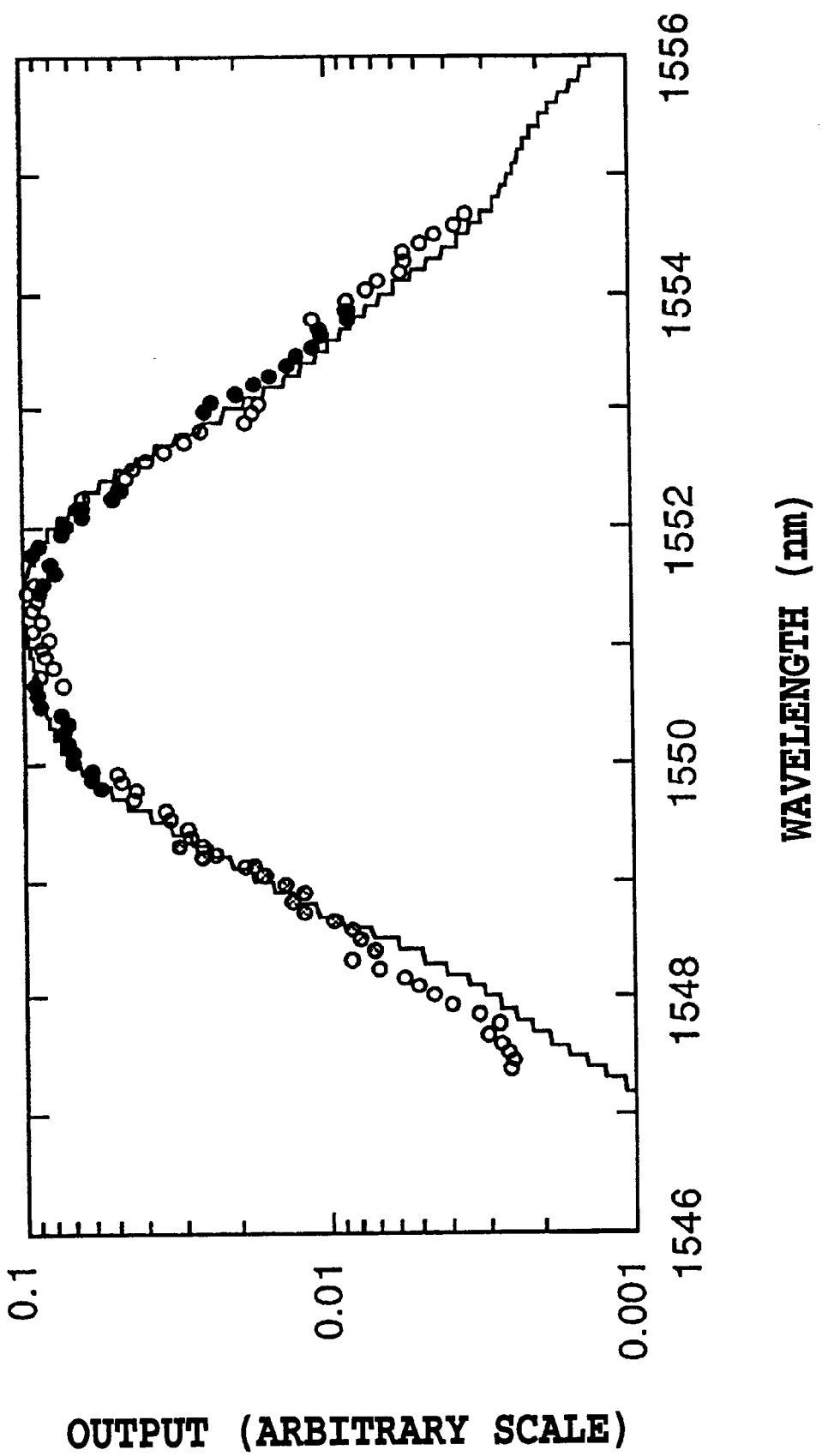
FIG. 16 shows measured values according to the first embodiment and the actually measured values (FIG. 5) for comparison.

FIG. 16 uses white circles to show the results of calibration of the outputs in FIG. 15 carried out with the dependence of the transmission factor of each band on the wavelength taken into consideration. FIG. 16 shows that the measurement results agree well with the actually measured values and that no portion of the wavelength is missing.

Although this embodiment uses the AWG for the leading wavelength division multi/demultiplexing circuit, it is only used as a 1×16 wavelength division multi/demultiplexing circuit so it can be replaced by a wavelength division multi/demultiplexer using a dielectric evaporation filter or a fiber diffraction grating as long as the bandwidth condition is met. The following wavelength division multi/demultiplexing circuit 20, however, must have the AWG with periodicity and cyclicity of demultiplexing frequencies because it uses the periodicity and cyclicity to slice beams already sliced by the leading wavelength division multi/demultiplexing circuit, into smaller and unique spectra. The transmission spectrum obtained when two wavelength division multi/demultiplexing circuits are cascaded together is the product of the respective transmission spectra, this embodiment is not affected by the order in which the wavelength division multi/demultiplexing circuits constituting the wavelength division multi/demultiplexer are connected as long as the bandwidth condition shown in Equation (1) is met.

Figure 17:
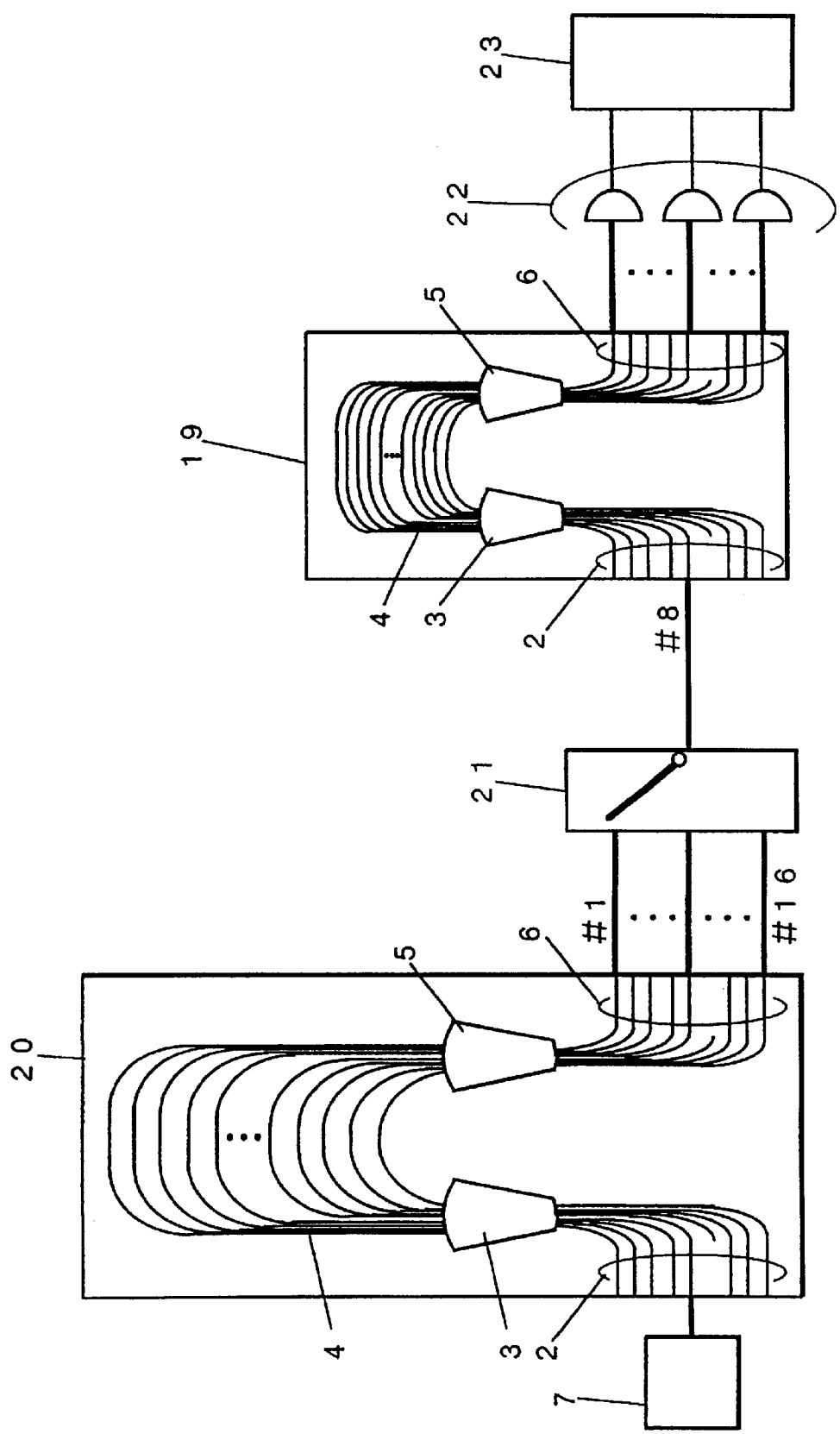
FIG. 17 shows a second embodiment of an optical spectrum analyzer using the wavelength division multi/demultiplexer according to this invention.

Consequently, the characteristics of the optical spectrum analyzer remain unchanged even if as the AWGs constituting the wavelength division multi/demultiplexer, the AGB 20 of channel spacing 10 GHz is installed before the AWG 19 of channel spacing 100 GHz, as in the second embodiment shown in FIG. 17. In addition, the effects remain unchanged even if a 1×16 switch is used as the optical switch 21 in the first and second embodiments.

Table 1 shows light frequencies within the free spectrum range distributed to each light output end when light is allowed to enter each light input end, using as a reference a light frequency distributed to the light output end #8 upon incidence on the light input end #8. For example, the light frequency distributed to the light input end #8 upon light incidence on the light input end #9 has a value smaller than the reference light frequency by $ch_2$. As shown in Table 1, the 16×16 AWG having the cyclicity shown in Equation (2) can essentially split light into only 16 light frequencies if the difference in bandwidth $\delta v2$ is ignored. Thus, when #1, #2, #3, and #4 are selected as the light input ends, the 16 light frequencies are distributed to the light output ends #1, #5, #9, and #13 without overlapping.

TABLE 1

Relationship for demultiplexing frequencies of an AWG having cyclicity

1 Light output end number

| #2 Light input end number | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| | 1 | ▓ | -3 | -4 | -5 | ▓ | -7 | -8 | 7 | ▓ | 5 | 4 | 3 | ▓ | 1 | 0 | -1 |
| | 2 | ▓ | -4 | -5 | -6 | ▓ | -8 | 7 | 6 | ▓ | 4 | 3 | 2 | ▓ | 0 | -1 | -2 |
| | 3 | ▓ | -5 | -6 | -7 | ▓ | 7 | 6 | 5 | ▓ | 3 | 2 | 1 | ▓ | -1 | -2 | -3 |
| | 4 | ▓ | -6 | -7 | -8 | ▓ | 6 | 5 | 4 | ▓ | 2 | 1 | 0 | ▓ | -2 | -3 | -4 |
| | 5 | -6 | -7 | -8 | 7 | 6 | 5 | 4 | 3 | 2 | 1 | 0 | -1 | -2 | -3 | -4 | -5 |
| | 6 | -7 | -8 | 7 | 6 | 5 | 4 | 3 | 2 | 1 | 0 | -1 | -2 | -3 | -4 | -5 | -6 |
| | 7 | -8 | 7 | 6 | 5 | 4 | 3 | 2 | 1 | 0 | -1 | -2 | -3 | -4 | -5 | -6 | -7 |
| | 8 | 7 | 6 | 5 | 4 | 3 | 2 | 1 | 0 | -1 | -2 | -3 | -4 | -5 | -6 | -7 | -8 |
| | 9 | 6 | 5 | 4 | 3 | 2 | 1 | 0 | -1 | -2 | -3 | -4 | -5 | -6 | -7 | -8 | 7 |
| | 10 | 5 | 4 | 3 | 2 | 1 | 0 | -1 | -2 | -3 | -4 | -5 | -6 | -7 | -8 | 7 | 6 |
| | 11 | 4 | 3 | 2 | 1 | 0 | -1 | -2 | -3 | -4 | -5 | -6 | -7 | -8 | 7 | 6 | 5 |
| | 12 | 3 | 2 | 1 | 0 | -1 | -2 | -3 | -4 | -5 | -6 | -7 | -8 | 7 | 6 | 5 | 4 |
| | 13 | 2 | 1 | 0 | -1 | -2 | -3 | -4 | -5 | -6 | -7 | -8 | 7 | 6 | 5 | 4 | 3 |
| | 14 | 1 | 0 | -1 | -2 | -3 | -4 | -5 | -6 | -7 | -8 | 7 | 6 | 5 | 4 | 3 | 2 |
| | 15 | 0 | -1 | -2 | -3 | -4 | -5 | -6 | -7 | -8 | 7 | 6 | 5 | 4 | 3 | 2 | 1 |
| | 16 | -1 | -2 | -3 | -4 | -5 | -6 | -7 | -8 | 7 | 6 | 5 | 4 | 3 | 2 | 1 | 0 |

Figure 18:
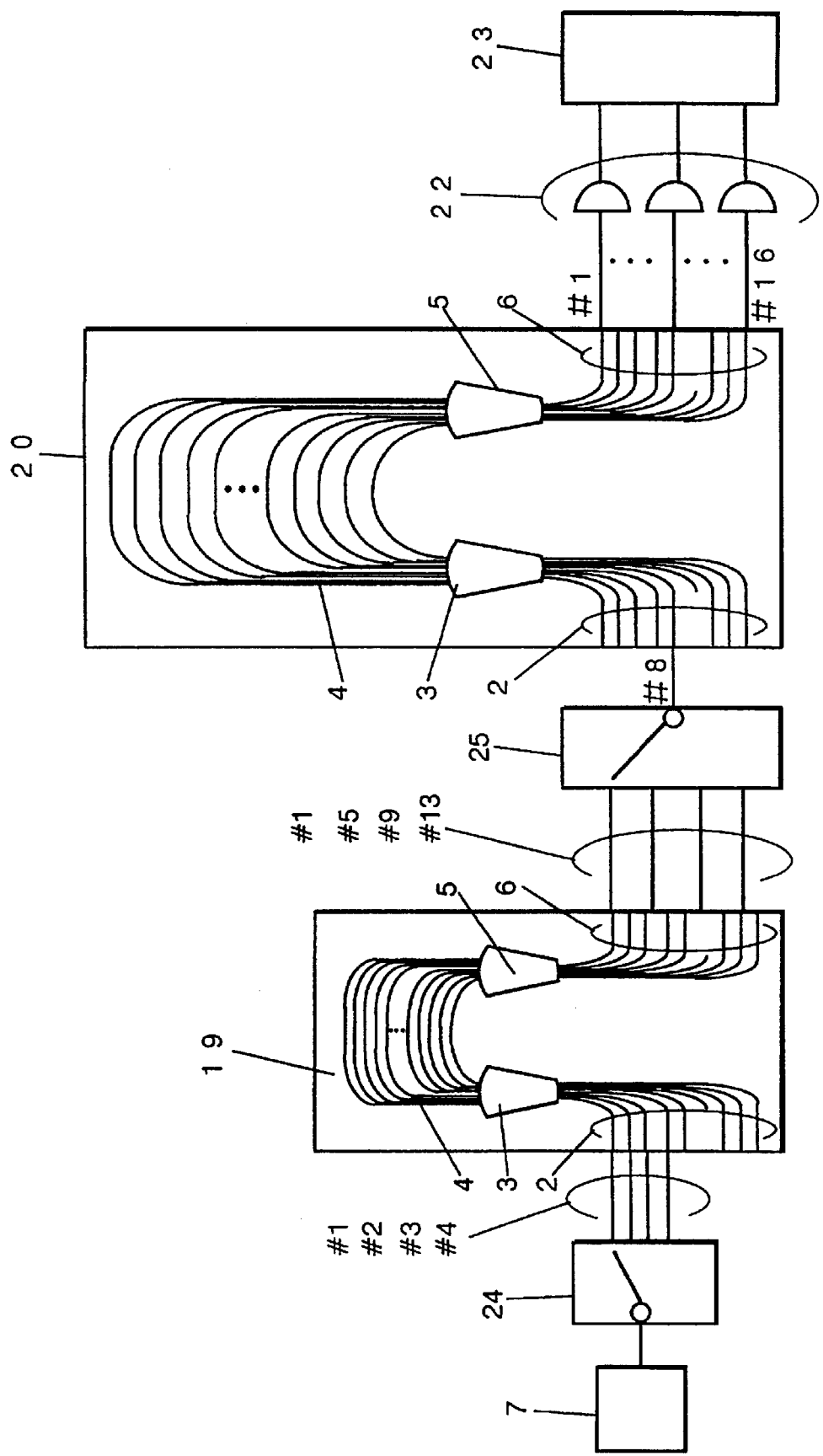
FIG. 18 shows a third embodiment of an optical spectrum analyzer using the wavelength division multi/demultiplexer according to this invention.

FIG. 18 shows a third embodiment of an optical spectrum analyzer using the wavelength division multi/demultiplexer according to this invention. The embodiments shown in FIGS. 9 and 17 require the large-scale 16×1 optical switch to connect the two 16×16 AWGs. In the embodiment shown in FIG. 18, the optical switch has been replaced by a small-scale optical switch, based on the cyclicity of the AWG. In FIG. 18, 24 is a 1×4 optical switch, and an output from the light source 7 is allowed to enter one of the light input ends #1, #2, #3, #4 of the leading AWG 19. Reference numeral 25 denotes a 4×1 optical switch that connects one of the outputs from the light output ends #1, #5, #9, #13 of the leading AWG 19 to the light input end #8 of the following AWG 20. To operate this embodiment, the 1×4 optical switch 24 is used to allow an output from the light source to enter the leading AWG 19 through the light input end #i (i=1, 2, 3, 4). The corresponding optical outputs from the light output ends #j (j=1, 5, 9, 13) are allowed to enter the following AWG 20 in order to measure optical output powers $P_{i,j,k}$ from the 16 light output ends #k (=1, 2, . . . , 16). By using the optical switches 24 and 25 to execute all combinations in which only one of the light input ends #i (i=1, 2, 3, 4) and only one of light output ends #j (j=1, 5, 9, 13) of the leading AWG are turned on, all the 16 demultiplexing frequencies of the leading AWG can be implemented. That is, the introduction of the 1×4 and 4×1 optical switches provides the same effects as in the 16×1 optical switch 21 in the first embodiment (FIG. 9).

An $1\times N_1$ or $N_1 \times 1$ optical switch can be constructed by connecting 1×2 optical switches together like a tree or cascading them together. FIG. 19A shows an example of a 1×4 switch having the light output ends #1, #2, #3, #4 and implemented by connecting 1×2 optical switches 26, 27, and 28 together like a tree, and FIG. 19B shows an example of a similar switch implemented by cascading these switches together. The number of optical switches required in the third embodiment may be 2×3=6. An AWG having incident and output ends of $N_1$ as well as cyclicity requires one $1\times N_1$ optical switch and one $N \times 1$ optical switch, and to configure these switches using 1×2 optical switches, $2 \times (N_1 - 1)$ such optical switches are required.

FIG. 20 shows a fourth embodiment of an optical spectrum analyzer using the wavelength division multi/demultiplexer according to this invention.

This embodiment uses an optical circuit 29 including a leading AWG 30, a 1×4 optical switch 31, and a 4×1 optical switch 32 integrated on the same substrate. The AWG 30, the optical switch 31, and the optical switch 32 correspond to the leading AWG 19, the 1×4 optical switch 24, and the 4×1 optical switch 25 according to the third embodiment (FIG. 18). The optical switches 31 and 32 are each configured by connecting three 2×2 Mach Zehnder interferometer type optical switches together like a tree as shown in FIG. 19(a) and execute optical switching by using the current values of heaters 33 to 38 to control an amount of heat provided to one of the arms of Mach Zehnder interferometer. This aspect of the invention has the same principle as its third embodiment according to this invention, but is advantageous in that the group of switches are configured on the substrate to (1) eliminate the need to connect bulk-type 1×2 optical switches in order to reduce the size of the entire system, while (2) facilitating connections with the light source or other AWGs due to the use of the single input to and single output from the substrate.

Figure 21:
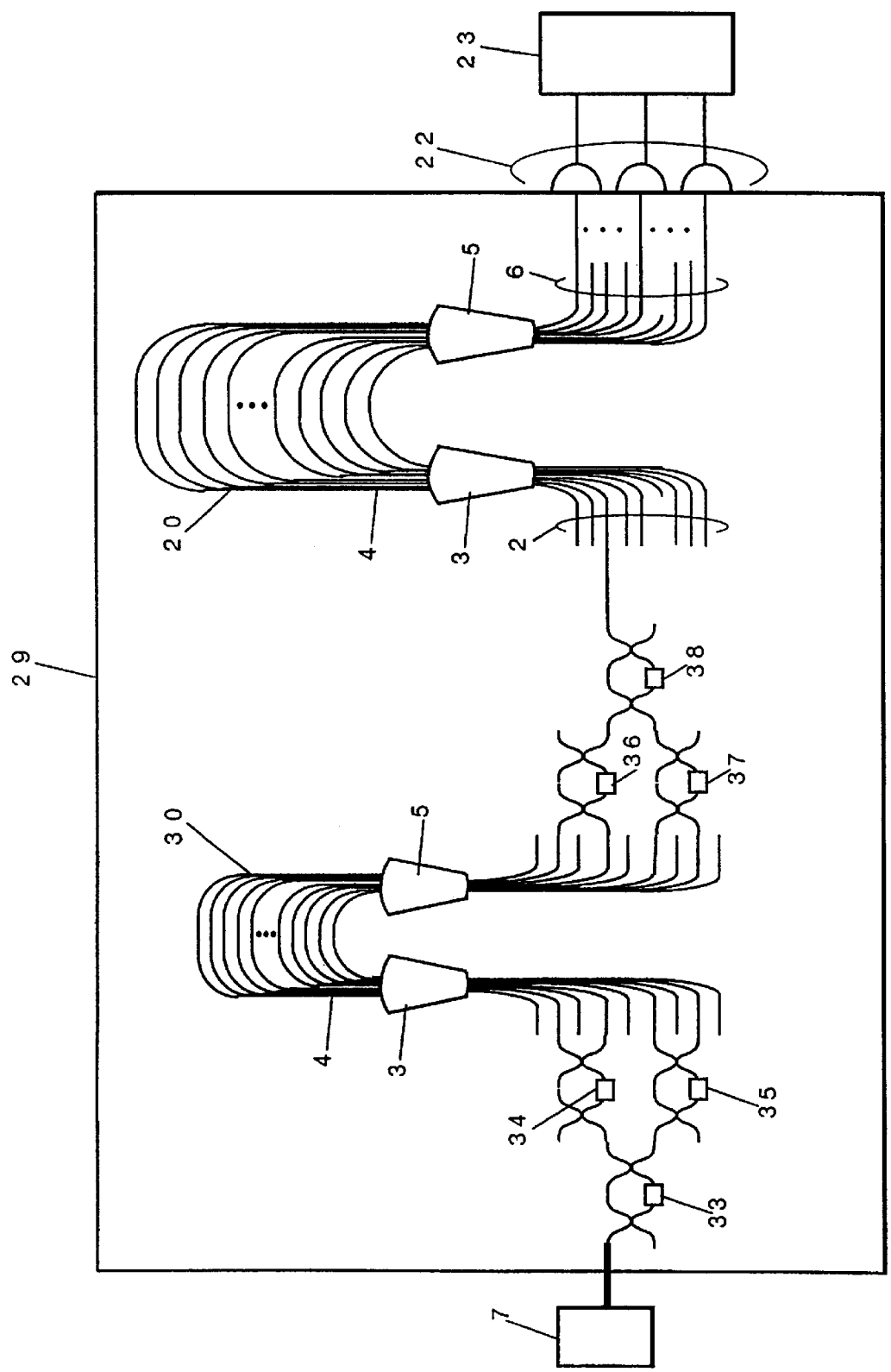
FIG. 21 shows a fifth embodiment of an optical spectrum analyzer using the wavelength division multi/demultiplexer according to this invention.

FIG. 21 shows a fifth embodiment of an optical spectrum analyzer using the wavelength division multi/demultiplexer according to this invention. As illustrated, all optical circuits can be produced on the same substrate. In addition, according to this embodiment, the photodetector array 22 is directly connected to the light output ends of the AWG 20 to eliminate the need to connect fiber pigtails.

Figure 22:
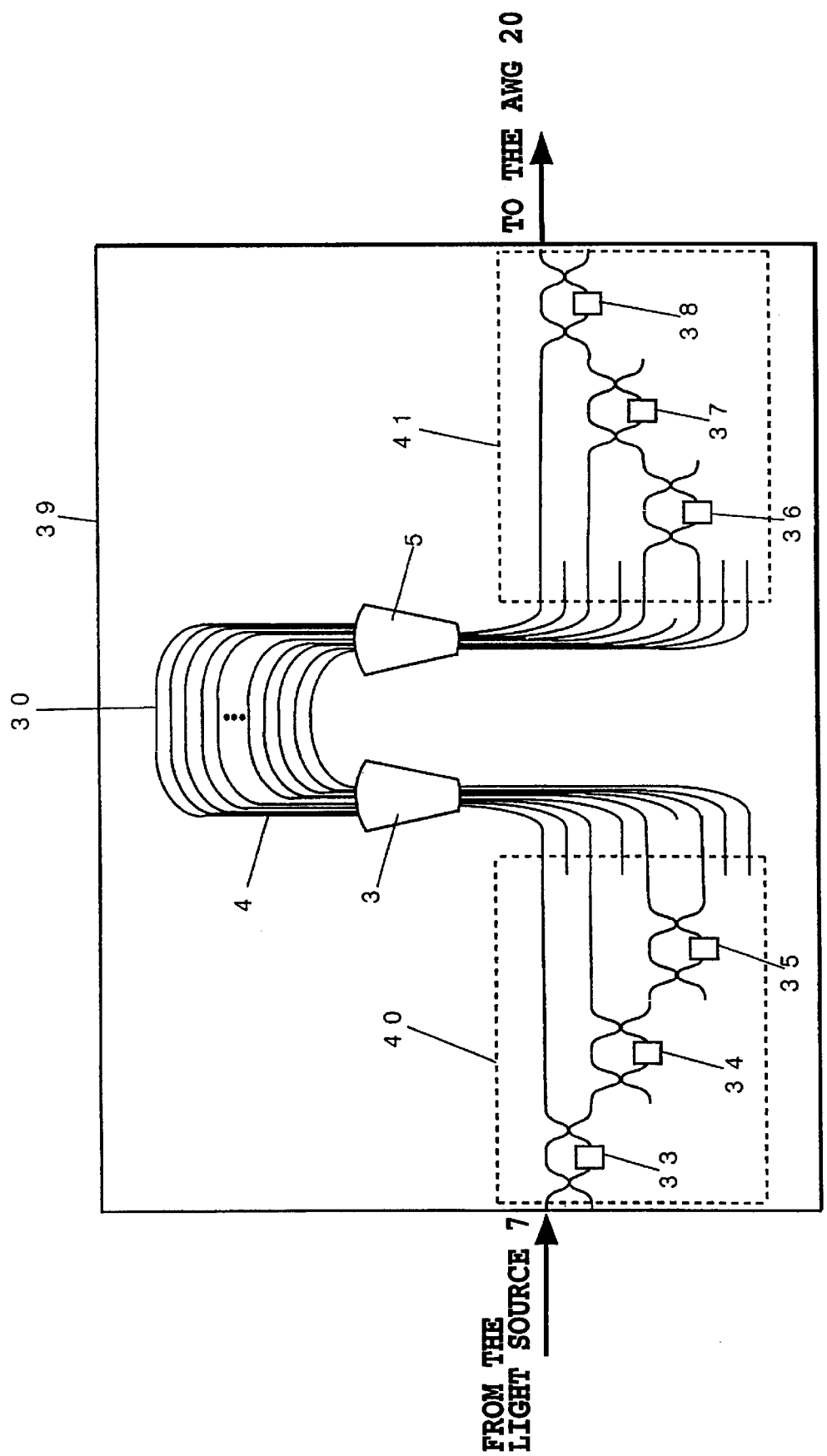
FIG. 22 shows an embodiment of a wavelength division multi/demultiplexing circuit used for the wavelength division multi/demultiplexer according to this invention.

FIG. 22 shows one embodiment of a wavelength division multi/demultiplexing circuit constituting the wavelength division multi/demultiplexer according to this invention. This wavelength division multi/demultiplexing circuit is an optical circuit constructed by integrating on the same substrate 39 a 1×4 optical switch 40 and a 4×1 optical switch 41 each consisting of three cascaded 2×2 Mach Zehnder interferometers as well as the AWG 30. An advantage of the cascaded 2×2 optical switches is that an arbitrary $1\times N_i$ optical switch can be constructed by means cascading. On the other hand, the tree-like connection is suitable for constructing a $1 \times 2^{N2}$ (N2 is an integer) switch.

As in the embodiments described above, as long as the AWG is used as the leading wavelength division multi/demultiplexer for slicing the spectrum of output light from the light source, this spectrum can be accurately measured only if the spectrum width $\delta v$ of the light source to be measured is smaller than the $FSR_1$ (=1.6 THz=12.8 nm in the 1.55-$\mu$m band). When the spectrum width of the light source is larger than the $FSR_1$, light frequencies offset from the required frequency by an integer multiple of the $FSR_1$ are emitted from the light output ends, thereby preventing the spectrum from being measured accurately. To solve this problem, another wavelength division multi/demultiplexing circuit having a bandwidth that meets the bandwidth condition shown in Equation (1) may be cascaded to the embodiment 1 to 4 for $FRS_1$ in order to remove the beams having light frequencies equal to an integer multiple of the $FSR_1$.

Figure 23:
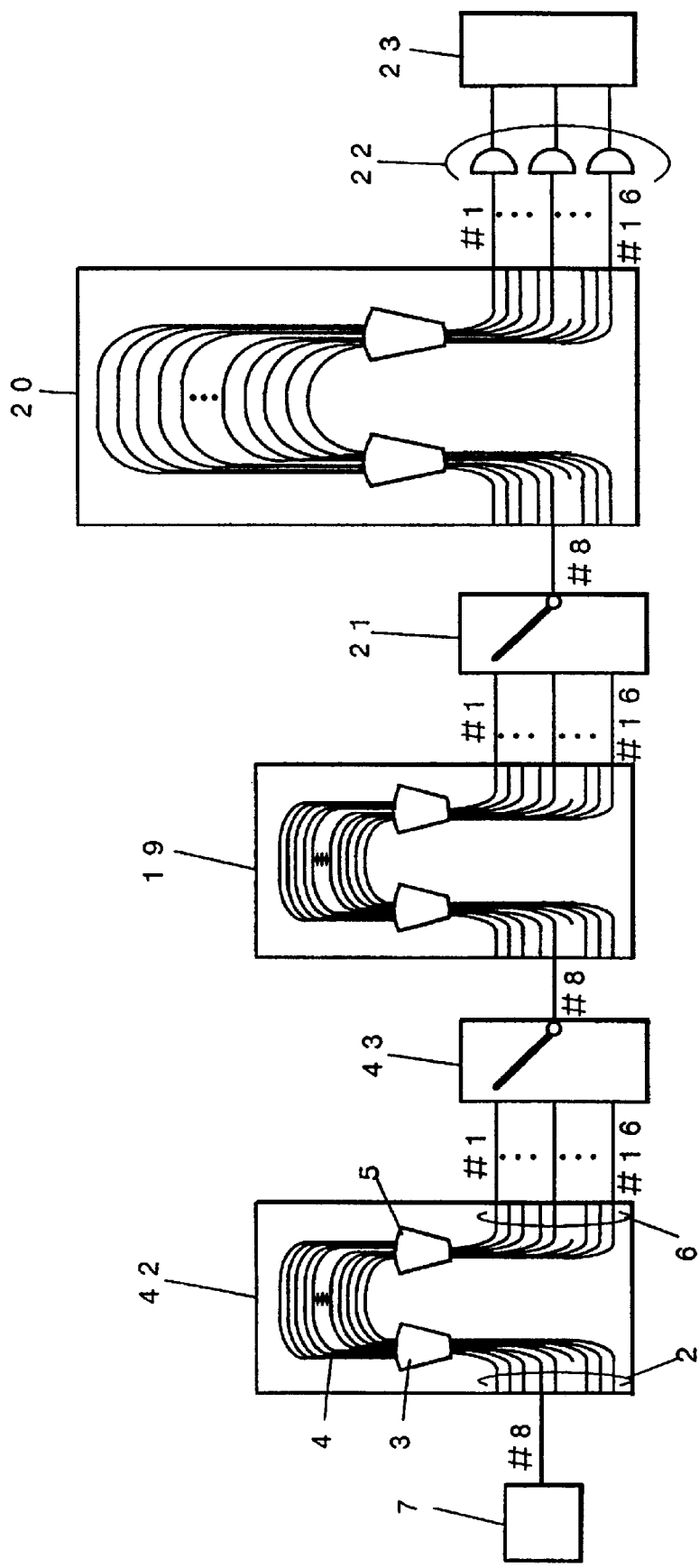
FIG. 23 shows a sixth embodiment of an optical spectrum analyzer using the wavelength division multi/demultiplexer according to this invention.

FIG. 23 shows a sixth embodiment of an optical spectrum analyzer using the wavelength division multi/demultiplexer according to this invention. This embodiment cascades a 16×16 AWG 42 via a 16×1 optical switch 43 to wavelength division multi/demultiplexer of the optical spectrum analyzer shown in the first embodiment (FIG. 9). In this case, the AWG 42 has a flat-top transmission band of channel spacing ch$_0$=1 THz and a bandwidth δv$_0$=500 GHz. The free spectral range is FSR$_0$=ch$_0$×16=16 THz (128 nm in the 1.5-μm band). The bandwidth condition shown in Equation (1), that is, FSR$_1$>v$_0$ is met, so that as long as the spectrum width of output light from the light source is by δv<δv$_0$, that is, 16 THz or less, the AWG 42 uniquely slices this spectrum into 16 or less flat-top spectra of bandwidth δv$_0$, which are then emitted from the light output ends #1, #2, . . . , #16. The sliced beams emitted from each light output ends are incident on the light input end #8 of the second AWG 19 by the optical switch 43. The bandwidth of each sliced beam is δv$_0$ and is smaller than the free spectral range FSR$_1$ of the AWG 19, so that the AWG 19 uniquely slices these beams and emits the resulting beams from each light output end. The output beams are further sliced by the final AWG 20 into beams of bandwidth 10 GHz and are distributed to each light output end #1 to #16. The powers of the distributed beams are measured by the photodetector array 22.

According to this structure, light frequencies v$_{k,i,j}$ distributed to each optical output end #j (j=1, 2, . . . , 16) of AWG 20 are uniquely determined when the optical switch 43 is used to connect the light output ends #k (k=1, 2, . . . , 16) of the AWG 42 to the light input end #8 of the AWG 19 while the optical switch 21 is used to connect the light output ends #i (i=1, 2, . . . , 16) of the AWG 19 to the light input end #8 of the AWG 20. Thus, by measuring the resulting distributed optical powers P$_{k,i,j}$, the optical spectrum of the light source is given as (v$_{k,i,j}$, P$_{k,i,j}$). Clearly, the spectrum resolution according to this embodiment is determined by the channel spacing of the final AWG and is 10 GHz. In addition, the same effects can be obtained using 1×16 optical switches as the optical switches 43 and 21.

Although this embodiment uses the AWG as the leading wavelength division multi/demultiplexing circuit that initially slices the spectrum of output light from the light source, it can be replaced by a wavelength division multi/demultiplexer using a dielectric filter or a fiber diffraction grating as long as the bandwidth condition is met. The second and third wavelength division multi/demultiplexing circuits 19 and 20, however, must comprise AWGs because they use the cyclicity to slice beams already sliced by the leading wavelength division multi/demultiplexing circuit, into smaller and unique bandwidths. That is, if a number of wavelength division multi/demultiplexing circuits are to be cascaded together, all wavelength division multi/demultiplexers except the one having the largest bandwidth must be AWGs that meet Equations (1) and (2). In addition, since this embodiment is not affected by the order in which the wavelength division multi/demultiplexing circuits are connected, as described in the first embodiment shown in FIG. 9, the characteristics of the optical spectrum analyzer remain unchanged even if the wavelength division multi/demultiplexing circuits 42, 19, and 20 are cascaded together in an arbitrary order.

Figure 24:
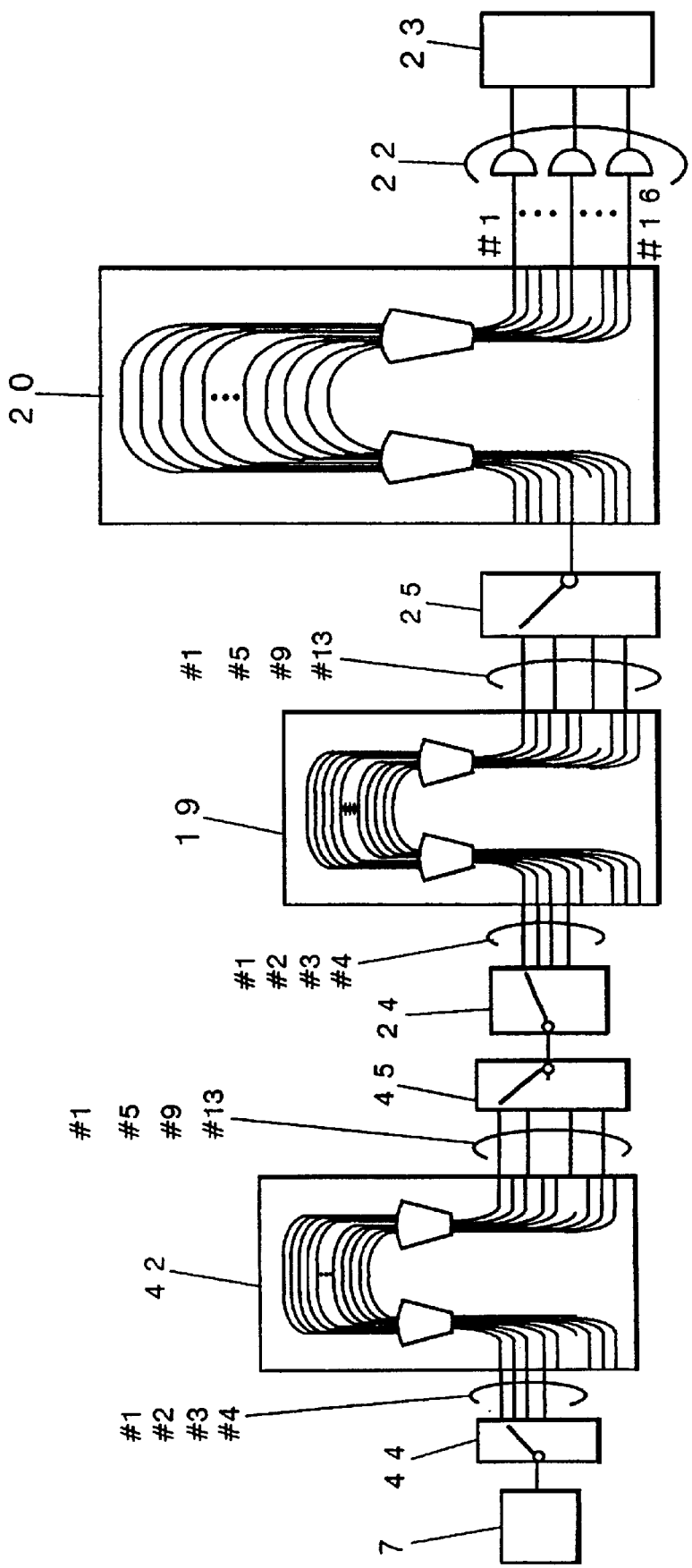
FIG. 24 shows a seventh embodiment of an optical spectrum analyzer using the wavelength division multi/demultiplexer according to this invention.

FIG. 24 shows a seventh embodiment of an optical spectrum analyzer using the wavelength division multi/demultiplexer according to this invention. Reference numerals 44 and 45 denote a 1×4 and a 4×1 optical switches, respectively. This embodiment replaces the large-scale optical switches 21 and 43 used in the sixth embodiment shown in FIG. 23, by the small-scale 1×4 and 4×1 optical switches as described in the third embodiment. The optical switch 44 is connected to the light input ends #1 to #4 of the AWG 42, and the light output ends #1, #5, #9, and #13 are connected to the optical switch 45. As in the sixth embodiment, the spectrum resolution according to this embodiment is 10 GHz, and the bandwidth of a measurable light source is FSR$_0$=16 THz.

Figure 25:
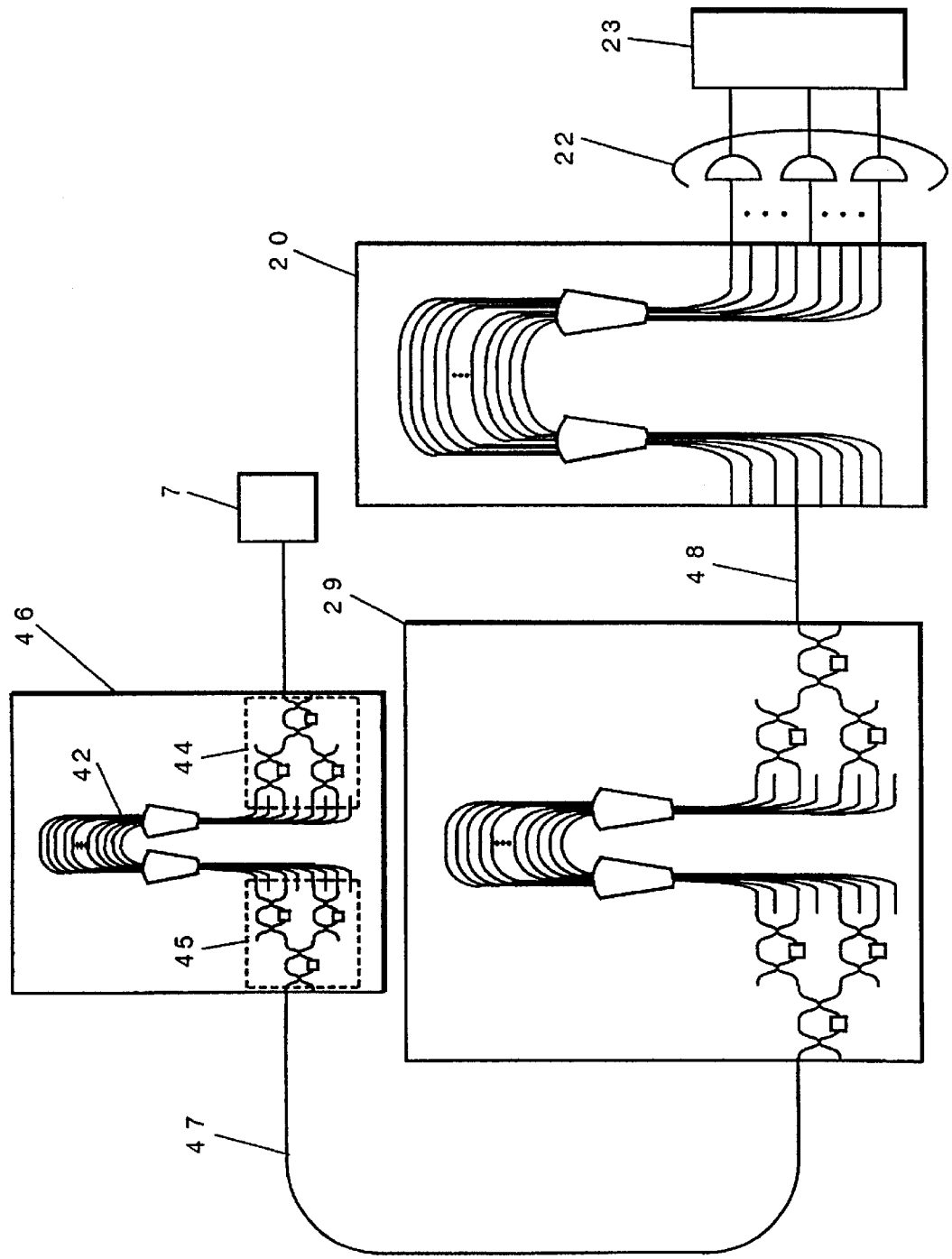
FIG. 25 shows an eighth embodiment of an optical spectrum analyzer using the wavelength division multi/demultiplexer according to this invention.

FIG. 25 shows an eighth embodiment of an optical spectrum analyzer according to this invention, which corresponds to an optical integration of the configuration of the wavelength division multi/demultiplexer shown in the seventh embodiment. The optical circuit 29 is as described above. An optical circuit 46 comprises the AWG 42 and optical switches 44 and 45 produced on the same substrate. The optical circuits 46 and 29 are connected together via an optical fiber 47. Output light from the optical circuit 29 is connected to the AWG 20 via an optical fiber 48. This embodiment can use the integration to reduce the number of connections between the optical devices.

Figure 26:
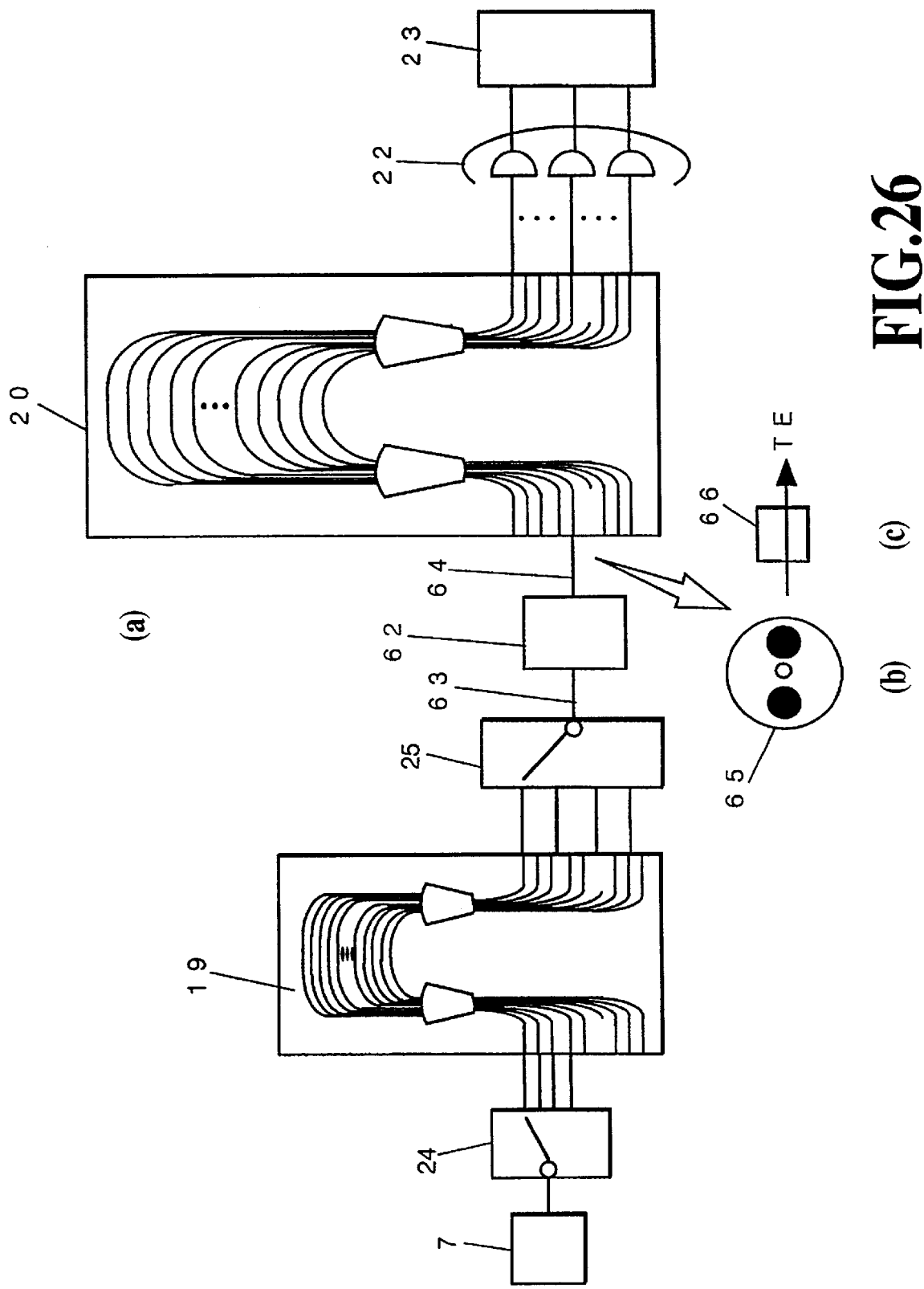
FIGS. 26(A), 26(B), 26(C) show a ninth embodiment of an optical spectrum analyzer using the wavelength division multi/demultiplexer according to this invention.

FIG. 26 shows a ninth embodiment of an optical spectrum analyzer using the wavelength division multi/demultiplexer according to this invention. Among the AWGs used in the above embodiments and having a channel spacing of 10 GHz, the central frequency of the transmission band may differ by its bandwidth or more depending on the incident light is TE or TM. Since in the above embodiments, output light from the light source propagates through the optical fiber pigtail before impinging on the AWG, the polarization state of the light input on the AWG significantly varies depending on the conditions of this fiber. An apparatus according to the embodiment shown in FIG. 26 implements an optical spectrum analyzer that does not depend on polarization despite the use of the AWGs that depend on polarization. FIG. 26(a) shows the overall configuration, FIG. 26(b) is a sectional view of a panda optical fiber facing the AWG 20, and FIG. 26(c) is a sectional view of the light input end of the AWG 20. This configuration is characterized by a polarization optical switch 62 installed between the optical switch 25 and the AWG 20 that depends on polarization. The polarization optical switch splits the polarization state of light propagating through an optical fiber 63, into a P and an S waves that are two orthogonal polarizations, uses a stress-applying polarization-holding fiber (typically referred to as the "panda fiber") 64 to allow the respective beams to impinge on the AWG 20 as a TE mode thereof, and uses the photodetector array 22 to measure optical output powers from the AWG corresponding to the respective inputs. The polarization optical switch then adds together the measured values of optical powers from the same light output end (that is, the same demultiplexing light frequency) for the P and S waves and determines this value as the optical power intensity of the output light from the light source for this light frequency. The results of experiments indicate that the polarization switch can be introduced to maintain the amount of variation of the optical spectrum caused by the variation of polarization within ±0.5 dB or less. In FIG. 26(b), 65 denotes a cross section of the panda fiber 64 at the AWG-side output end. In FIG. 26(c), 66 denotes a cross section of the fiber 64 on the AWG light input end side.

FIG. 27 shows a configuration of the polarization optical switch 62 used in the embodiment shown in FIG. 26. FIG. 27(a) shows the overall configuration, and FIGS. 27(b), (c), and (d) show cross sections of panda optical fibers. In FIG. 27, 67, 69, and 71 are collimator lenses, 68 is a polarization beam splitter, 70 and 72 are panda fibers, 73 and 74 are cross sections of the panda fibers 70 and 72, 75 is a 2×1 optical switch, and 76 and 77 are panda fibers used for this optical switch. The directions of the X axis holding polarization at the input ends of the panda fibers 70 and 72 are set parallel with and perpendicular to the sheet of this drawing as shown by the cross sections 73 and 74, respectively. The polarization beam splitter 68 splits output light from the optical fiber 63 into the P polarization parallel with the incident surface (the direction parallel with sheet of this drawing and represented by the arrow) and the S polarization orthogonal thereto (the direction perpendicular to the sheet of this drawing and represented by the black circles). The P wave advances straight through the beam splitter, impinges on the panda fiber 70 via the collimator lens 69, and propagates through the fiber while maintaining the polarization state of the X axis holding polarization. The split S wave is reflected by the beam splitter, impinges on the panda fiber 72 via the collimator lens 71, and propagates through the fiber while maintaining the polarization state of the X axis holding polarization. The output ends of the panda fibers 70 and 72 are used as the input ends 76 and 77 of the 2×1 optical switch 75. In this case, the output end of the panda fiber 64 of this switch has a mechanism for mechanically moving to a position opposed to the input end 76 or 77 of the optical switch 75, thereby enabling light that has propagated through the respective fiber to propagate through the optical fiber 64 while maintaining the polarization state of the X axis. Due to this configuration, by installing the apparatus in such a way that the X axis of the output end of the panda fiber 64 is parallel with the TE mode of the AWG 20, both the P and S waves can be propagated through the AWG 20 while maintaining the polarization state of the TE mode.

Figure 28:
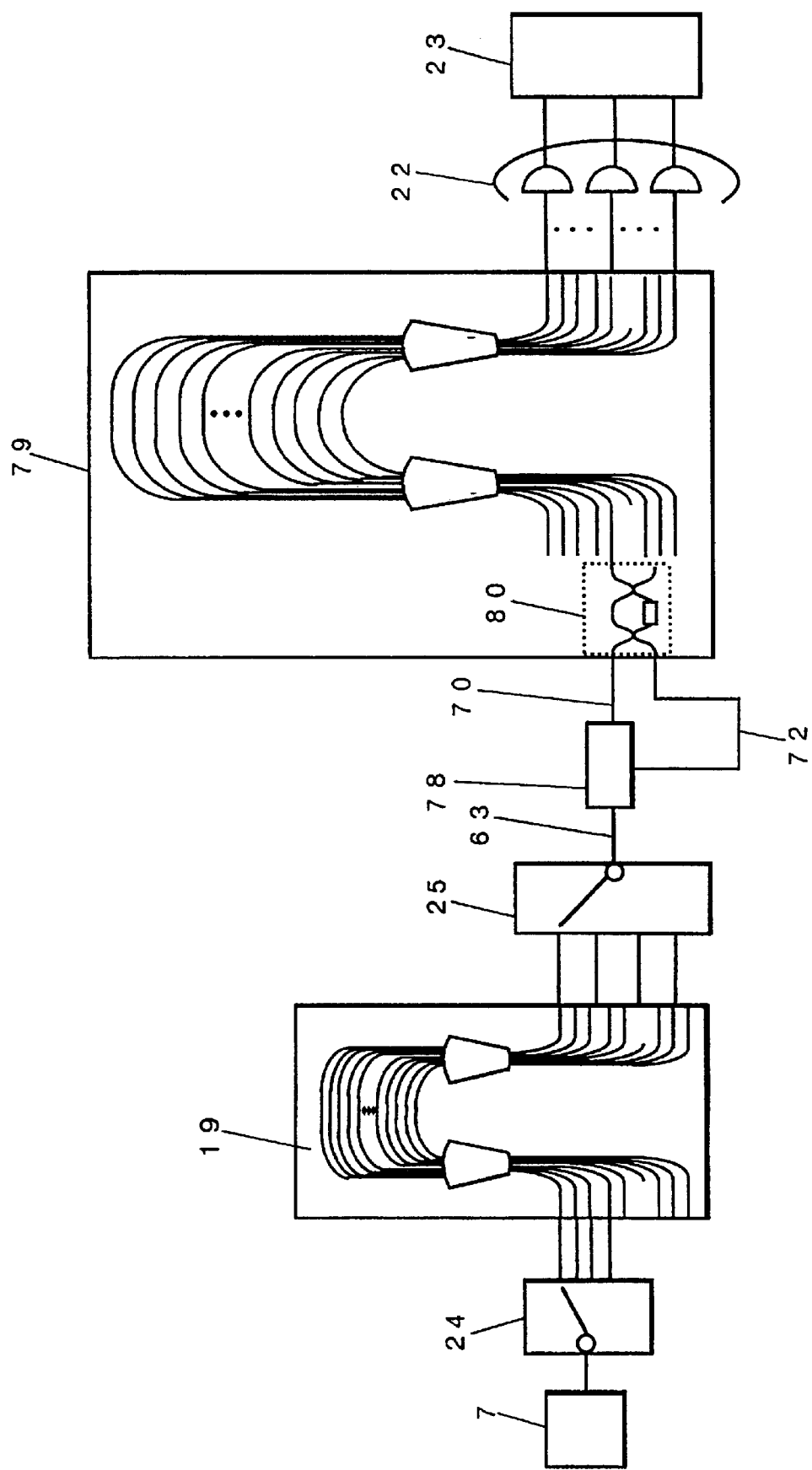
FIG. 28 shows a tenth embodiment of an optical spectrum analyzer using the wavelength division multi/demultiplexer according to this invention.
Figures 29A, 29B, 29C:
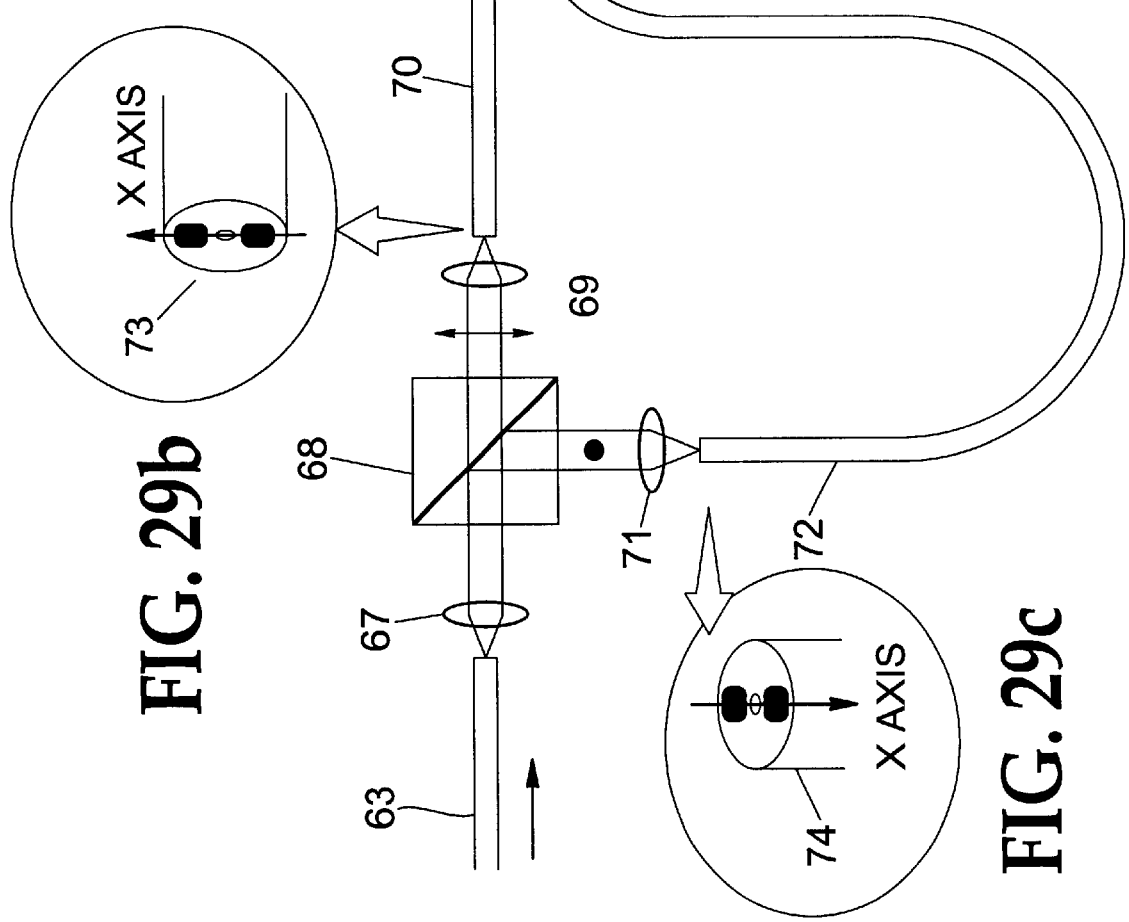
FIGS. 29(A), 29(B), 29(C) show a configuration of a polarization beam splitter module.

FIG. 28 shows a tenth embodiment of an optical spectrum analyzer using the wavelength division multi/demultiplexer according to this invention. This embodiment is obtained by reconstruct the ninth embodiment (FIG. 26) using an optical circuit 79 comprising the optical switch 75 and AWG 20 integrated on the same substrate. In FIG. 28, reference numeral 78 is a polarization beam splitter module using the optical fiber 63 as a light input end and the panda fibers 70 and 72 as light output ends. FIG. 29 shows a configuration of this module. FIG. 29(*a*) shows a configuration of the entire module, and FIGS. 29(*b*) and (*c*) show cross sections of the panda fibers. This module has a function of using the polarization beam splitter 68 to split output light from the optical fiber 63 into the P and S waves and propagating these waves through the panda fibers 70 and 72 as modes of the X axis holding polarization, respectively. In FIG. 28, the output ends of the panda fibers 70 and 72 are connected to the optical circuit 79 in such a way that the X axis holding polarization is parallel with the TE mode. Reference numeral 80 designates a Mach Zehnder interferometer type 2×1 optical switch with a thin-film heater installed on its arm, and the light input end #8 of the AWG 79 is connected to the light output end of this optical switch. The use of a mechanical optical switch as in the ninth embodiment may affect the longtime stability due to the mechanical abrasion of a movable portion. This embodiment, however, uses a waveguide optical switch to maintain the longtime stability of the polarization optical switch.

Figure 30:
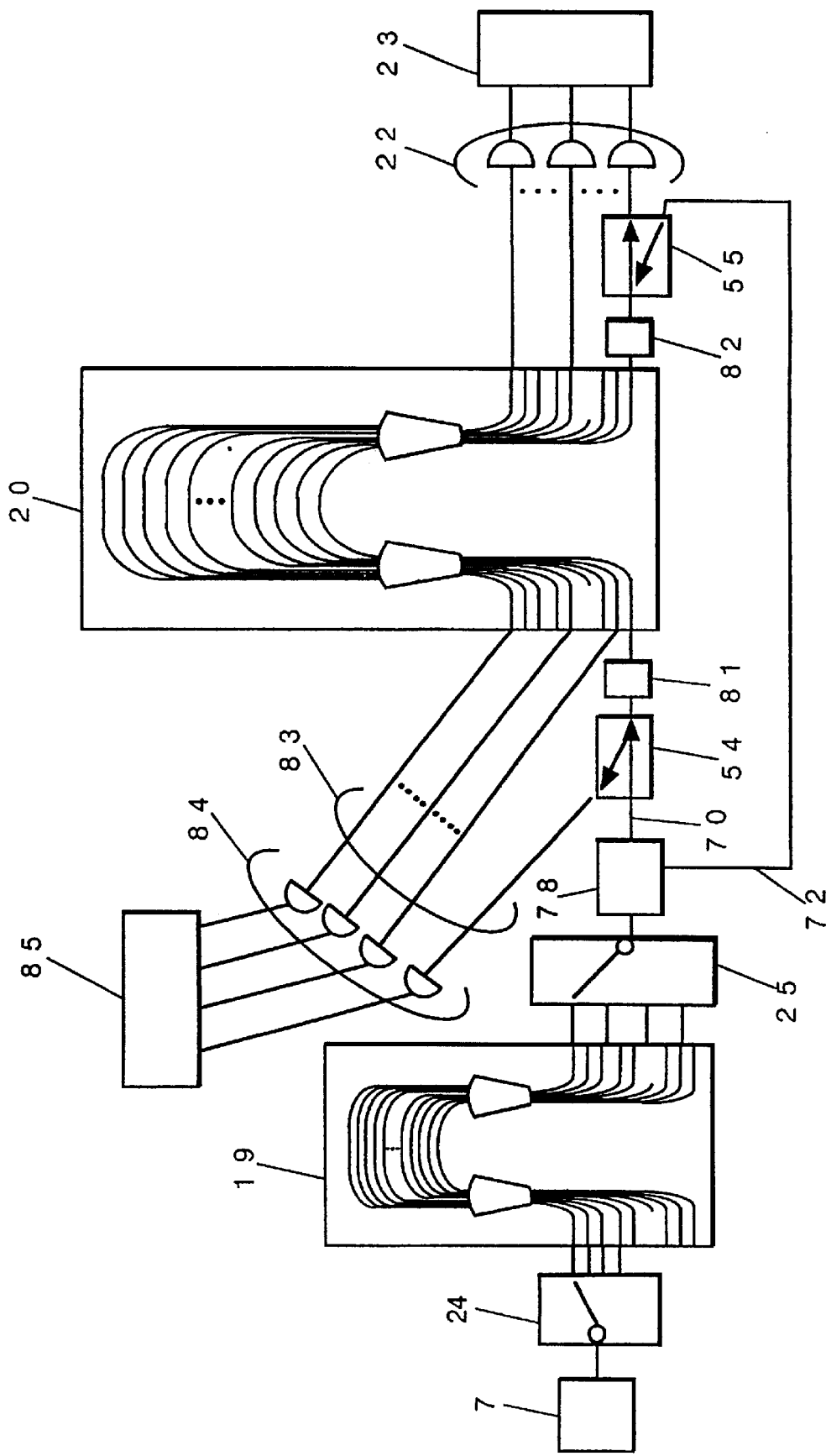
FIG. 30 shows an eleventh embodiment of an optical spectrum analyzer using the wavelength division multi/demultiplexer according to this invention.

FIG. 30 shows an eleventh embodiment of an optical spectrum analyzer using the wavelength division multi/demultiplexer according to this invention. This embodiment shows another configuration for using AWGs that depend on polarization to implement an optical spectrum analyzer that does not depend on polarization. Reference numeral 78 indicates a polarization beam splitter module having fiber optic incident and output ends, 54 and 55 are 3-port optical circulators, 81 and 82 are polarization controllers, 83 is an optical fiber array, 84 is a photodetector array, and 85 is a signal processing system. The polarization beam splitter 78 splits light into the P and S waves, which are then incident on the AWG 20 through the light input end #1 and the light output end #1 as the TE mode. The beams are then distributed to the light output and input ends, where they are captured by the respective fiber arrays. The photodetector arrays 22 and 84 then receive these beams and the signal processing systems 23 and 85 measure the respective optical powers. In this case, the optical circulators 54 and 55 are used to capture the beams distributed to the light input and output ends #1. Due to the lateral symmetry of the AWGs, when light is allowed to impinge on the light input and output ends #1, the same light frequency is distributed to the light output and input ends #i (i=1, 2, . . . , 16). Thus, by adding together the optical powers distributed to the light input and output ends of the same number, the sum of the light intensities of the P and S waves for this split light frequency, that is, the intensity of the incident light can be determined. Since the optical circulators 54 and 55 comprise normal optical fibers that do not hold polarization, the polarization of output light from these circulators is not always linear. Thus, the polarization controllers 81 and 82 are connected to the optical circulators to regulate the polarization state of the P and S waves propagating through the fibers so as to excite only the TE mode of the AWG 20. Even when the polarization state of incident light input on the AWG 20 is varied, this embodiment can maintain the variation of the intensity of the measured optical spectrum within ±0.3 dB.

Figure 31:
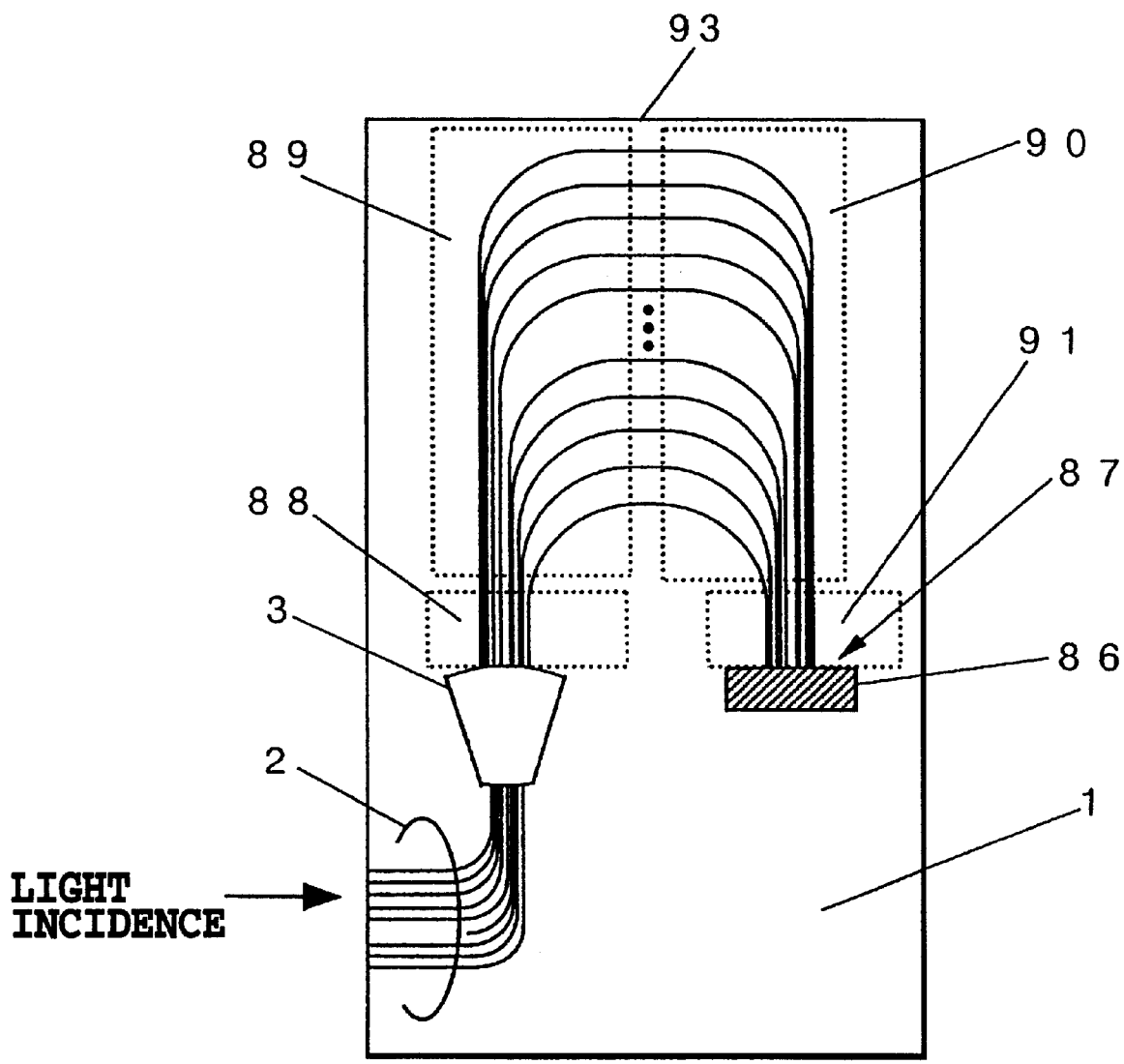
FIG. 31 shows a first embodiment of an arrayed waveguide multi/demultiplexing circuit preferred for the wavelength division multi/demultiplexing circuit according to this invention.
Figure 32:
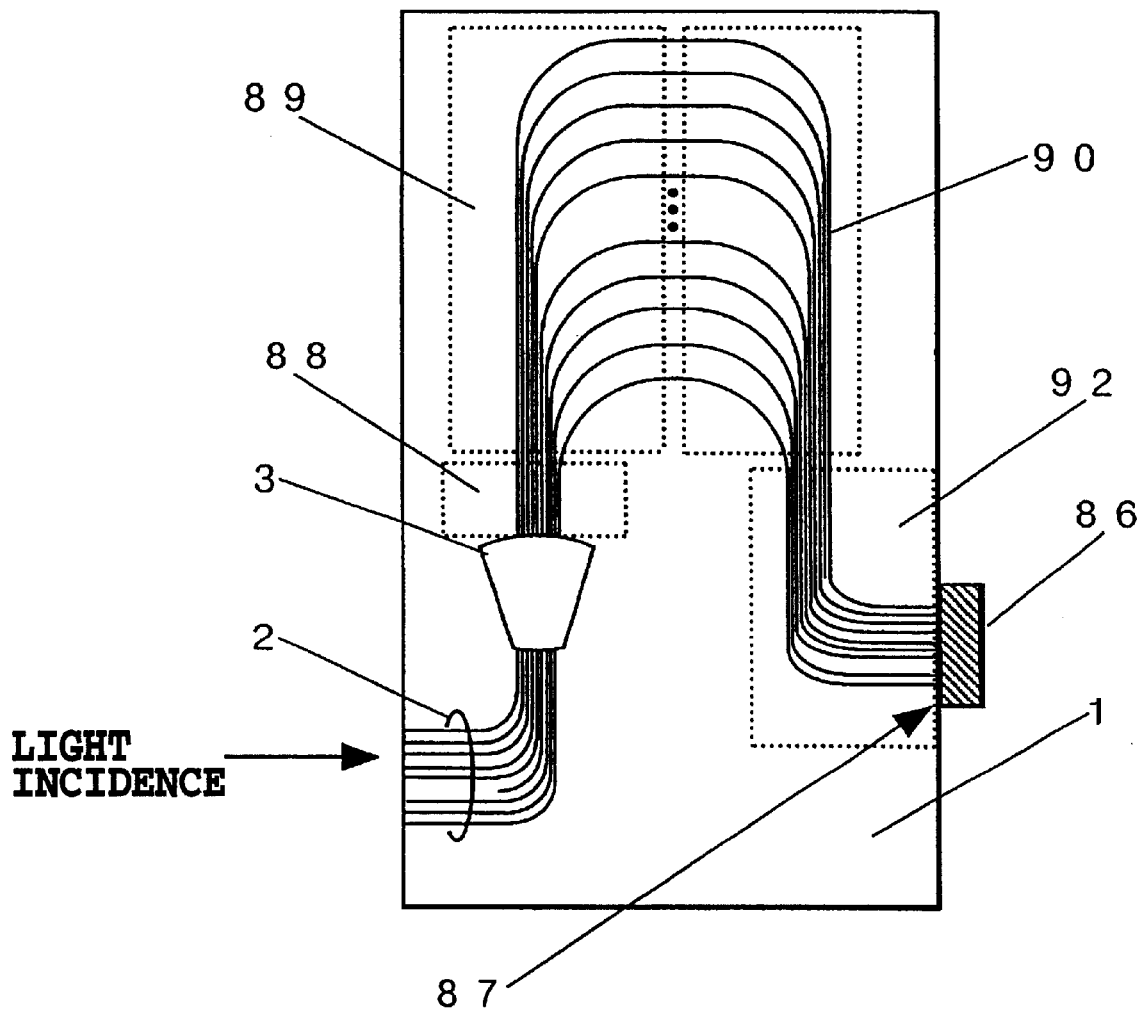
FIG. 32 shows a second embodiment of an arrayed waveguide multi/demultiplexing circuit preferred for the wavelength division multi/demultiplexing circuit according to this invention.

FIGS. 31 and 32 show a first and a second embodiments of arrayed waveguide optical multi/demultiplexing circuits preferred as wavelength division multi/demultiplexing circuits used for the wavelength division multi/demultiplexer according to this invention. In the embodiment in FIG. 31, parallel areas 88 and 91 in which the arrayed waveguides are parallel with one another are installed in the AWG, and a reflecting plate 86 is installed in a groove crossing each arrayed waveguides in the vertical direction, and the branching section 3 functions as a branching section. In the embodiment in FIG. 32, the parallel area 88 and a parallel area 92 in which the arrayed waveguides are parallel with one another are installed in the AWG, the reflecting plate 86 is installed in a gap crossing each arrayed waveguides in the vertical direction, and the branching section 3 functions as a branching section. In this case, a reflecting surface 87 of the reflecting plate 86 contacts each arrayed waveguide. The length between adjacent arrayed waveguides in the AWG and the design values for the branching section thereof are the same as in the AWG shown in FIG. 1. Light input on one of the group of light input ends 2 is distributed to each arrayed waveguide by the branching section. The distributed beams propagate through each arrayed waveguide in the order of the parallel area 88, a diverging region 89, a converging region 90, the parallel area 91 (FIG. 31) or parallel area 88, the diverging region 89, the converging region 90, the parallel area 92 (FIG. 32). The beams are then reflected by the reflecting plate 86 installed in the parallel area 91 or 92 and again propagate through each arrayed waveguide in the opposite direction. The propagated beams are mixed by the branching section 3 and then distributed to each light output end. The difference in optical-path length among the arrayed waveguides of the AWG is determined by the diverging region 89 and the converging region 90, so no extra difference in optical path occurs as long as the reflecting plate is installed in the parallel area perpendicularly to each arrayed waveguide.

According to this structure, the beams distributed to each arrayed waveguide by the branching section travel back and forth within the diverging and converging regions. When the beams that have propagated through each channel are mixed again by the branching section, the difference in optical path doubles compared to the conventional configuration shown in FIG. 1. This means that the channel spacing becomes half. The use of this reflecting AWG has been confirmed to double the spectrum resolution of the optical spectrum analyzer. In the configuration in FIG. 1, the length of the waveguides in the diverging and converging regions must be doubled in order to double the channel spacing. This means that the size of the substrate must be doubled compared to the prior art and that the process must thus be substantially improved. In addition, the larger substrate increases the variation of the spatial refractive index, thereby further increasing crosstalk between the channels. This invention enables an AWG having a double channel spacing compared to the prior art to be produced on a substrate of the conventional size, thereby eliminating the need to improve the process and preventing the variation of crosstalk between the channels.

Figure 33:
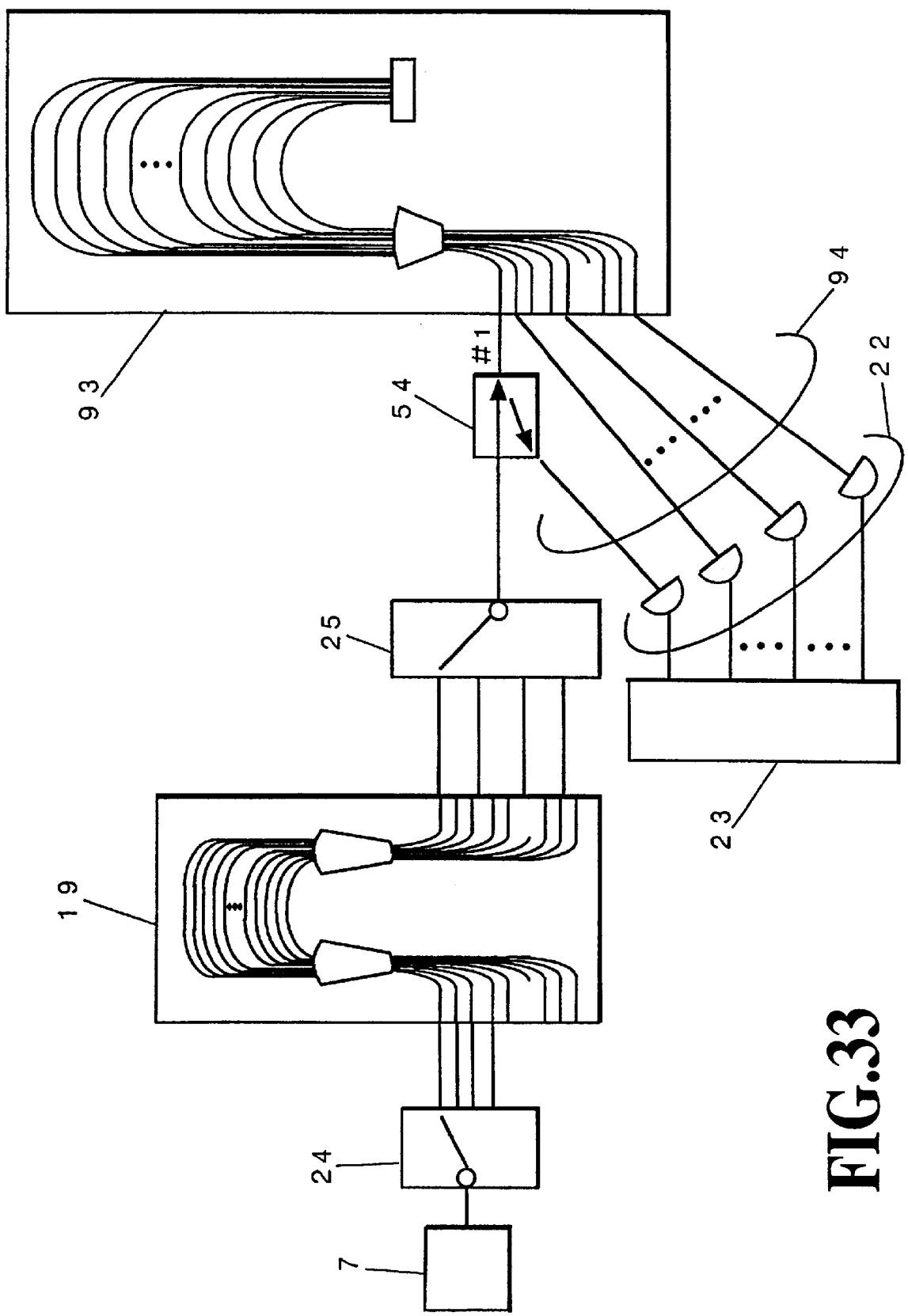
FIG. 33 shows a twelfth embodiment of an optical spectrum analyzer using the wavelength division multi/demultiplexer according to this invention.

FIG. 33 shows a twelfth embodiment of an optical spectrum analyzer using the wavelength division multi/demultiplexer according to this invention. This embodiment replaces the second AWG 20 in the first embodiment by the reflecting AWG 93 shown in FIG. 31. In this reflecting AWG, the light input ends also act as the light output ends, so the optical circulator 54 is connected to #1, which is used as the light input end. Light from the optical switch 25 passes through the optical circulator 54 and impinges on the reflecting AWG 93 through the input end #1. The beams distributed to the light input ends other than #1 are incident on the photodetector array 22 via the optical fiber array 94 and optical power for each demultiplexing frequency is then measured. The beam distributed to #1 propagates through the optical circulator 54 in the opposite direction and is then extracted through another port. Its optical power is measured by the one of the remaining photodetectors of the photodetector array. This embodiment is characterized in that the spectrum resolution is double that in the other embodiments, that is, 5 GHz.

Figure 34:
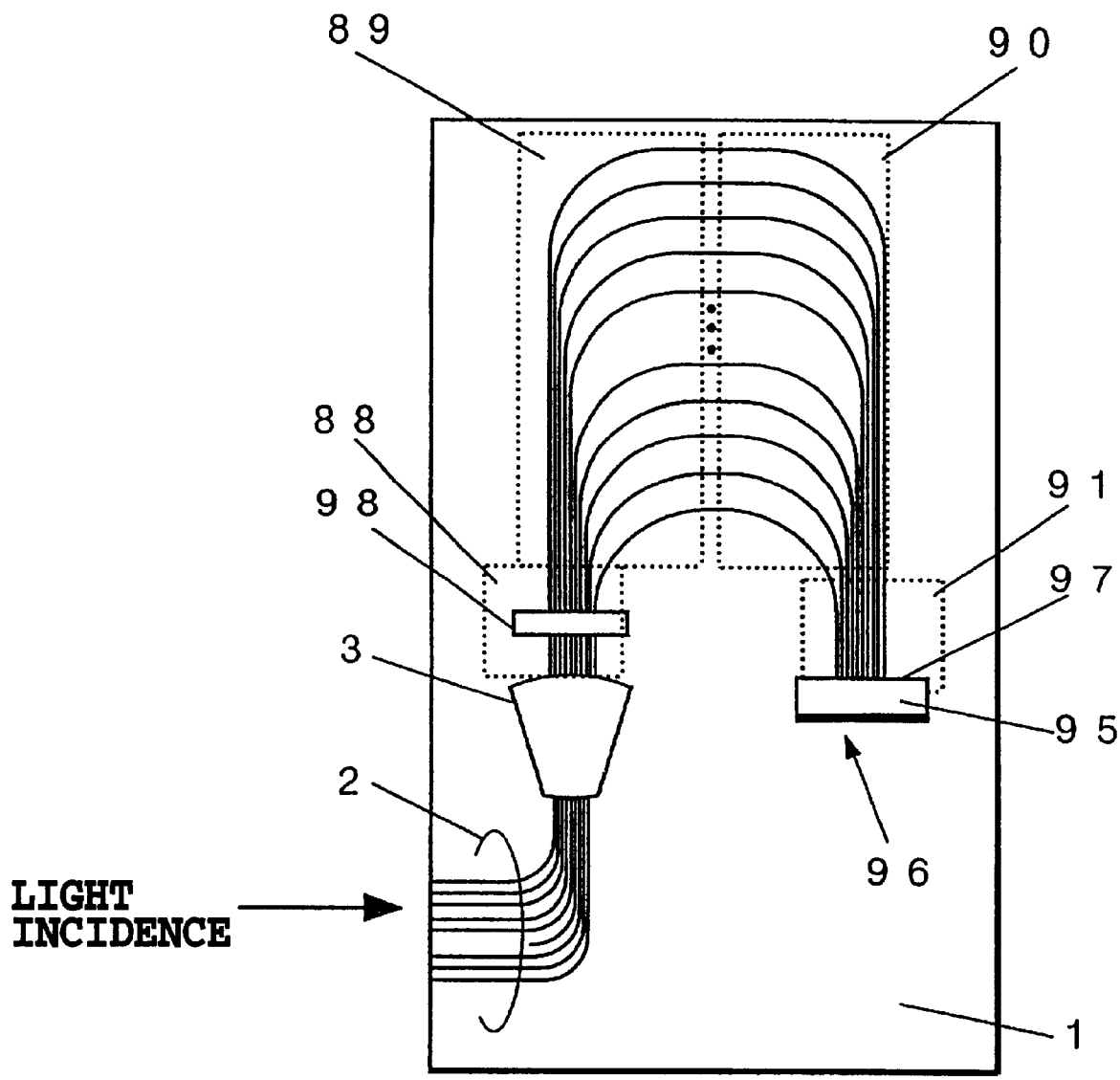
FIG. 34 shows a third embodiment of an arrayed waveguide multi/demultiplexing circuit preferred for the wavelength division multi/demultiplexing circuit according to this invention.
Figure 35:
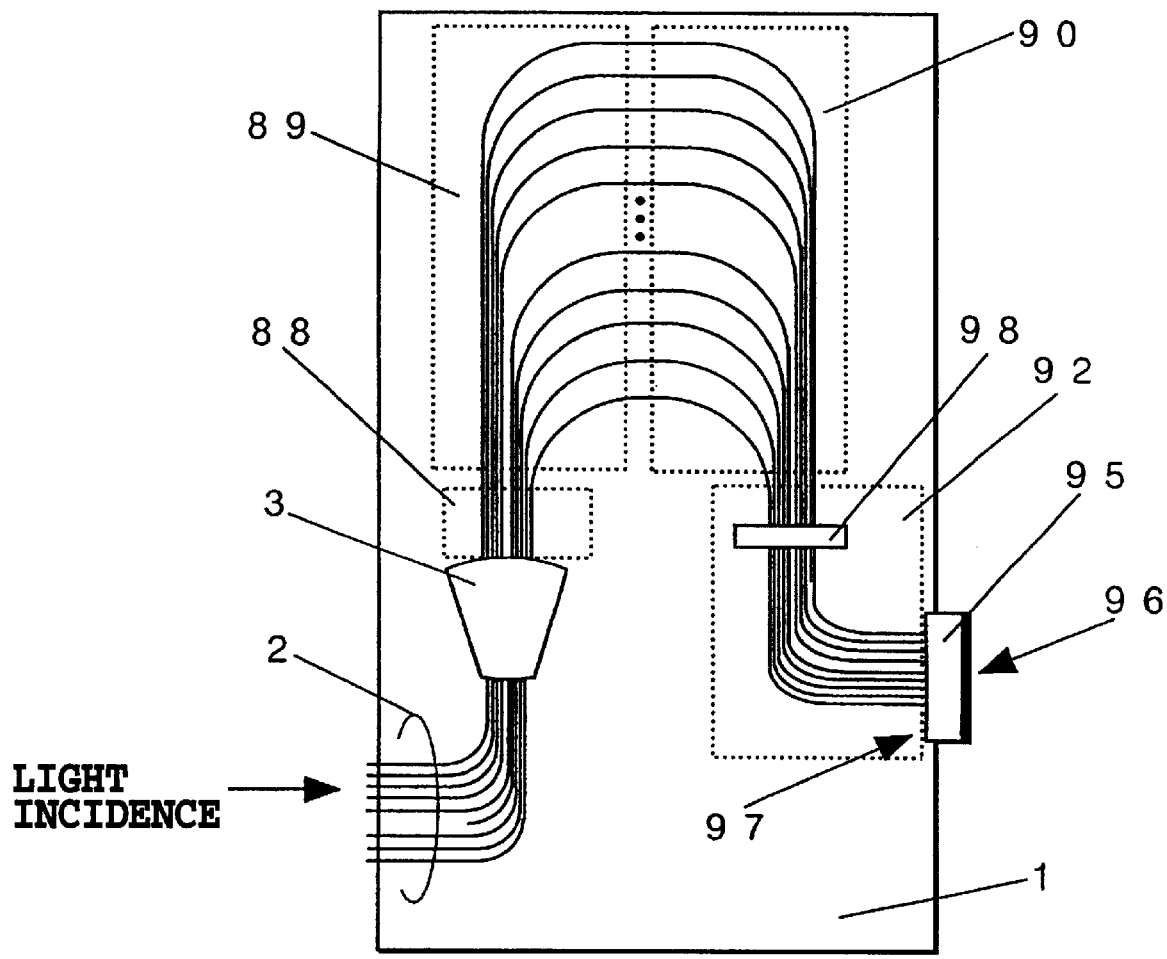
FIG. 35 shows a fourth embodiment of an arrayed waveguide multi/demultiplexing circuit preferred for the wavelength division multi/demultiplexing circuit according to this invention.

FIGS. 34 and 35 show a third and a fourth embodiments of arrayed waveguide multi/demultiplexing circuits preferred as wavelength division multi/demultiplexing circuits used for the wavelength division multi/demultiplexer according to this invention. In an AWG having a channel spacing close to 10 GHz, the received phase may differ between the TE and TM modes due to stress from the substrate, so the demultiplexing frequency or crosstalk may vary depending on polarization. In the embodiment in FIG. 34, the parallel areas 88 and 91 in which the arrayed waveguides are parallel with one another are installed in the AWG, grooves crossing each arrayed waveguide in the vertical direction are created in these parallel areas, and a λ/4 plate 95 and a phase plate 98 for phase trimming are installed in these grooves. In the embodiment in FIG. 35, the parallel areas 88 and 92 in which the arrayed waveguides are parallel with one another are installed in the AWG, gaps crossing each arrayed waveguide in the vertical direction is created in these parallel areas, and the quarter-wave plate 95 and the phase plate 98 for phase trimming are installed in these gaps. Reference numeral 96 designates a reflecting surface of the quarter-wave plate, and 97 is its non-reflecting surface. The third and forth embodiments of arrayed waveguide multi/demultiplexing circuits are reflecting AWGs having structures similar to the first and second embodiments of arrayed waveguide multi/demultiplexing circuits. The former embodiments, however, are characterized in that the wavelength demultiplexing characteristic of AWG does not depend on polarization. The quarter-wave plate is installed in such a way as to cross all arrayed waveguides in the vertical direction and has a first principal axis at 45° from the direction of the TE mode. The phase difference occurring when light polarized toward a second polarizing axis orthogonal to the first polarizing axis is π/2. In the arrayed waveguide multi/demultiplexing circuits of the first and second embodiments, the surface opposed to the arrayed waveguides is processed into a reflecting mirror, whereas in the arrayed waveguide multi/demultiplexing circuits of the third and fourth embodiments, the surface 97 of the wavelength plate 95 facing the arrayed waveguides is subjected to non-reflective coating and a reflecting mirror for reflecting light is formed on the opposed surface 96 by means of evaporation.

In the embodiment in FIG. 34, light in the TE mode impinging on one of the group of light input ends 2 propagates through the arrayed waveguide as the TE mode as the TE mode in the order of the parallel area 88, diverging region 89, converging region 90, and parallel area 91, which are enclosed by the dotted line. In the embodiment in FIG. 35, the light similarly propagates through the arrayed waveguide as the TE mode in the order of the parallel area 88, diverging region 89, converging region 90, and parallel area 92. In this manner, the light propagates through the quarter-wave plate 95 installed in the parallel area 91 or 92. In this case, since the principal axis of the quarter-wave plate faces in the direction 45° from the principal axis of the TE mode, the propagated light is converted from the linearly polarized light (TE mode) to circularly polarized light after propagation through the quarter-wave plate. The circularly polarized light is totally reflected by the reflecting surface 96 provided on the output end side of the wavelength plate and again propagates through the wavelength plate in the opposite direction. After propagation through the quarter-wave plate, the propagated light is converted from the circularly polarized light to linearly polarized light in the TM mode. The light in the TM mode propagates through the arrayed waveguide in the opposite direction in the order of the parallel area, diverging region, converging region, and parallel area, and is then split by the branching section 3.

On the other hand, light in the TM mode impinging on the light input end is propagated by the branching section 3 through the arrayed waveguide as the TM mode in the order of the parallel area, diverging region, converging region, and parallel area. In this manner, the light propagates through the quarter-wave plate 95. The propagated light is then converted from the linearly polarized light (TM mode) to circularly polarized light. The circularly polarized light is reflected by the reflecting surface 96 provided on the output end side of the quarter-wave plate and again propagates through the wavelength plate in the opposite direction. The propagated light is then converted from the circularly polarized light to linearly polarized light in the TE mode. The light in the TE mode propagates through the arrayed waveguide in the opposite direction, and is then split by the branching section 3. Thus, the light input as the TE mode propagates forward in the TE mode and backward in the TM mode, whereas the light input as the TM mode propagates forward in the TM mode and backward in the TE mode. That is, when the incident light is split into the TE and TM modes, any light propagates through the arrayed waveguide in both TE and TM modes, thereby preventing the wavelength demultiplexing characteristic of the reflecting AWG from depending on the polarization state. Of course, the arrayed waveguide multi/demultiplexing circuits shown in FIGS. 34 and 35 can be replaced by the reflecting AWG of the embodiment shown in FIG. 33.

Figure 36:
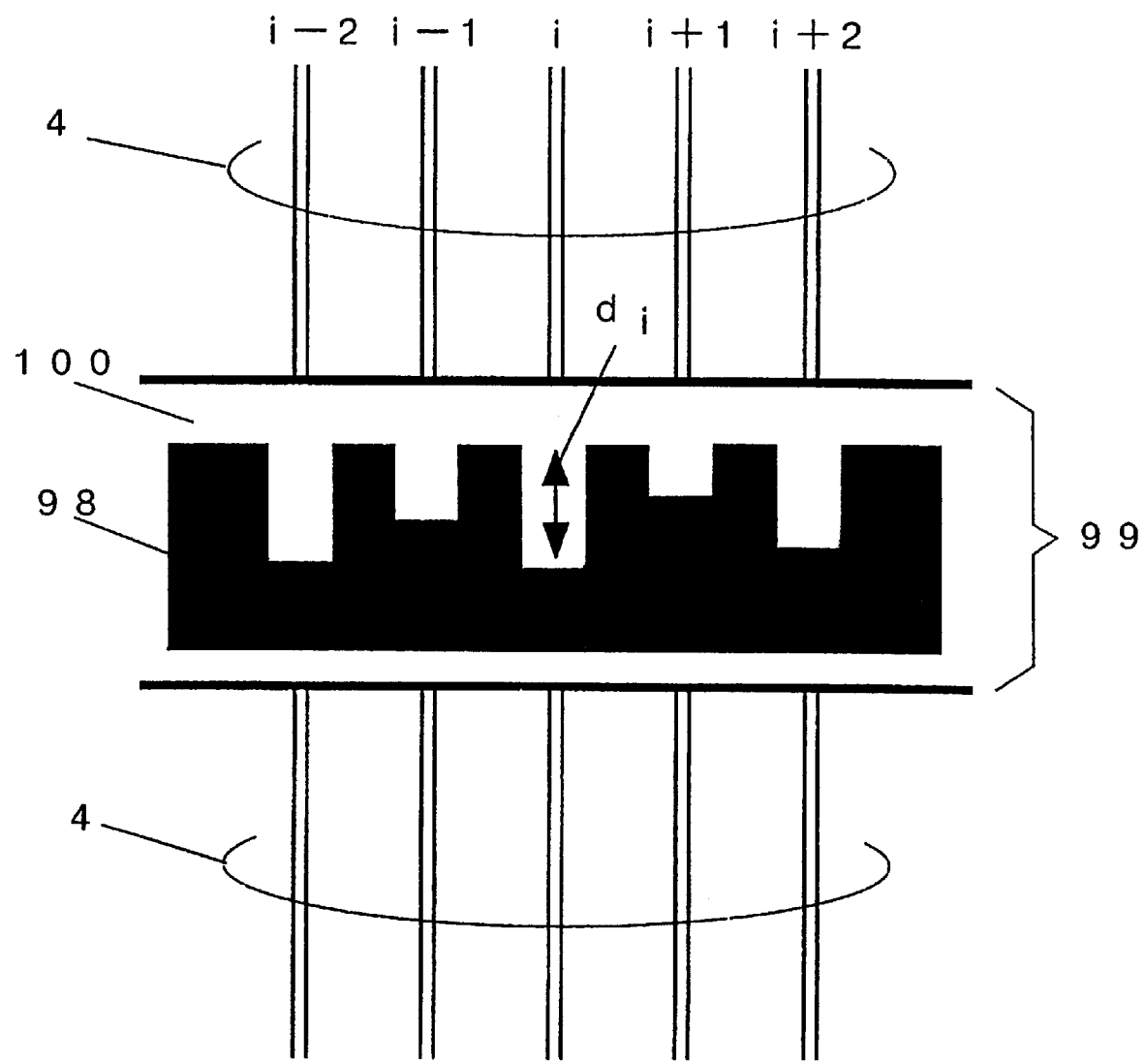
FIG. 36 shows the location of a phase compensating plate.

In addition, a phase compensating plate 98 is installed in the parallel area. The phase compensating plate has a function of reducing crosstalk between the channels. FIG. 36 shows the locational relationship between the arrayed waveguides and the phase compensating plate. Reference numeral 99 denotes a groove crossing all arrayed waveguides in the vertical direction, and the phase compensating plate 98 comprising a polyimide film is installed in this groove. Light propagating through each channel is emitted from the groove and propagates through the phase compensating plate and then again through the corresponding arrayed waveguide. The groove has a width of several μm and is filled with an index matching oil 100 having the same refractive index as the waveguides. Consequently, the spot size of output light from each arrayed waveguide undergoes almost no variation, and the light can be coupled to the corresponding arrayed waveguide with a low loss after propagation through the phase compensating plate In this case, a groove of depth $d_i$ extending perpendicularly to the sheet of this drawing is formed in the thin film through which output light from each arrayed waveguide i propagates. When the phase compensating plate is inserted into the groove, a phase $\phi_i=2\pi d_i (n_a-n_p)/\lambda$ is newly introduced into this arrayed waveguide. In this case, $n_a$ and $n_p$ are the effective refractive indices of the index matching oil and the phase compensating plate, respectively. In the reflecting AWG, light propagates through this compensating plate twice, so the arrayed waveguide i has a phase $2\phi_i$. Essentially, if the length of the waveguides is exactly as designed, no crosstalk occurs between the channels. A small "deviation" from the design value, however, may manifest as a phase error $\Phi_i$, which may cause crosstalk between the channels of the reflecting AWG. Accordingly, adjusting the depth $d_i$ of the groove so that $2\phi_i+\phi_i=0$, the phase error occurring in each arrayed waveguide can be canceled. When experiments were made for an AWG of channel spacing 5 GHz, the insertion of the phase compensating plate successfully reduced channel crosstalk from −20 dB to −30 dB. This phase control method is reported in the following document: H. Yamada, K. Takada, Y. Inoue, and S. Mitachi, "Low-crosstalk arrayed-waveguide grating multi/demultiplexer with phase compensating plate," Electron. Lett. vol. 33, No. 20, pp. 1698–1699 (1997).

Figure 37:
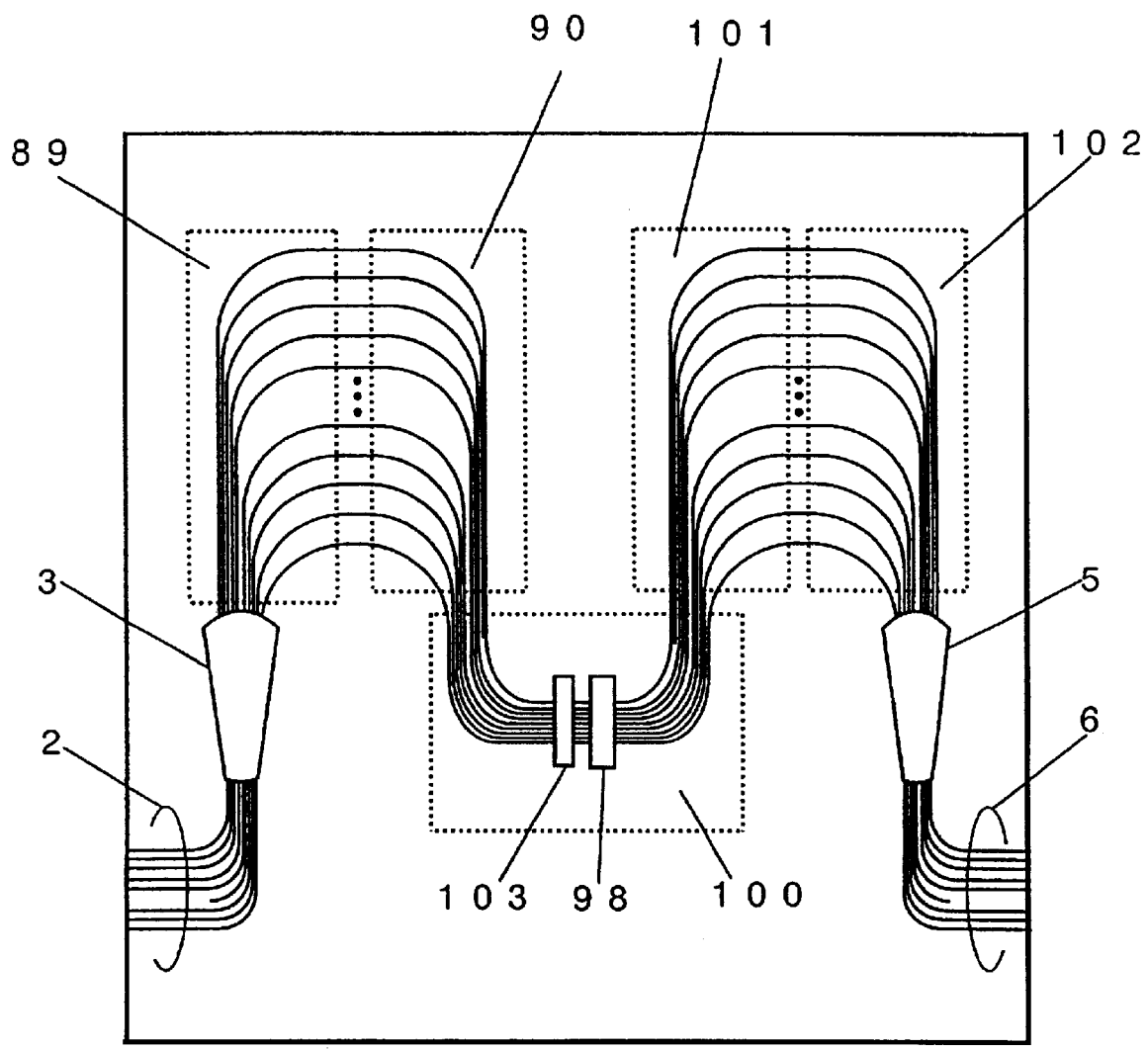
FIG. 37 shows a fifth embodiment of an arrayed waveguide multi/demultiplexing circuit preferred for the wavelength division multi/demultiplexing circuit according to this invention.

FIG. 37 shows a fifth embodiment of an arrayed waveguide type optical demultiplexing circuit preferred as a wavelength division multi/demultiplexing circuit used for the wavelength division multi/demultiplexer according to this invention. Reference numeral 103 indicates a half-wave plate. This AWG is composed of the diverging region 89 in which the arrayed waveguides diverge, the converging region 90 in which the arrayed waveguides converge together, a parallel area 100 in which the arrayed waveguides are parallel with one another, a diverging region 101 in which the arrayed waveguides diverge, and a converging region 102 in which the arrayed waveguides converge together. The design parameters for the diverging and converging regions are the same as in the AWG of channel spacing 10 GHz used in the above embodiments. According to this embodiment, the optical-path length between the channels is doubled compared to the prior art, so the channel spacing is 5 GHz. A half-wave plate 103 and the phase compensating plate 98 are installed in the parallel area occupying the intermediate point of the arrayed waveguides. In this case, the principal axis of the half-wave plate 103 is installed at 45° from the TE mode of the waveguides. Accordingly, light propagating through the light input end 2 as the TE mode is converted into the TM mode by this half-wave plate and then continues propagating as the TM mode until it reaches the output end. The light propagating to the light input end as the TM mode is converted into the TE mode by the half-wave plate 103 prior to propagation. Thus, by installing the half-wave plate at the intermediate point of the arrayed waveguides, light propagates through the arrayed waveguide in both TE and TM modes, thereby preventing the wavelength demultiplexing characteristic from depending on the wavelength. In addition, the phase compensating plate 98 compensates for the deviation from the design value of the optical-path length of each arrayed waveguide, thereby reducing crosstalk between the channels.

Figure 38:
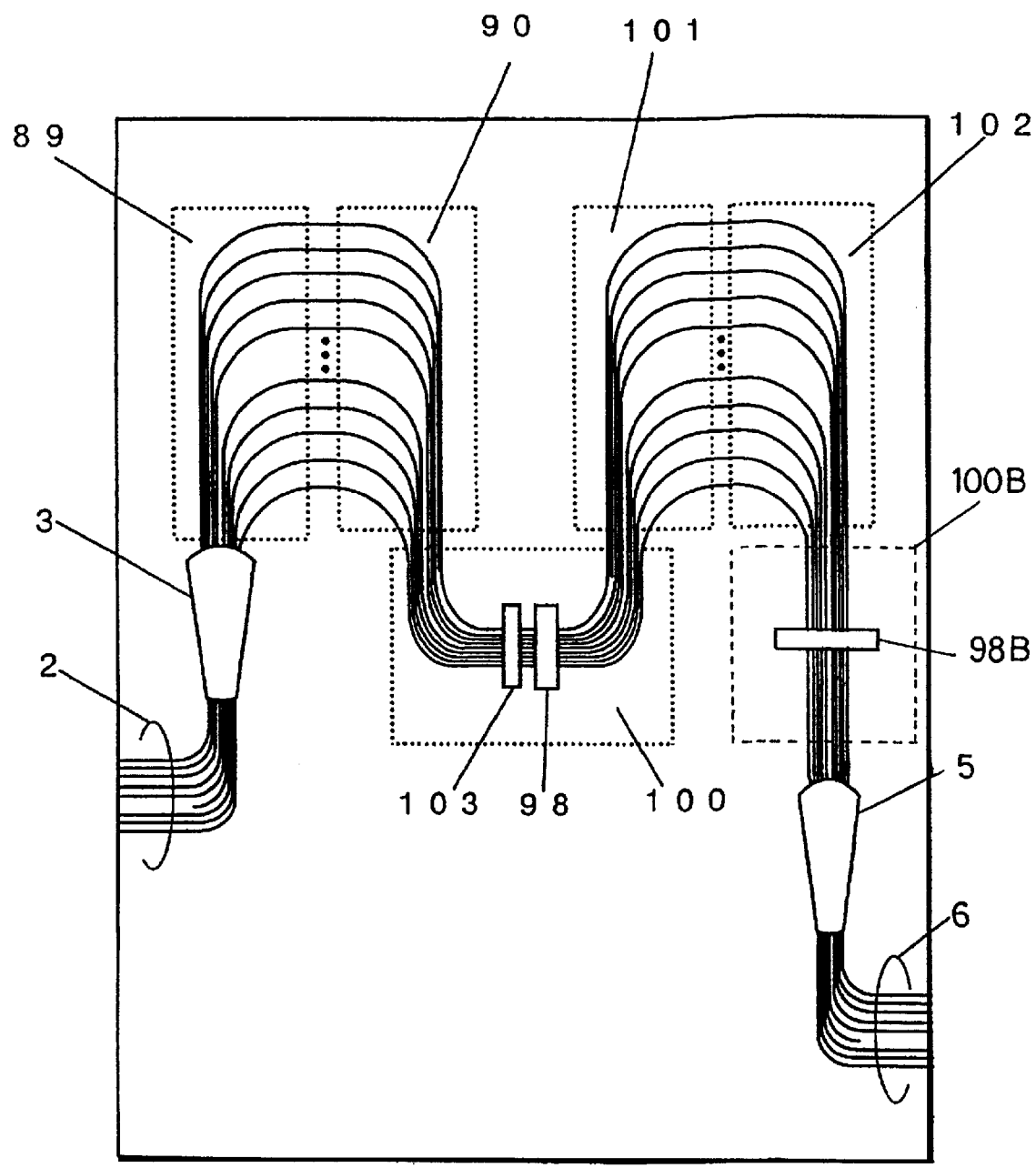
FIG. 38 shows a variation of the wavelength division multi/demultiplexing circuit according to this invention shown in FIG. 37.

Instead of the half-wave plate 103 and phase compensating plate 98 provided in the parallel area 100 placed at the intermediate point of the arrayed waveguides, a second parallel area 100B in which the arrayed waveguides are parallel with one another can be separately provided in the parallel area 100 between the second converging region 102 and the second mixing and branching section 5, as shown in FIG. 38. Then, a phase compensating plate 98B can be provided in the second parallel area 100B.

Figure 39:
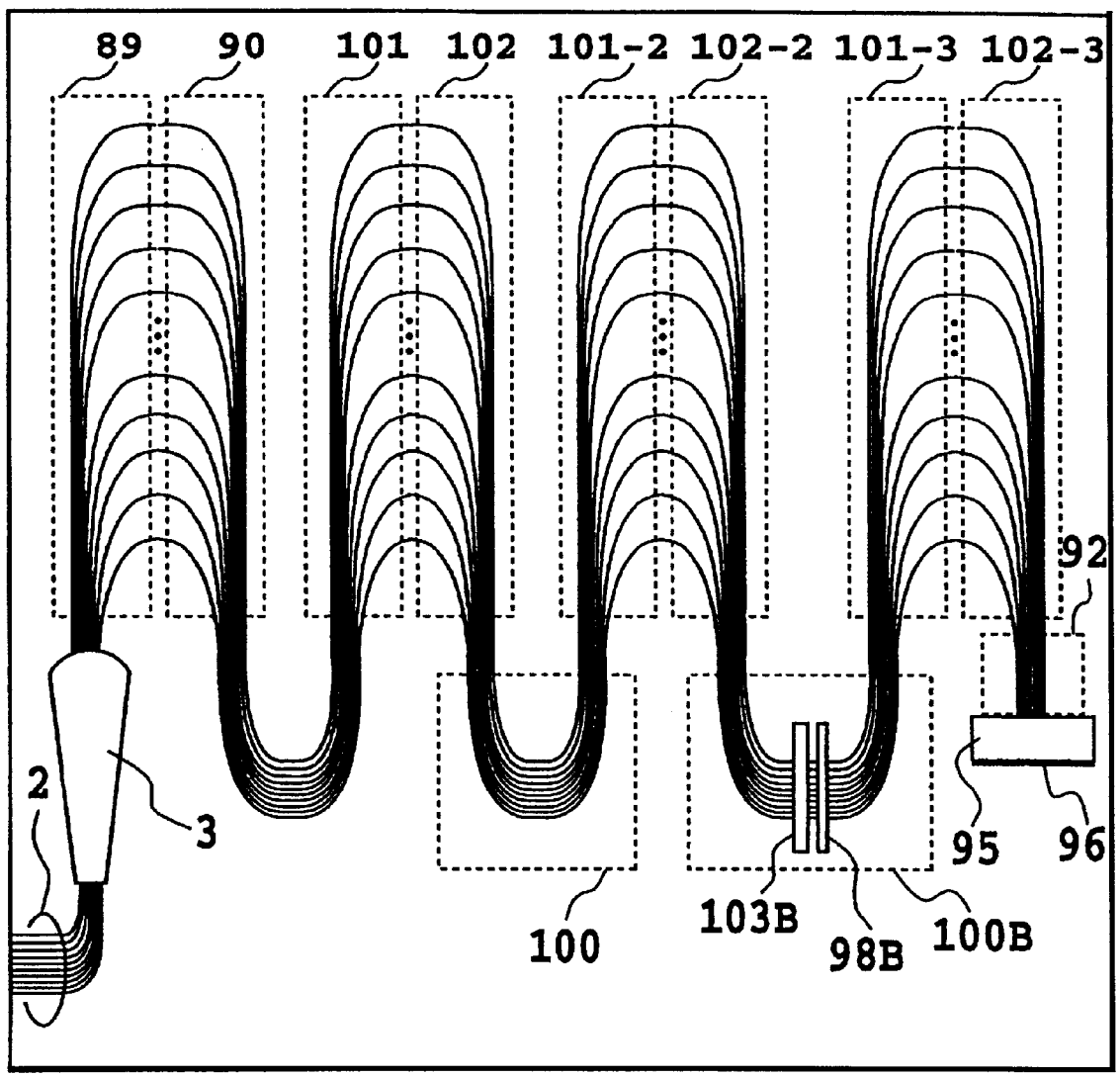
FIG. 39 shows a variation of the wavelength division multi/demultiplexing circuit according to this invention shown in FIG. 37.

Alternatively, an arrayed waveguide grating type wavelength division multi/demultiplexer including an arrayed waveguide having at least two diverging regions and at least two converging regions can be configured in such a way that a parallel area 100B similar to the parallel area 100, which is connected to the diverging region 101-2, is connected to the second converging region 102-2 shown in FIG. 39, that this parallel area 100B is connected to a diverging region 101-3 similar to the diverging region 101 or 101-2 and a converging region 102-3 similar to the converging region 102, and that the converging region 102-3 is connected to the second mixing and branching section 5 shown in FIG. 37.

In this case, on the side of the output of the second mixing and branching section 5, the reflecting end 96 and the quarter-wave plate 95 can be disposed at the terminal of the parallel area 92 to form reflecting arrayed waveguides.

An optical bandpass filter according to this invention uses the wavelength division multi/demultiplexer used in the optical spectrum analyzer shown in the above embodiments, wherein its light input end is a light input end on which output light from the light source impinges, and wherein its light output end is a specific light output or input end of the final wavelength division multi/demultiplexing circuit. Alternatively, when the number of specific light input and output ends of the final wavelength division multi/demultiplexing circuit is defined as N, these N optical terminals and N light input ends of an N×1 optical switch are connected together and the output end of this optical switch is used as the light output end of the optical bandpass filter.

Figure 40:
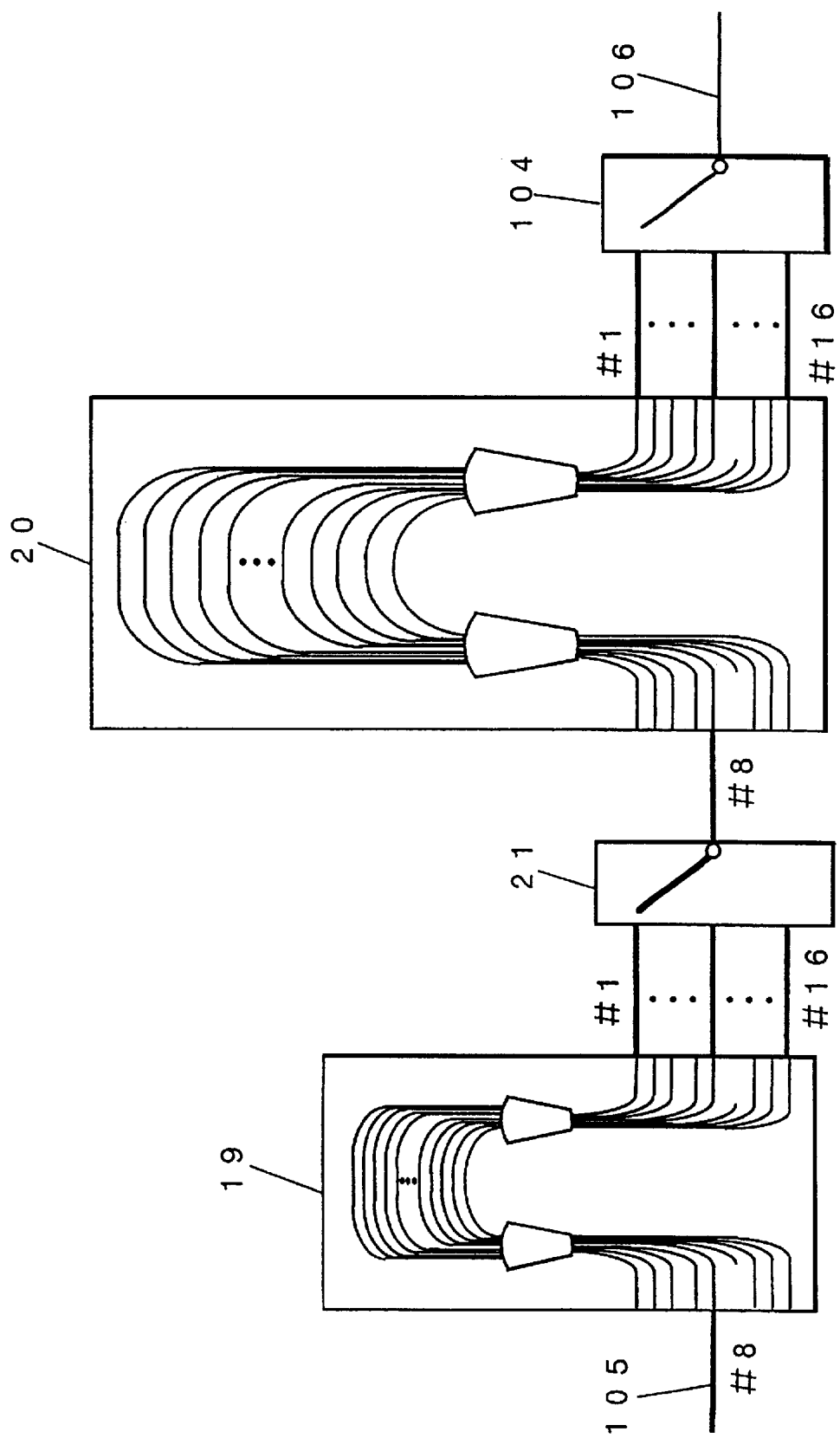
FIG. 40 shows a first embodiment of an optical bandpass filter according to this invention.

FIG. 40 shows a first embodiment of the optical bandpass filter according to this invention. Reference numeral 104 indicates a 16×1 optical switch, 105 is an optical fiber connected to the light input end #8 of the AWG 19, and 106 is an optical fiber used as the light output end of the 16×1 optical switch. Reference numerals 19 and 20 designate the 16×16 AWGs used in the first embodiment and having a channel spacing of 100 and 10 GHz, respectively. As in the first embodiment of the optical spectrum analyzer shown in FIG. 9, the operational principle of this optical bandpass filter differs from that of conventional optical bandpass filters in that when the AWG 20 slices the spectrum of output light from the light source, the AWG 19 is used that meets the bandwidth condition in Equation (1) to remove light frequencies offset from the required frequency by an integer multiple of the $FSR_2$. The 16 light output ends of the AWG 19 are connected to the light input end #8 of the AWG 20 by the 16×1 optical switch.

Figure 41:
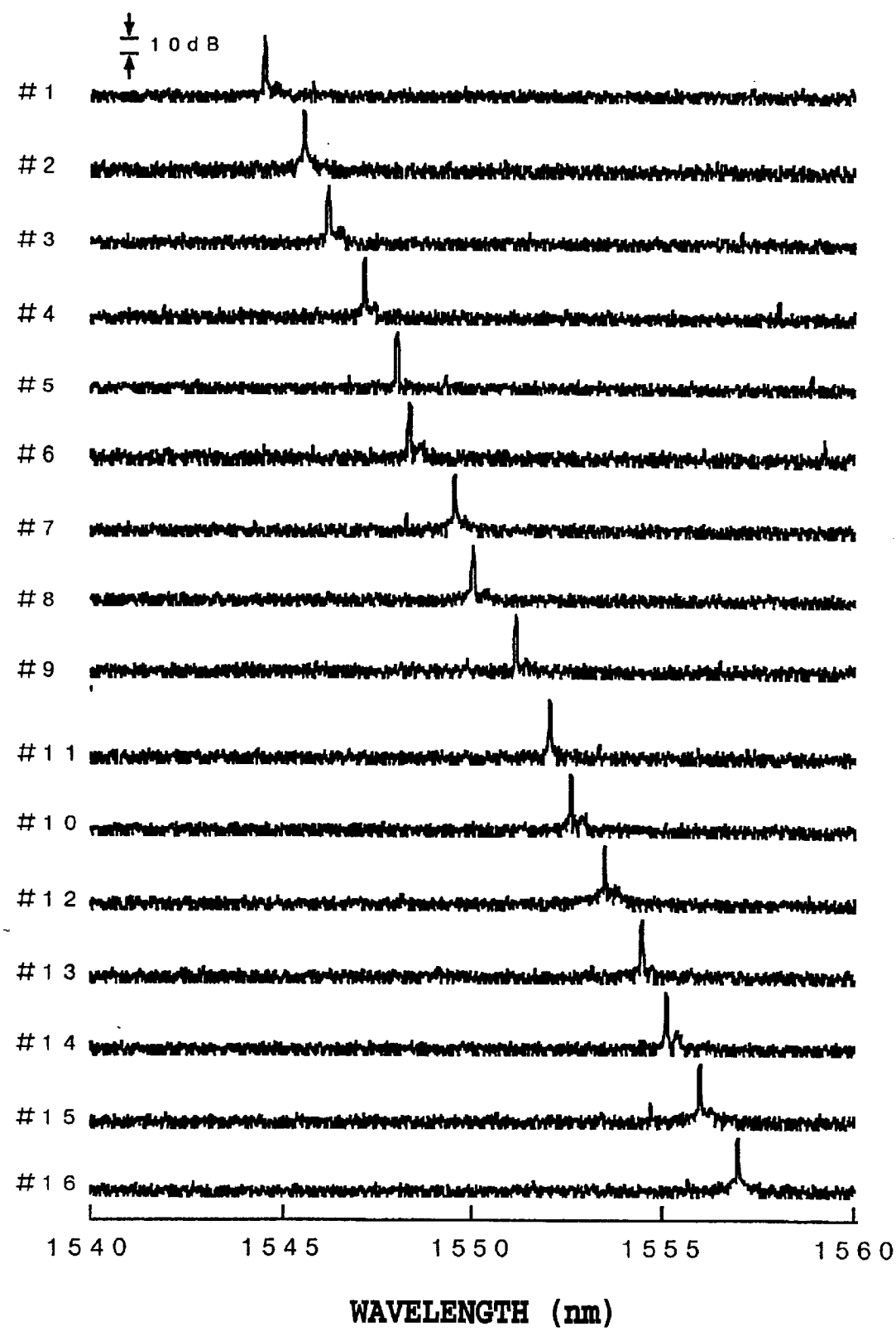
FIG. 41 shows representative optical-band characteristics according to a nineteenth embodiment.

FIG. 41 shows typical transmission bands according to this embodiment. Reference numerals #1, #2, ..., #16 in FIG. 41 indicate that these transmission bands are obtained when the light output ends #1, #2, ... #16 of the leading AWG 19 are selected. As is clear from this figure, this configuration provides a narrowband optical bandpass filter having a spectrum resolution equal to the channel spacing of 10 GHz, and an available wavelength range between 1543 and 1557 nm, that is, equal to the free spectral range $FSR_1$ of the leading AWG 19, namely, 1.6 THz.

Figure 42:
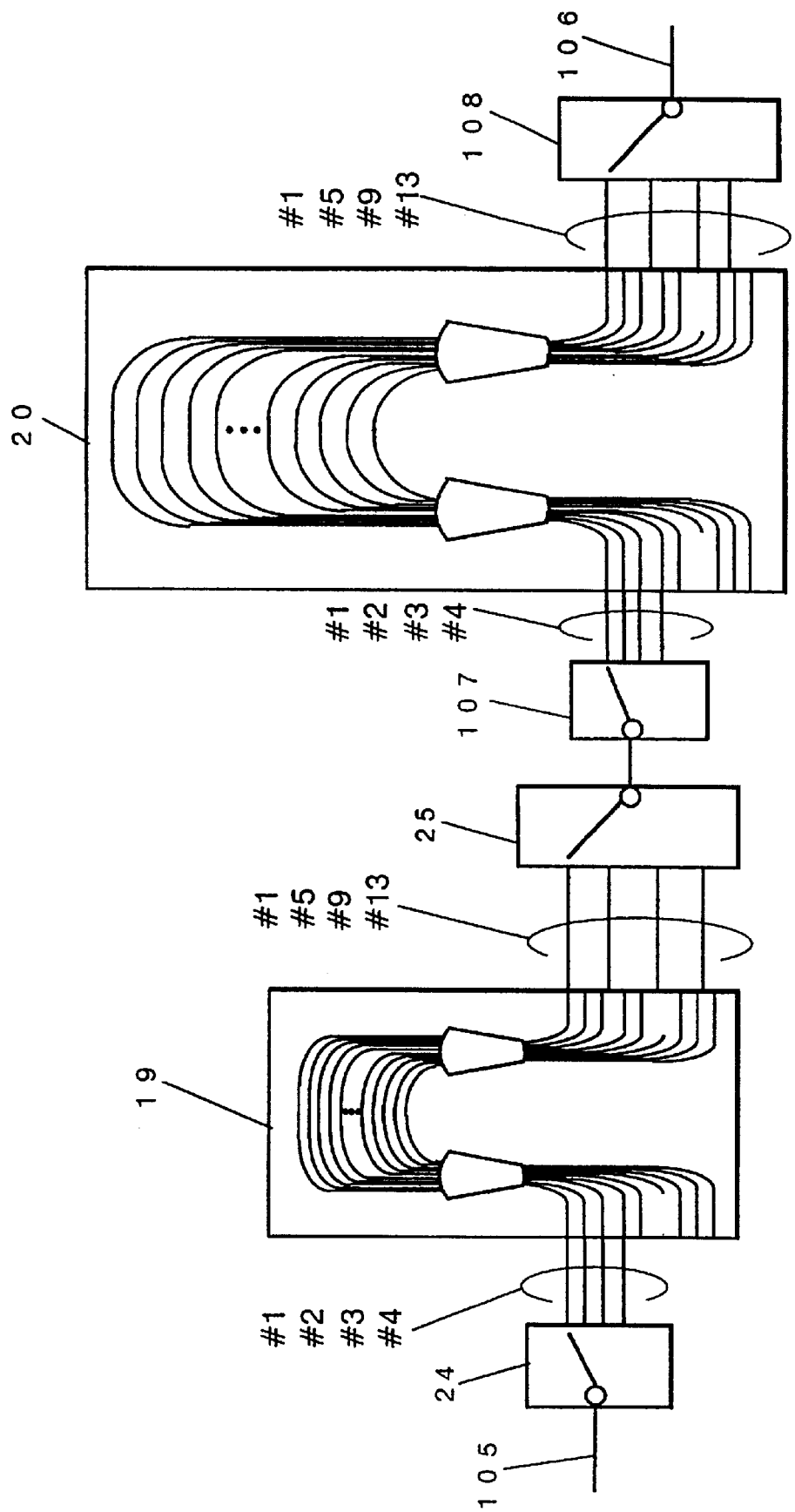
FIG. 42 shows a second embodiment of an optical bandpass filter according to this invention.

FIG. 42 shows a second embodiment of the optical bandpass filter according to this invention. This embodiment is characterized in that the function provided by the optical switches 21 and 104 in the embodiment in FIG. 40 is instead executed by 4×1 optical switches 25, 108 and 1×4 optical switches 24 and 107. The light output ends of the optical switches 24 and 107 are connected to the light input ends #1, #2, #3, #4 of the AWGs 19 and 20, respectively, and the light input ends of the optical switches 25 and 108 are connected to the light output ends #1, #5, #9, #13, respectively. This is because all 16 transmission bands that can be split by the AWG can be uniquely selected by selecting for each AWG four light input ends and four light output ends. A system can be constructed using small-scale optical switches if these switches are configured by connecting 1×2- or 2×1-based optical switches together like a tree or cascading them together.

Figure 43:
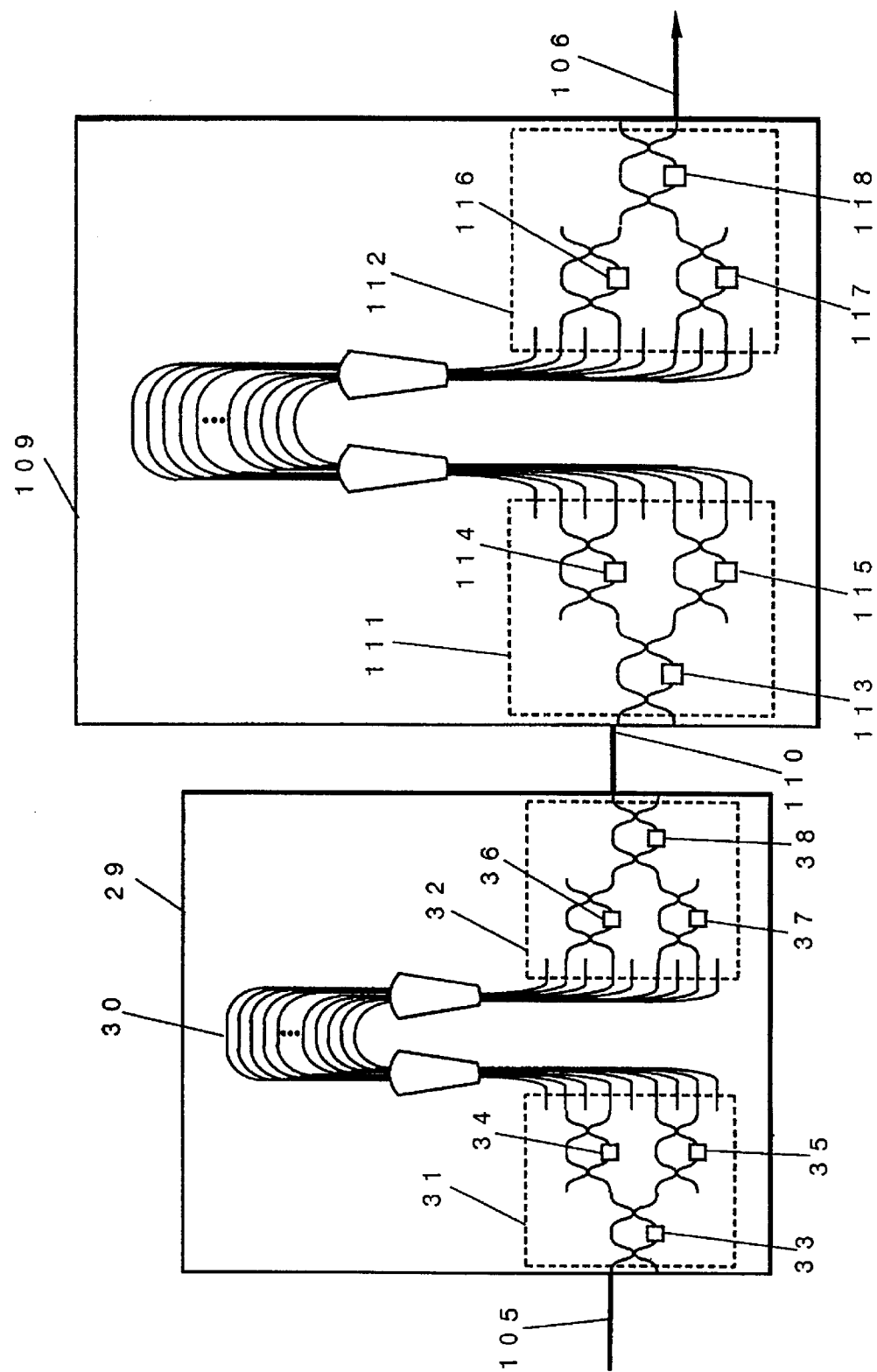
FIG. 43 shows a third embodiment of an optical bandpass filter according to this invention.

FIG. 43 shows a third embodiment of the optical bandpass filter according to this invention. This embodiment shows an optical bandpass filter comprising optical circuits 29 and 109 each comprising an AWG produced on the same substrate and sandwiched by a 1×4 and a 4×1 optical switches, wherein the optical circuits 29 and 109 are connected by an optical fiber 110, and wherein the optical fiber 105 connected to the optical switch 31 acts as the light input end while the optical fiber 106 connected to an optical switch 112 on the output side of the optical circuit 109 functions as the light output end. Bulk-type optical switches requires a large space to lead the fiber optic pigtails at both ends. This configuration, however, is advantageous in that since all optical circuits are produced on the same substrate, the size can be substantially reduced while the characteristics of the apparatus are maintained. In this case, 111 and 112 denote a 1×4 and a 4×1 optical switches respectively, and 113 to 118 denote thin-film heaters for optical switching.

Figure 44:
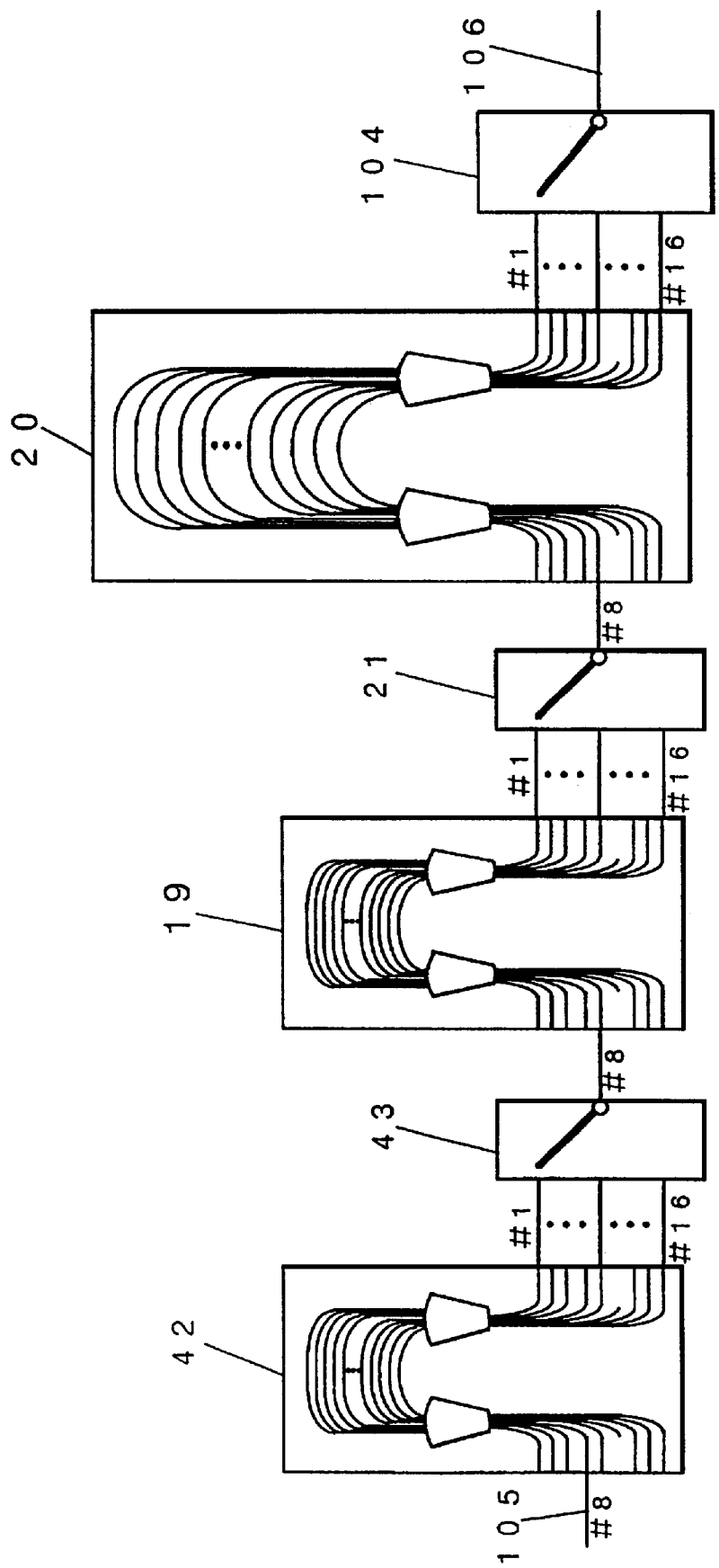
FIG. 44 shows a fourth embodiment of an optical bandpass filter according to this invention.

The fourth embodiment of the optical bandpass filter according to this invention shown in FIG. 44 comprises a wavelength division multi/demultiplexer composed of the 3-stage cascaded wavelength division multi/demultiplexing circuits 42, 19, and 20 that meet the bandwidth condition. According to this embodiment, in the sixth embodiment of the optical spectrum analyzer shown in FIG. 23, the 16×1 optical switch 104 is connected to the light output end of the final AWG 20. By using the optical switch 104 to sequentially optically connect each light output end #1, #2, ..., #16 and the fiber optic pigtail 106 together according to the states of optical switches 43 and 21, 10-GHz transmission bands can be scanned over the free spectral range of the AWG 42, that is, $FSR_0$=16 THz. That is, bands of bandwidth 10 GHz can be implemented for 16 THz/10 GHz=1,600 channels.

Figure 45:
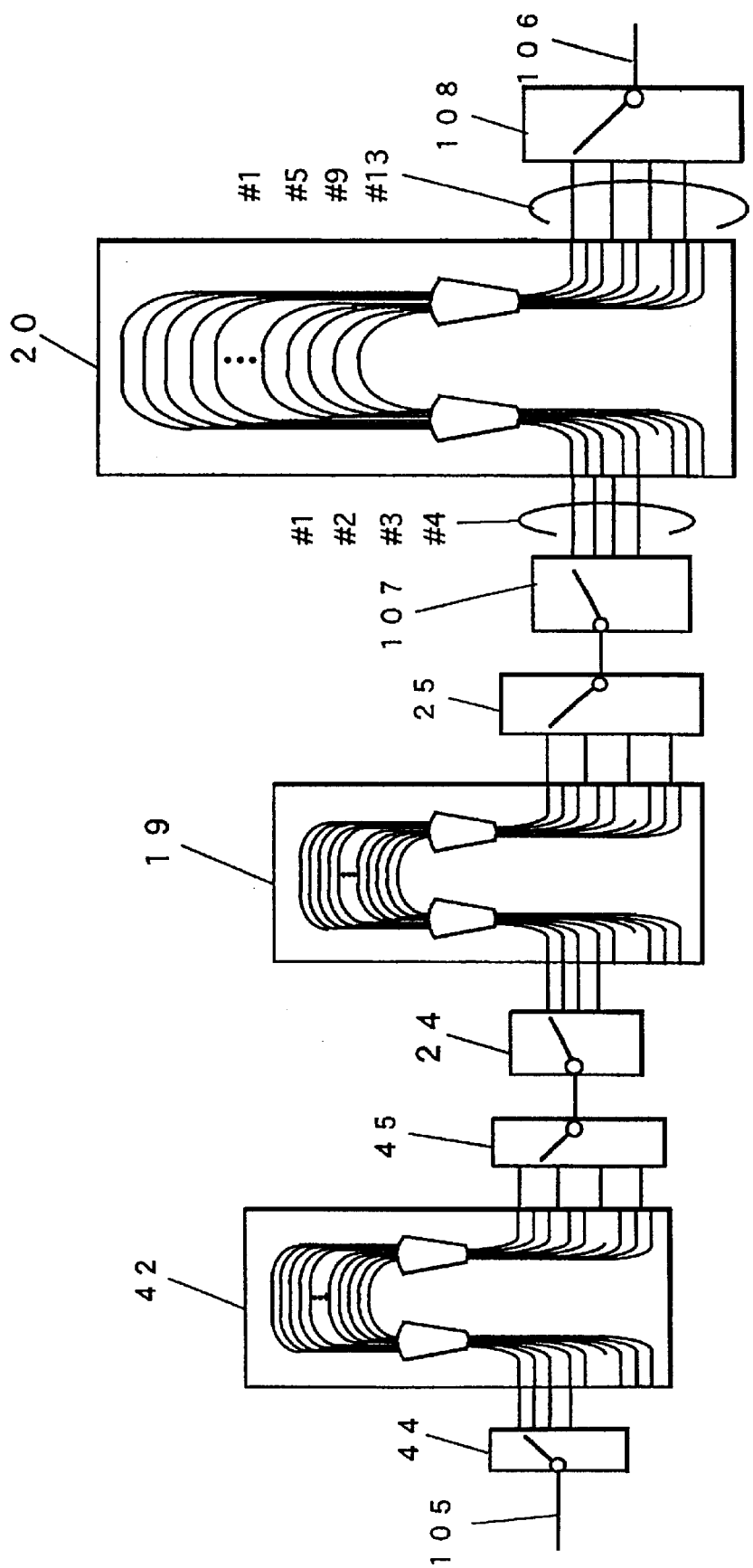
FIG. 45 shows a fifth embodiment of an optical bandpass filter according to this invention.

The fifth embodiment of the optical bandpass filter according to this invention shown in FIG. 45 replaces the 16×1 optical switches 43, 21, and 104 of the 3-stage cascaded wavelength division multi/demultiplexer in the embodiment of the optical bandpass filter shown in FIG. 44 by the 1×4 optical switches 44, 24, 107 and the 4×1 optical switches 45, 25, 108. The fifth embodiment is characterized by its ability to configure a system using small-scale optical switches.

Figure 46:
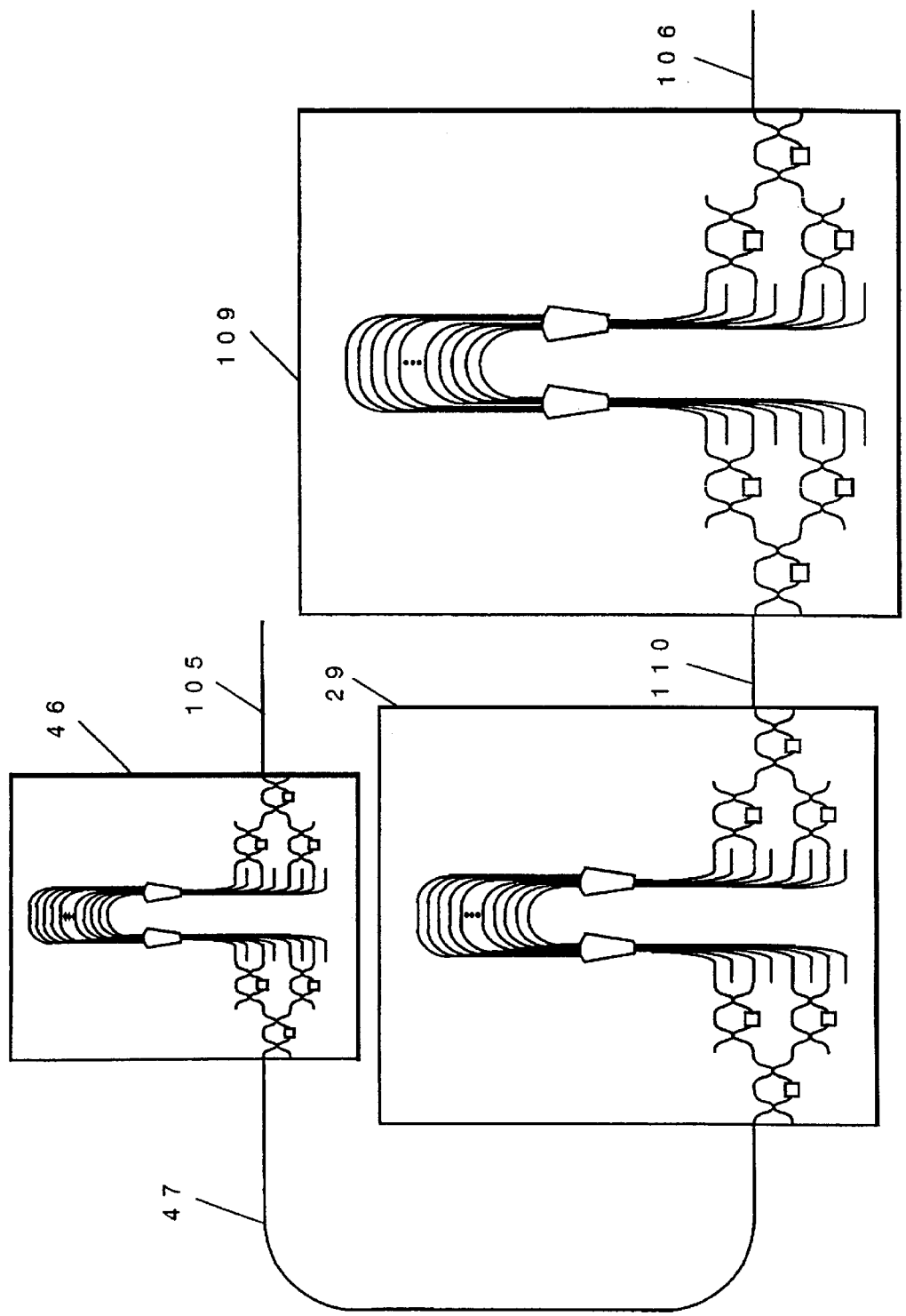
FIG. 46 shows a sixth embodiment of an optical bandpass filter according to this invention.

The sixth embodiment of the optical bandpass filter shown in FIG. 46 shows a configuration in which the optical circuits 46, 29, and 109, each having the optical switches and AWG shown above and integrated on the same substrate and connected by the optical fibers 47 and 110. This configuration enables the size of the entire apparatus to be substantially reduced while maintaining its ability to scan bands of width 10 GHz over 16 THz. Likewise, all optical circuits can be produced on the same substrate for optical integration.

Figure 47:
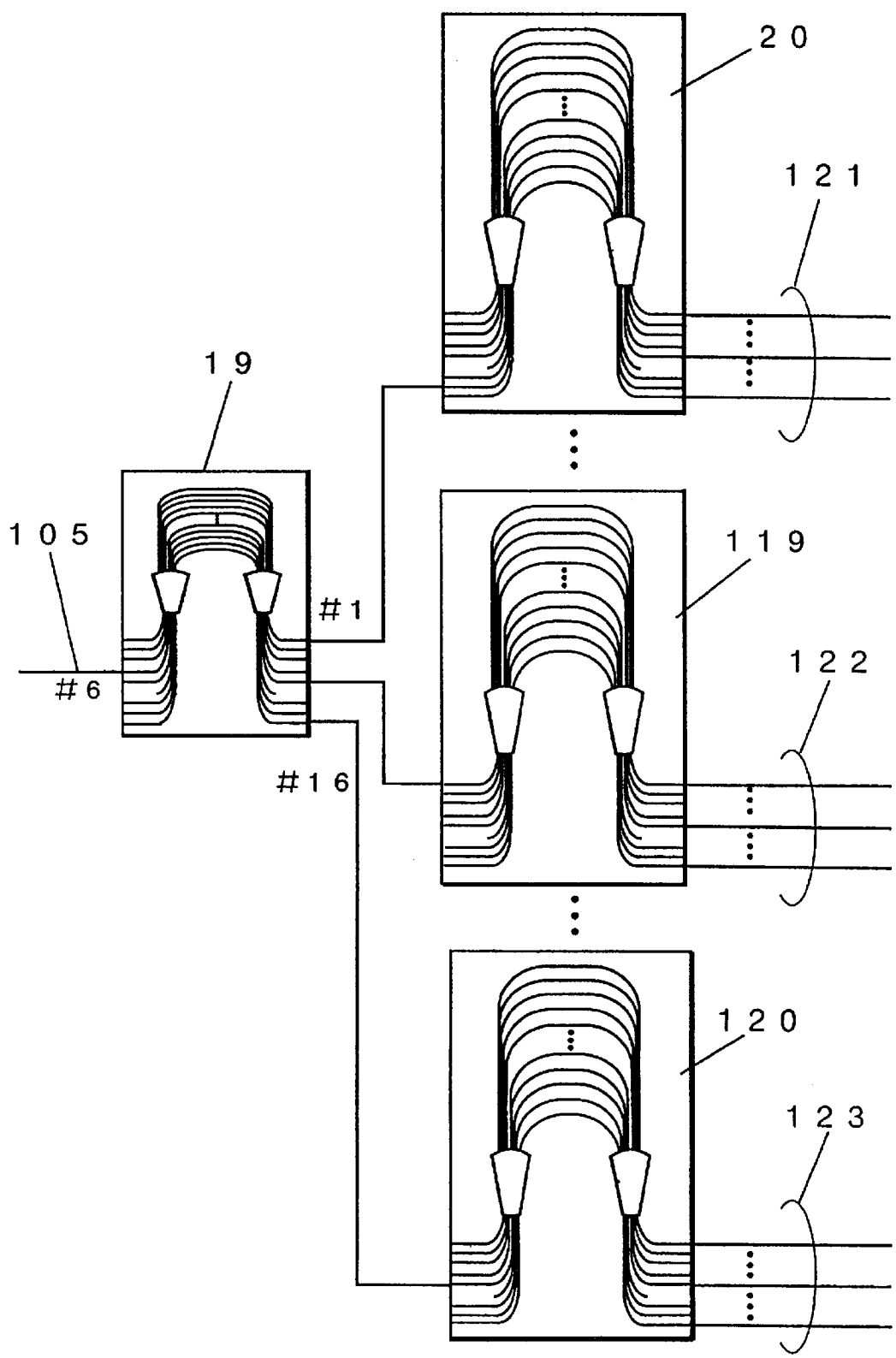
FIG. 47 shows another embodiment of the wavelength division multi/demultiplexing circuit according to this invention.

FIG. 47 shows another embodiment of the wavelength division multi/demultiplexer according to this invention. This embodiment is a wavelength division multi/demultiplexer comprising 16 AWGs (119 and 120 denote two of these AWGs) connected to the AWG 19, having the same characteristics as the AWG 20, and connected in parallel. Reference numerals 121, 122, and 123 each indicate an optical fiber array connected to the light output end of the AWG. The optical fiber 105 is connected to the light input end #6 of the leading AWG 19. The light output end #1 of the leading AWG 19 is connected to one of the light input ends of the following AWG 20 and the same operation is performed for each of the remaining light output ends of the AWG 19 so that the light output ends #2, #3, ..., #16 of the leading AWG 19 are connected to the respective AWGs having the same characteristics as the AWG 20. Since the bandwidth of the leading AWG 19 is smaller than the free spectral range $FSR_1$ of the 16 following parallel-connected AWGs, light distributed to the end of each optical fiber in the optical fiber array 121 contains no frequencies offset from the required frequency by an an integer multiple of the FSR. This indicates that the band of the leading AWG 19 can be uniquely sliced using the band of the following AWG. As shown in FIG. 13, the transmission band of the leading AWG is shaped like a trapezoid. Thus, if optical power that is distributed to a fiber optic end in the optical fiber array 121 attenuates at the bottom of the band, a fiber optic end can be used that has the same demultiplexing frequency in the adjacent band. According to this embodiment, the number of independent demultiplexing frequencies (the number of channels) in the wavelength division multi/demultiplexer is $FSR_1/ch_2$=160. In this case, $ch_2$ is the channel spacing of the following AWG.

Figure 48:
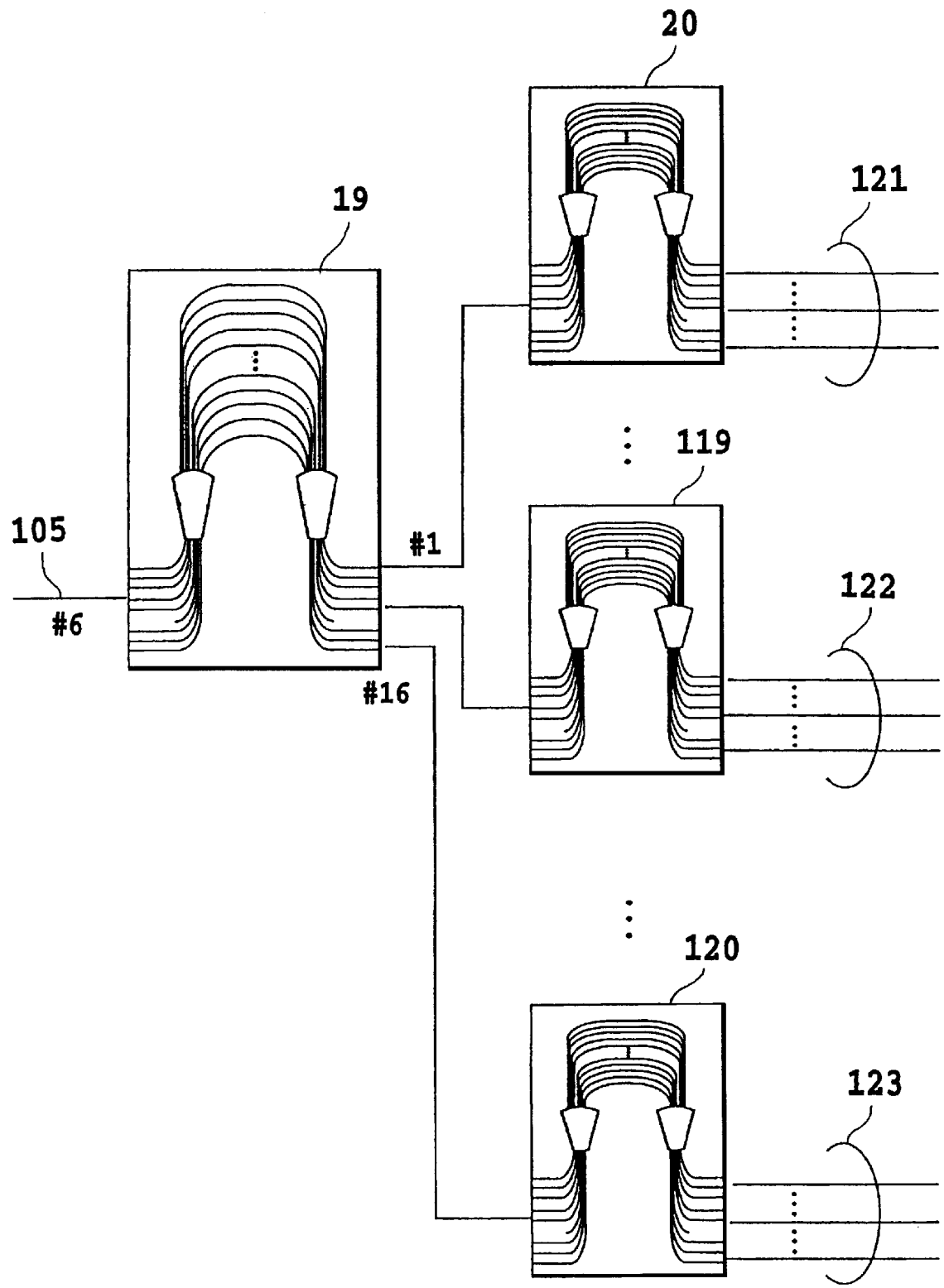
FIG. 48 shows another embodiment of the wavelength division multi/demultiplexing circuit according to this invention.

In the embodiment shown in FIG. 47, the first parallel-connected wavelength division multi/demultiplexer, that is, the leading AWG 19 has a channel spacing of 100 GHz, while the plurality of second wavelength division multi/demultiplexers connected in parallel to the first wavelength division multi/demultiplexer, that is, the following AWGs 20, 119, 120 or the like have a channel spacing of 10 GHz. In an example of configuration in which these two types of AWGs are connected in series, similar effects can be obtained despite a change in the order in which the two types of AWGs used as the leading and following AWGs are connected together, as described in the second embodiment shown in FIG. 17. Of course, the feature that similar effects can be obtained despite a change in the order of the leading and following AWGs is maintained in the parallel connection configuration. Thus, the configuration in FIG. 47 may comprise a leading AWG of a smaller channel spacing and following AWGs connected in parallel to the leading AWG and having a larger channel spacing. Specifically, as shown in FIG. 48, the leading first wavelength division multi/demultiplexer 19 may comprise an AWG having a channel spacing of 10 GHz as in the AWG 20 shown in FIG. 47, and the plurality of second wavelength division multi/demultiplexers 20, 119, and 120 connected in parallel to the first wavelength division multi/demultiplexer may comprise AWGs having a channel spacing of 100 GHz as in the AWG 19 shown in FIG. 47. Clearly, the functions provided by the configuration shown in FIG. 48 are essentially the same as those provided by the configuration shown in FIG. 47. Normally, the size of the AWG increases with decreasing channel spacing, and a higher production accuracy is required to reduce channel crosstalk. If, for example, the leading wavelength division multi/demultiplexer comprises an AWG of a smaller channel spacing and the following wavelength division multi/demultiplexers connected in parallel thereto comprise AWGs of a larger channel spacing, as shown in FIG. 48, the size of the entire configuration is reduced. That is, this configuration has the advantage of facilitating the integration of the entire configuration on the same substrate. In addition, the ability to integrate the entire configuration on the same substrate provides additional advantages, for example, the avoidance of connection losses caused by the connection of the leading and following AWGs using fiber parts or the like.

Figure 49:
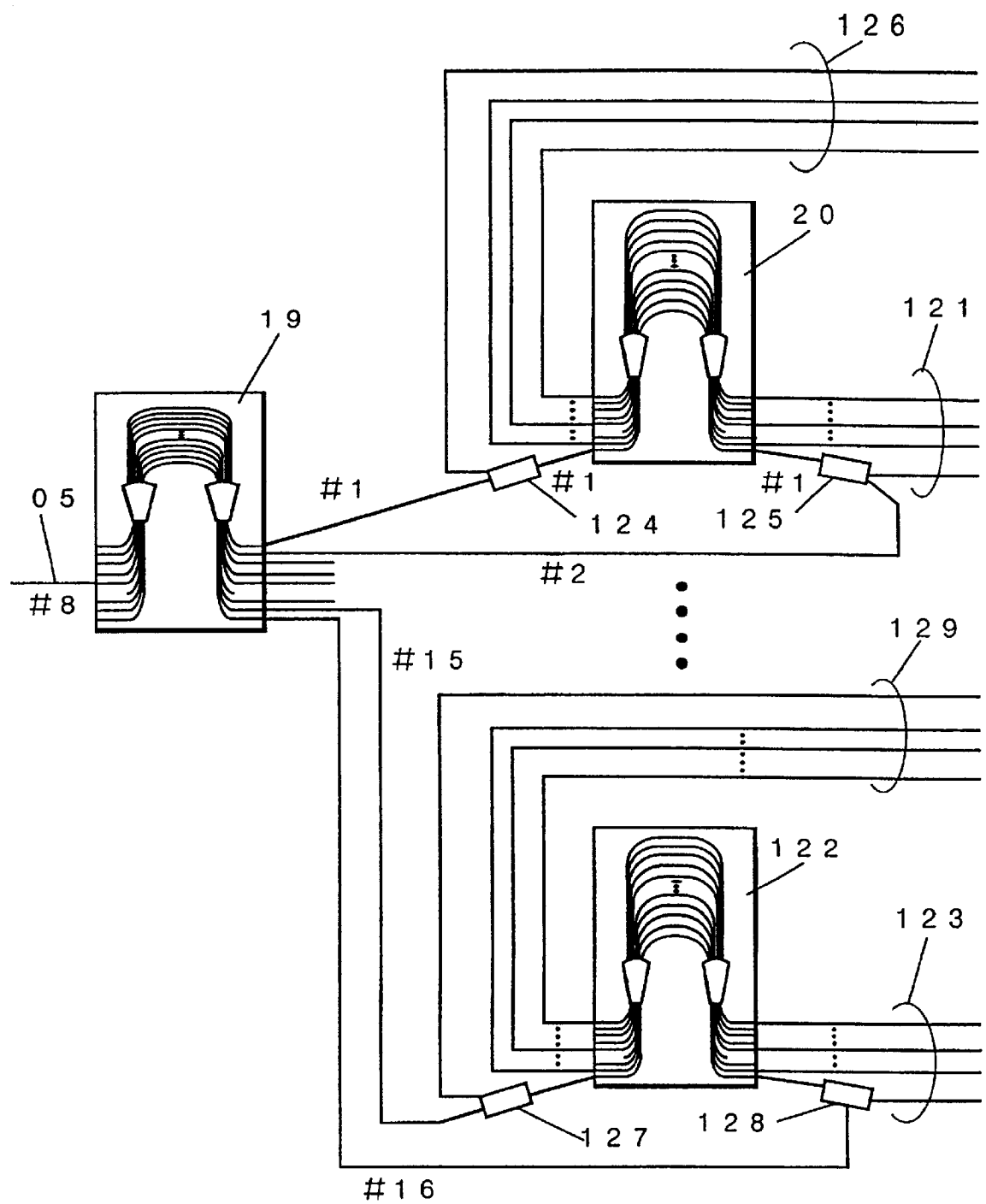
FIG. 49 shows yet another embodiment of the wavelength division multi/demultiplexing circuit according to this invention.

FIG. 49 shows yet another embodiment of the wavelength division multi/demultiplexer according to this invention. Reference numerals 124, 125, 127, and 128 designate 3-port optical circulators, and 126 and 129 are optical fiber arrays connected to the light input and output ends of the AWGs 20 and 122, respectively. In the embodiment in FIG. 47, the following AWGs are connected to each of the 16 light output ends of the leading AWG 19, whereas this embodiment is characterized in that the optical circulators are used to reduce the number of following AWGs to half. A beam distributed to the output end #1 of the leading AWG is allowed to enter the light input end #1 of the following AWG 20, while a beam distributed to the output end #2 is allowed to enter the light output end #1 of the following AWG 20. Beams obtained by the following AWGs demultiplexed the respective incident beams are extracted through the 16 light output ends 121 and the 16 light input ends 126. Since, however, the light input and output ends #1 of the following AWG 20 are both used for light incidence, the optical circulators 124 and 125 are used to extract the demultiplexing. Similar operations are repeated to allow beams distributed to the light output ends (#3, #4), (#5, #6), . . . , (#15, #16) of the leading AWG 19 to enter one light input end and one light output end of each following AWG so that demultiplexed lights are extracted from the corresponding light output and input ends. In FIG. 48, 123 is the light output end of the AWG 122 connected to the output ends (#15, #16) of the leading AWG 19, and 129 is the light input end of the AWG 122.

Figure 50:
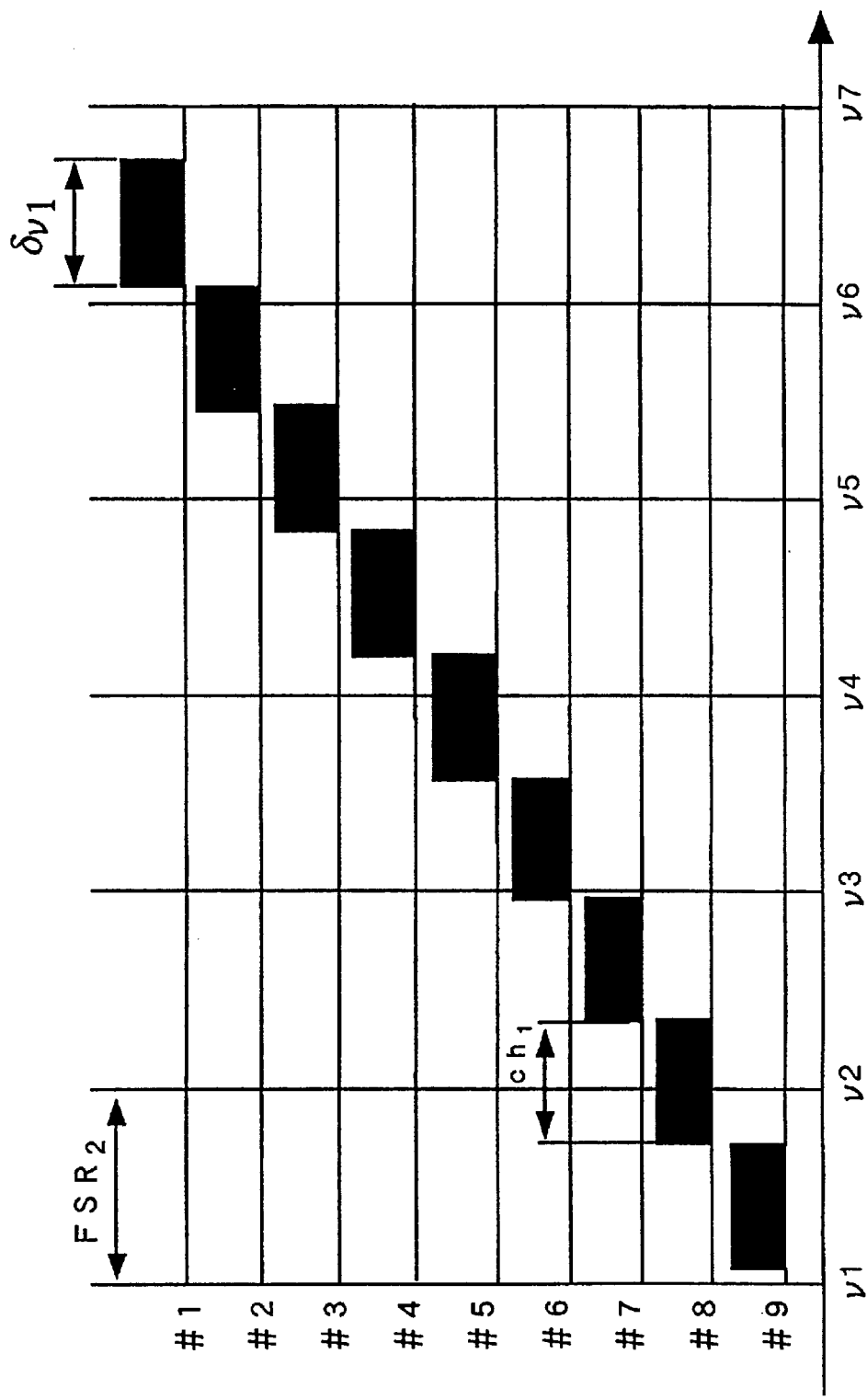
FIG. 50 shows the relationship between the transmission band of the leading AWG and the demultiplexing frequency of the following AWG.

FIG. 50 shows the relationship between the transmission band of the leading AWG and the demultiplexing frequency of the following AWG, wherein $ch_1$ and $\delta v_1$ are the channel spacing and transmission bandwidth of the leading AWG and wherein $FSR_2$ is the free spectral range of the following AWG. The nine rectangles painted black indicate transmission bands obtained when light impinges on the light input end #8 of the leading AWG while it is emitted from the light output ends #1, #2, . . . , #9. Hereafter, these bands are referred to as #1, #2, . . . , #16. Since the transmission bandwidth $\delta v_1$ is smaller than the $FSR_2$, if the light input end #9 of the leading AWG is connected to the specific light input end #i of the following AWG, at least one of the light output ends #1, #2, . . . , #16 of the following AWG provides a negligibly low output light power. That is set as a light output end #j. Specifically, in FIG. 50, light output ends having a demultiplexing frequency $v_1$ may be selected as #j. Due to the periodicity of the demultiplexing frequency of the following AWG, light frequencies $v_2, v_3, \ldots, v_7$ offset from the required frequency by the $FSR_2$ are also incident on #i of the following AWG and are distributed to #j. In FIG. 50, the relationship between the band #1 and the light frequency $v_6$ is the same as that between the band #9 and $v_1$. This is because the relationship $8 \times ch_1 = 6 \times FSR_2$ is established based on the values of the channel spacing and free spectral range of the leading and following AWGs. Thus, when the light output end #1 of the leading AWG is connected to the light input end #i of the following AWG, negligibly low optical powers are distributed to the light output ends #j. With reciprocity taken into account, if the light output end #1 of the leading AWG is connected to the light output ends #j of the following AWG, negligibly low optical powers are distributed to the input ends #i. Consequently, when the light output ends #1 and #9 (=1+8) of the leading AWG are connected to the light input ends #i and light output ends #j of the following AWG, negligibly low optical powers are distributed to the respective ends.

That is, by selecting as light input ends the #i and #j of the AWG 20 in the embodiment shown in FIG. 49, the need to extract beams distributed to these terminals using the optical circulators is eliminated. Focusing on this point, the wavelength division multi/demultiplexer shown in FIG. 51 has no optical circulators. In this figure, for the other bands of the leading AWG, specific light input ends of the following AWG are selected and the light output ends (#2, #10), . . . , (#8, #16) of the leading AWG are connected to these terminals.

Figure 51:
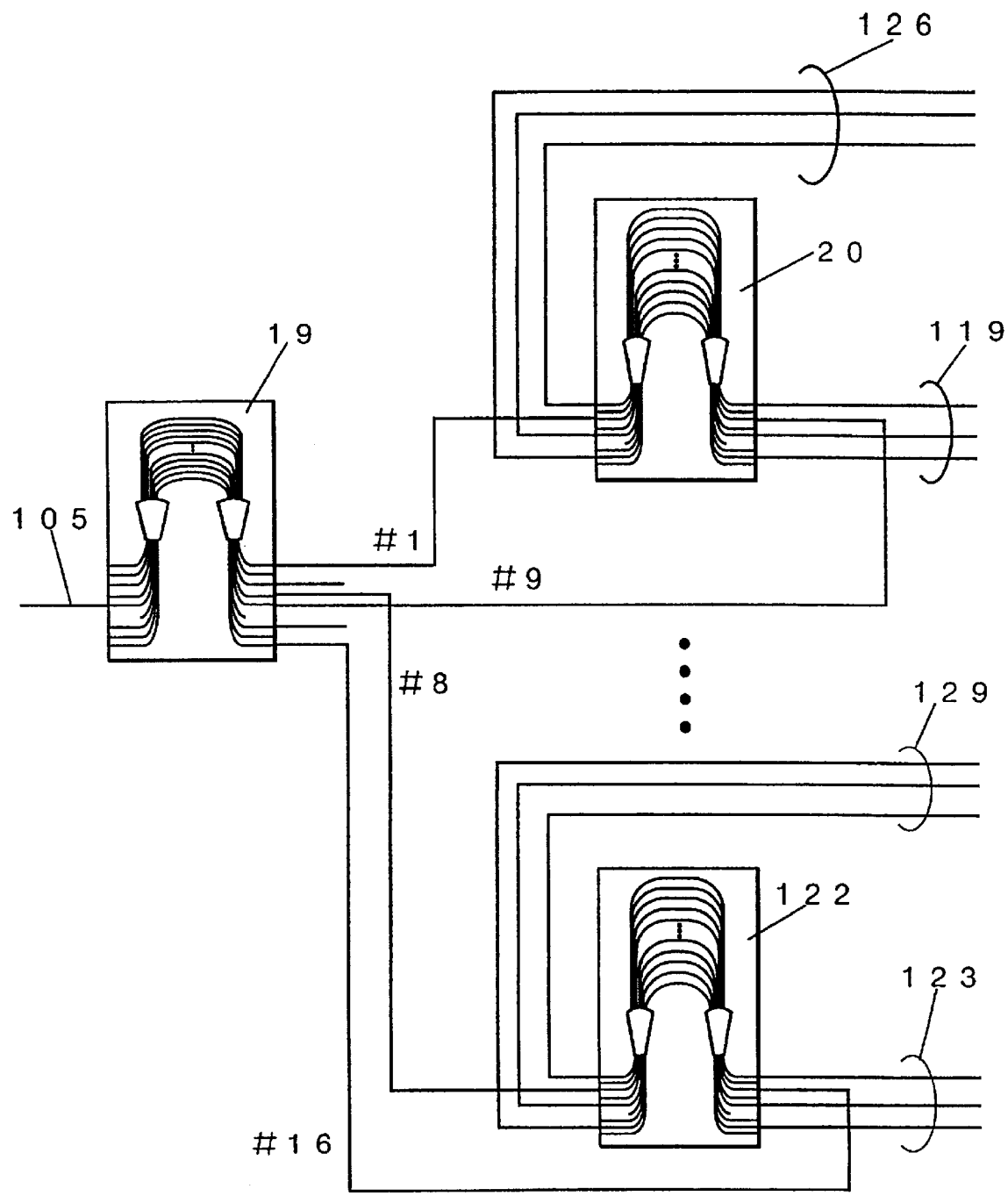
FIG. 51 shows still another embodiment of the wavelength division multi/demultiplexing circuit according to this invention.
Figure 52A:
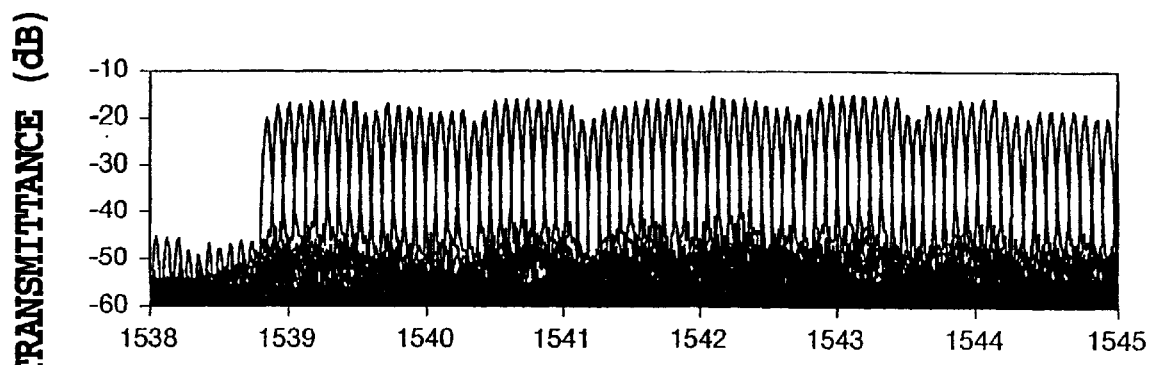
FIGS. 52A–52D shows an example of measured wavelength distribution characteristics of all output ports according to still another embodiment of the wavelength division multi/demultiplexing circuit of this invention shown in FIG. 50.
Figure 52B:
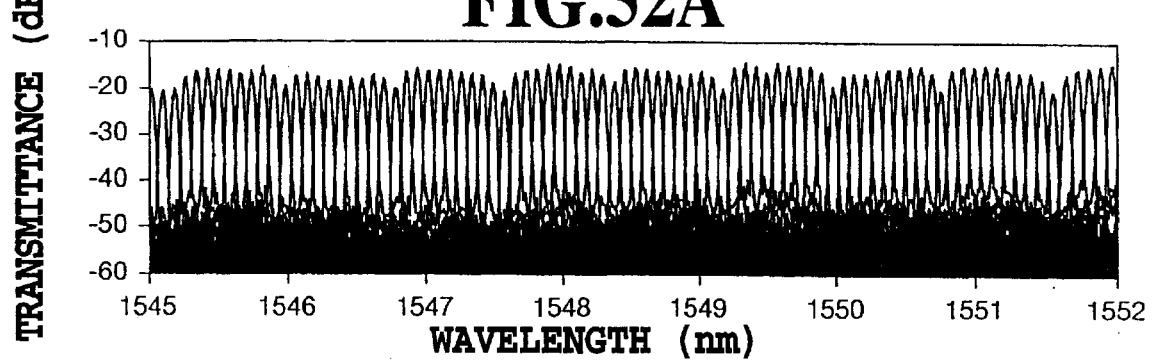
Figure 52C:
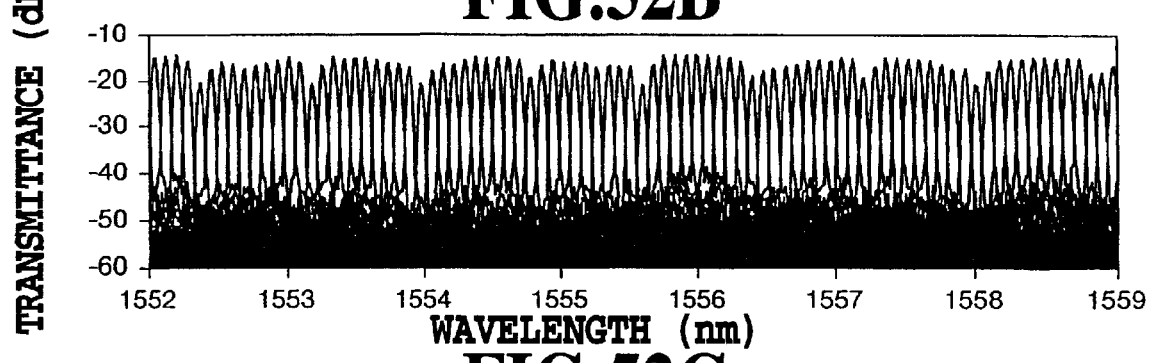
Figure 52D:
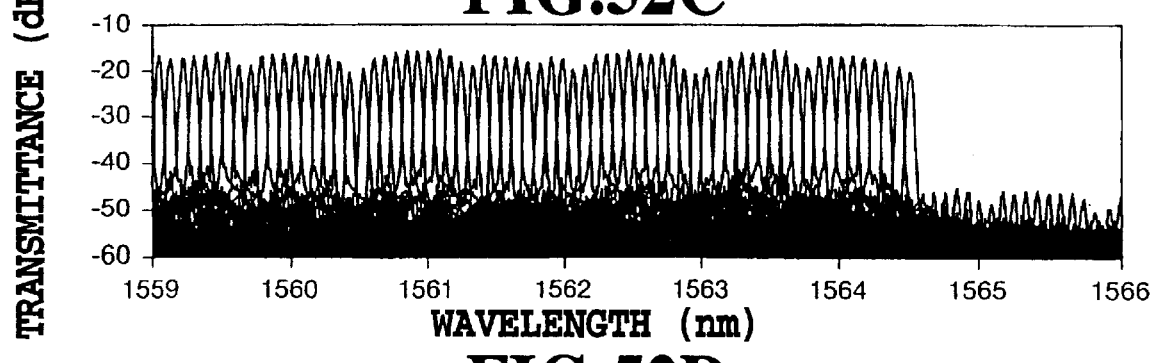

FIGS. 52A to 52D show wavelength demultiplexing characteristics obtained from all fiber optic output ports (119, 129, 123, 129) in the wavelength division multi/demultiplexer shown in FIG. 51, that is, an example of the parallel connection configuration. As shown in the measurement examples in FIGS. 52A to 52D, 320 channels of channel spacing 10 GHz could be realized in the example of the wavelength division multi/demultiplexer shown in FIG. 51. The proximity crosstalk was −20 dB or less. As explained using the examples shown in FIGS. 52A to 52D, by installing photodetectors at the respective light output ends of the wavelength division multi/demultiplexers shown in FIGS. 47, 49, and 51 to measure demultiplexed optical powers, an optical spectrum analyzer characterized by parallel connections can be implemented. On the other hand, a parallel-connection optical bandpass filter can be configured by installing multiple-input and one-output optical switches for sequentially extracting light from each light output.

Figure 53:
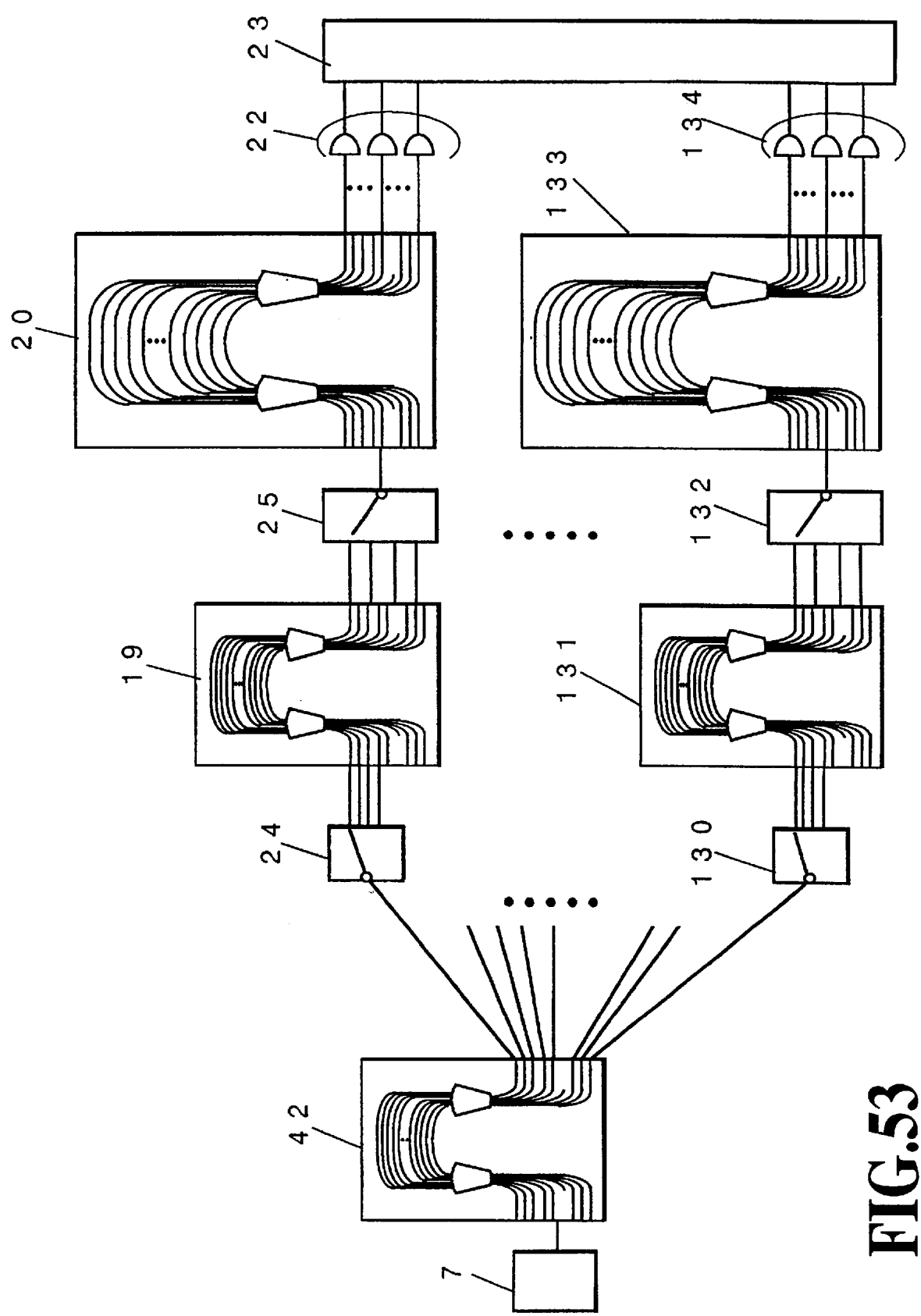
FIG. 53 shows a thirteenth embodiment of an optical spectrum analyzer using the wavelength division multi/demultiplexer according to this invention.

FIG. 53 shows a thirteenth embodiment of an optical spectrum analyzer using the wavelength division multi/demultiplexer according to this invention. This embodiment is an optical spectrum analyzer in which 16 sets of the series connected AWGs 19 and 20 are provided and connected in parallel to the AWG 42. Reference numeral 130 denotes an optical switch that is identical to the optical switch 24, 131 is a 16×16 AWG having a channel spacing of 100 GHz as in the AWG 19, 132 is a 4×1 optical switch that is identical to the optical switch 25, 133 is a 16×16 AWG having a channel spacing of 10 GHz as in the AWG 20, and 134 is a photodetector array that is identical to the photodetector array 22. The frequency tuning range of this embodiment is the same as in the 3-stage series connection type shown in FIG. 24, but this embodiment is characterized in that an optimum set of AWGs can be used for wavelength zones split by the first AWG. In addition, this embodiment enables an optical bandpass filter using both series and parallel connections to be constructed by omitting the photodetector array and connecting all the terminals together using multiple-input and one-output optical switches.

As described above, this invention can provide a wavelength division multi/demultiplexer with a substantially increased number of channels and a narrowband optical spectrum analyzer and optical bandpass filter that have no movable portion despite the use of a wide wavelength range. Therefore, it has the advantage of providing parts and measuring apparatuses essential in the field of WDM in optical communication.

The present invention has been described in detail with respect to preferred embodiments, and it will now be apparent from the foregoing to those skilled in the art that changes and modifications may be made without departing from the invention in its broader aspect, and it is the invention, therefore, in the apparent claims to cover all such changes and modifications as fall within the true spirit of the invention.

What is claimed is:

1. A wavelength division multi/demultiplexer for multi/demultiplexing incident light to emit demultiplexed light from each of a plurality of light output ends, comprising:

a first wavelength division multi/demultiplexing circuit having at least one light input end and a plurality of light output ends; and at least one second wavelength division multi/demultiplexing circuit of an arrayed waveguide grating type formed on a substrate, including a plurality of light input and output ends, one or two light multiplexing and demultiplexing sections, and a plurality of arrayed waveguides, and having a transmission bandwidth different from that of said first wavelength division multi/demultiplexing circuit, the transmission bandwidth indicating the width of a light frequency that can pass through each light input and output end, wherein said first wavelength division multi/demultiplexing circuit and at least one of said second wavelength division multi/demultiplexing circuits are optically connected together, and wherein the light output ends of the final second wavelength division multi/demultiplexing circuit are used as the light output ends of said wavelength division multi/demultiplexer.

2. The wavelength division multi/demultiplexer according to claim 1, wherein one of said first and second wavelength division multi/demultiplexing circuits has a wider free spectral range than the other, the free spectral range indicating the period of a demultiplexing light frequency.

3. The wavelength division multi/demultiplexer according to claim 1, wherein said first wavelength division multi/demultiplexing circuit is an arrayed waveguide grating type wavelength division multi/demultiplexing circuit.

4. The wavelength division multi/demultiplexer according to claim 1, wherein at least one of said first and second wavelength division multi/demultiplexing circuits is a reflecting arrayed waveguide type optical demultiplexing circuit having a plurality of light input ends, a multiplexing and demultiplexing section, and a plurality of arrayed waveguides, wherein each of the arrayed waveguides connected to the multiplexing and demultiplexing section has a diverging region in which the arrayed waveguides diverge, a following converging region in which the arrayed waveguides converge together, and a following parallel area in which the arrayed waveguides are parallel with one another, wherein a reflecting plate or a quarter-wave plate with a reflecting surface provided on the surface opposite to the arrayed waveguides is disposed in a groove or gap crossing all the arrayed waveguides in the parallel area or at the terminal of this area.

5. The wavelength division multi/demultiplexer according to claim 1, wherein at least one of said first and second wavelength division multi/demultiplexing circuits is a reflecting arrayed waveguide type optical demultiplexing circuit having a plurality of light input ends, a multiplexing and demultiplexing section, and a plurality of arrayed waveguides, wherein each arrayed waveguide has immediately after the connection with said multiplexing and demultiplexing section, a first parallel area in which all the arrayed waveguides are parallel with one another, a following diverging region in which the arrayed waveguides diverge, a following converging region in which the arrayed waveguides converge together, and a second parallel area in which the arrayed waveguides are parallel with one another, wherein a groove crossing all the arrayed waveguides is provided within the first or second parallel area or at the terminal of the second parallel area, wherein a phase compensating plate is disposed in the groove, wherein a quarter-wave plate is disposed at the terminal of the second parallel area, and wherein a reflecting mirror is provided on the surface of the wavelength plate opposite to the arrayed waveguides.

6. The wavelength division multi/demultiplexer according to claim 1, wherein at least one of said first and second wavelength division multi/demultiplexing circuits is an arrayed waveguide type optical demultiplexing circuit having a plurality of light input ends, a first multiplexing and demultiplexing section, a second multiplexing and demultiplexing section, and a plurality of arrayed waveguides formed between the first and second multiplexing and demultiplexing sections, wherein a plurality of combinations of a diverging region in which the arrayed waveguides diverge and a following converging region in which the arrayed waveguides converge together are disposed between said first and second multiplexing and demultiplexing sections, wherein at least one parallel area in which the arrayed waveguides are parallel with one another is disposed between adjacent ones of the plurality of combinations, or between said second multiplexing and demultiplexing section and one of the combinations that is adjacent to said second multiplexing and demultiplexing section, wherein a groove crossing the all the arrayed waveguides is provided within said parallel area, and wherein a half-wave plate or a phase compensating plate is placed in the groove, and wherein a quarter-wave plate or phase compensating plate is placed in the parallel area or at the terminal of this area.

7. The wavelength division multi/demultiplexer according to claim 6, wherein a second parallel area in which the arrayed waveguides are parallel with one another is disposed between said second multiplexing and demultiplexing section and one of the combinations that is adjacent to said second multiplexing and demultiplexing section, and wherein a reflecting plate or a quarter-wave plate with a reflecting surface provided on the surface opposite to the arrayed waveguides is disposed at the terminal of the second parallel area.

8. The wavelength division multi/demultiplexer according to claim 1, wherein said first and second wavelength division multi/demultiplexing circuits are connected together via an optical switch.

9. The wavelength division multi/demultiplexer according to claim 1, wherein a plurality of second wavelength division multi/demultiplexing circuits are connected in series to said first wavelength division multi/demultiplexing circuit.

10. The wavelength division multi/demultiplexer according to claim 9, wherein the arrayed waveguide grating type wavelength division multi/demultiplexing circuits other than one of the series connected wavelength division multi/demultiplexing circuits that has the maximum transmission bandwidth include another wavelength division multi/demultiplexing circuit such as that has a transmission bandwidth narrower than the width of the free spectral range of the arrayed waveguide grating type wavelength division multi/demultiplexing circuits.

11. The wavelength division multi/demultiplexer according to claim 10, wherein the arrayed waveguide grating type wavelength division multi/demultiplexing circuits within said plurality of wavelength division multi/demultiplexing circuits meet the following continuity condition:

$$|FSR - M \times ch| \leq \kappa \delta v$$

where FSR is the width of the free spectral range of the arrayed waveguide grating type wavelength division multi/demultiplexing circuits, ch is a channel spacing indicating the interval between optical frequencies distributed to adjacent light output ends, M is the number of light output ends used for connection with the following wavelength division multi/demultiplexer, δv is a transmission bandwidth, and κ is a constant that meets $0 \leq \kappa \leq 2.0$, wherein all the optical frequencies distributed to the M light output ends are contained within the same free spectral range.

12. The wavelength division multi/demultiplexer according to claim 10, comprising an optical switch for connecting the series connected arrayed waveguide grating type wavelength division multi/demultiplexing circuits to each other, the optical switch having at least one set of a 1×N optical switch for connecting N specific light input ends of the arrayed waveguide grating type wavelength division multi/demultiplexing circuit to one light output end of the wavelength division multi/demultiplexing circuit arranged as a prestage of this arrayed waveguide grating type wavelength division multi/demultiplexing circuit; and an M×1 optical switch for connecting M specific light output ends of the arrayed waveguide grating type wavelength division multi/demultiplexing circuit to one light output end of the wavelength division multi/demultiplexing circuit arranged as a poststage of this arrayed waveguide grating type wavelength division multi/demultiplexing circuit.

13. The wavelength division multi/demultiplexer according to claim 12, wherein L is defined as the number of spectra into which light can be demultiplexed within the free spectral range by means of the arrayed waveguide grating type wavelength division multi/demultiplexing circuit with said one-input and multiple-output optical switch and multiple-input and one-output optical switch connected thereto, wherein a minimum set of light input and output ends required to demultiplex light into L spectra are selected, their numbers being defined as N and M, respectively, and wherein the light input and output ends of the prestaged and poststaged wavelength division multi/demultiplexing circuits are connected together via the 1×N and M×1 optical switches.

14. The wavelength division multi/demultiplexer according to claim 12, wherein the poststaged optical demultiplexing circuit connected to the prestaged optical demultiplexing circuit via said 1×N optical switch is a reflecting arrayed waveguide type optical demultiplexing circuit having a plurality of light input ends, a multiplexing and demultiplexing section, and a plurality of arrayed waveguides, wherein each of the arrayed waveguides connected to the multiplexing and demultiplexing section has a diverging region in which the arrayed waveguides diverge, a following converging region in which the arrayed waveguides converge together, and a following parallel area in which the arrayed waveguides are parallel with one another, wherein a reflecting plate or a quarter-wave plate with a reflecting surface provided on the surface opposite to the arrayed waveguides is disposed in a groove or gap crossing all the arrayed waveguides in the parallel area or at the terminal of this area, wherein said 1×N optical switch and one of the light input ends of the reflecting arrayed waveguide type optical demultiplexing circuit are connected together via an optical circulator, while the remaining light input ends of the arrayed waveguide type optical demultiplexing circuit and the other output ends of said optical circulator are used as the light output ends of the arrayed waveguide type optical demultiplexing circuit.

15. The wavelength division multi/demultiplexer according to claim 1, wherein a plurality of second wavelength division multi/demultiplexing circuits are connected in parallel to said first wavelength division multi/demultiplexing circuit.

16. The wavelength division multi/demultiplexer according to claim 15, wherein the arrayed waveguide grating type wavelength division multi/demultiplexing circuits corresponding to either said first wavelength division multi/demultiplexing circuit or plurality of second wavelength division multi/demultiplexing circuits meet the following continuity condition:

$$|FSR - M \times ch| \leq \kappa \delta v$$

where FSR is the width of the free spectral range of the arrayed waveguide grating type wavelength division multi/demultiplexing circuit, ch is a channel spacing, that is, the interval between optical frequencies distributed to adjacent light output ends, M is the number of light output ends used for connection with the following wavelength division multi/demultiplexer, by is a transmission bandwidth, and κ is a constant that meets $0 \leq \kappa \leq 2.0$, wherein all the optical frequencies distributed to the M light output ends are contained within the same free spectral range.

17. The wavelength division multi/demultiplexer according to claim 15, wherein one of two specific light output ends of said first wavelength division multi/demultiplexing circuit is connected to one of the light input ends of said plurality of second wavelength division multi/demultiplexing circuits, while the other is connected to one of the light output ends of said plurality of second wavelength division multi/demultiplexing circuits.

18. The wavelength division multi/demultiplexer according to claim 17, wherein an optical circulator is connected to each selected light output end of said first wavelength division multi/demultiplexing circuit, and wherein the output ends of the optical circulator are connected to the light input and output ends of said second wavelength division multi/demultiplexing circuit.

19. The wavelength division multi/demultiplexer according to claim 17, wherein predetermined first and second light output ends of said first wavelength division multi/demultiplexing circuit and predetermined first and second light input and output ends of the same circuit to which said second wavelength division multi/demultiplexing circuit is connected are determined as a combination with which optical power distributed from said first output end to said second light input and output end and optical power distributed from said second output end to said first light input and output end are negligibly smaller than the optical powers distributed to the remaining light input and output ends.

20. The wavelength division multi/demultiplexer according to claim 11, wherein a group of parallel connected wavelength division multi/demultiplexing circuits is configured by multi/demultiplexing into a plurality of wavelength sub-zones, a wavelength zone that can be uniquely demultiplexed by one of said wavelength division multi/demultiplexing circuits and connecting the plurality of series connected wavelength division multi/demultiplexing circuits via optical switches or transmission media to the light output ends of the wavelength division multi/demultiplexing circuit corresponding to the demultiplexed wavelength subzones.

21. The wavelength division multi/demultiplexer according to claim 20, wherein the light input and output ends or light output ends of the final wavelength division multi/demultiplexing circuit of said group of wavelength division multi/demultiplexing circuits are connected to a new wavelength division multi/demultiplexer via an optical switch.

22. The wavelength division multi/demultiplexer according to claim 20, wherein said parallel connection is provided repeatedly.

23. An optical spectrum analyzer for measuring as a function of the light frequency the average optical power per unit frequency of output light from a light source, comprising a wavelength division multi/demultiplexer according to claim 1, an optical system for allowing light to enter the wavelength division multi/demultiplexer, a plurality of photodetectors connected to each of the plurality of light output ends of one second wavelength division multi/demultiplexing circuit or to each the plurality of light output ends of the final one of a plurality of second wavelength division multi/demultiplexing circuits, and a signal processing means for measuring an average of optical powers that reach the plurality of photodetectors and determining an average light intensity per unit frequency relative to the demultiplexing frequency distributed to each photodetector.

24. The optical spectrum analyzer according to claim 23, wherein a polarization beam splitter is disposed between said optical switch and the light input ends of the wavelength division multi/demultiplexing circuit connected by the optical switch so that a P wave in which the direction of polarization spatially split by the polarization beam splitter is parallel with the incident surface of the polarization beam splitter and an S wave in which the polarization direction is perpendicular to the incident surface of the polarization beam splitter independently enter the connected wavelength division multi/demultiplexing circuit.

25. The optical spectrum analyzer according to claim 24, wherein a polarization optical switch is arranged between said optical switch and the light input ends of the arrayed waveguide grating type wavelength division multi/demultiplexing circuit connected by the optical switch, and said polarization optical switch comprises a polarization beam splitter, an optical transmission system for independently propagating the P and S waves spatially split by the polarization beam splitter, an optical system for spatially rotating one of the P and S waves to align its polarization direction with the polarization direction of the S or P wave, an optical switch for allowing either the P or S wave or the S or P wave that has been spatially rotated by 90° to enter the light input end of the arrayed waveguide grating type wavelength division multi/demultiplexing circuit in the same principal axis mode.

26. The optical spectrum analyzer according to claim 24, further comprising:

two optical transmission lines for connecting the polarization beam splitter to the N×1 optical switch that connects the prestaged wavelength division multi/demultiplexing circuit and the poststaged arrayed waveguide type wavelength division multi/demultiplexing circuit, and spatially multi/demultiplexing said P and S waves split by the polarization beam splitter to independently propagate the split waves;

a polarization control mechanism for connecting one of said two optical transmission lines to one light input end of said arrayed waveguide type wavelength division multi/demultiplexing circuit via a first optical circulator while connecting the other optical transmission line to one light output end of the arrayed waveguide wavelength type division multi/demultiplexing circuit via a second optical circulator in such a way that, the mechanism excites upon light incidence only the principal axis of the propagation mode TE or TM of the arrayed waveguide type optical demultiplexing circuit; and a photodetector array for measuring the optical output from the light output ends and second optical circulator and the optical output from the light input ends and first optical circulator, the optical outputs resulting from light incidence on the light input and output ends of the arrayed waveguide type optical demultiplexing circuit.

27. An optical bandpass filter having a variable central frequency, having light input and output ends and passing through the light output end, only specific frequency components of light input on the light input end, comprising a wavelength division multi/demultiplexer according to claim 1 and an optical switch for sequentially selecting each light output end of the wavelength division multi/demultiplexer.

* * * * *

UNITED STATES PATENT AND TRADEMARK OFFICE
CERTIFICATE OF CORRECTION

PATENT NO. : 6,278,813 B1
DATED : August 21, 2001
INVENTOR(S) : Takada et al.

Page 1 of 1

It is certified that error appears in the above-identified patent and that said Letters Patent is hereby corrected as shown below:

<u>Column 34,</u>
Line 32, "by" should read -- $\delta v$ --.

Signed and Sealed this

Twelfth Day of March, 2002

Attest:

Attesting Officer

JAMES E. ROGAN
Director of the United States Patent and Trademark Office